United States Patent
Raber et al.

(10) Patent No.: US 9,371,866 B2
(45) Date of Patent: Jun. 21, 2016

(54) WET CLUTCH FOR A MOTORCYCLE

(71) Applicant: Schaeffler Technologies AG & Co. KG, Herzogenaurach (DE)

(72) Inventors: Christoph Raber, Ottweiler-Steinbach (DE); Rainer Ganter, Buehlertal (DE); Martin Chambrion, Herrlisheim (FR); Marion Keller, Karlsruhe (DE); Florian Decker, Buehl (DE); Raimund Ritter, Herzogenaurach (DE); Juergen Stoelze, Erlangen (DE); Matthias Sperber, Wachenroth (DE); Frank Kozlowski, Fuerstenfeldbruck (DE); Joachim Raatz, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 51 days.

(21) Appl. No.: 14/109,012

(22) Filed: Dec. 17, 2013

(65) Prior Publication Data

US 2014/0102846 A1   Apr. 17, 2014

Related U.S. Application Data

(63) Continuation of application No. PCT/DE2012/000651, filed on Jun. 28, 2012.

(30) Foreign Application Priority Data

Jun. 30, 2011   (DE) .......................... 10 2011 106 021

(51) Int. Cl.
  *F16D 13/56*  (2006.01)
  *F16D 13/52*  (2006.01)
  (Continued)

(52) U.S. Cl.
  CPC .............. *F16D 13/52* (2013.01); *F16D 13/646* (2013.01); *F16D 13/683* (2013.01); *F16D 2300/12* (2013.01)

(58) Field of Classification Search
  CPC ... F16D 13/646; F16D 13/52; F16D 2300/12; F16D 13/648; F16D 13/644; F16D 13/686; F16D 13/56; F16D 13/585
  USPC ............................................. 192/70.17, 89.2
  See application file for complete search history.

(56) References Cited

U.S. PATENT DOCUMENTS 5,384,949 A * 1/1995 Wodrich et al. .................. 29/557
5,839,559 A * 11/1998 Uehara ................. F16D 13/585
                                                     192/111.19

(Continued)

FOREIGN PATENT DOCUMENTS

CN    1109563    10/1995
CN    2694034     4/2005

(Continued)

*Primary Examiner* — Robert Hodge
*Assistant Examiner* — Stacey Fluhart
(74) *Attorney, Agent, or Firm* — Simpson & Simpson, PLLC

(57) ABSTRACT

A wet clutch for a motorcycle having an outer basket having a first toothing as the input side of the wet clutch, an inner basket which is coaxial to the outer basket having a second toothing as the output side of the wet clutch, first frictional elements which are torsionally connected to the outer basket, second frictional elements which are torsionally connected to the inner basket, the first and second frictional elements being situated axially alternating between the inner basket and the outer basket, and a clamping element to compress the first and second frictional elements axially in order to produce a torsional connection between the input side and the output side. The inner basket and/or the outer basket can essentially be produced from one or more sheet metal parts.

8 Claims, 72 Drawing Sheets

(51) Int. Cl.
*F16D 13/64* (2006.01)
*F16D 13/68* (2006.01)

(56) References Cited

U.S. PATENT DOCUMENTS

| | | | |
|---|---|---|---|
| 2002/0170798 A1* | 11/2002 | Sugita et al. | 192/70.27 |
| 2002/0179398 A1* | 12/2002 | Mokdad | F16D 13/583 |
| | | | 192/70.27 |
| 2007/0193845 A1* | 8/2007 | Uhler | F16D 13/585 |
| | | | 192/70.27 |
| 2007/0261932 A1* | 11/2007 | Zagrodzki et al. | 192/70.27 |
| 2010/0276243 A1* | 11/2010 | Arhab | F16D 13/683 |
| | | | 192/3.29 |
| 2011/0297503 A1* | 12/2011 | Szuba | 192/108 |

FOREIGN PATENT DOCUMENTS

| | | |
|---|---|---|
| DE | 19904134 A1 | 8/2000 |
| DE | 19928513 A1 | 12/2000 |
| DE | 102004022920 A1 | 12/2005 |
| DE | 102006031786 A1 | 1/2008 |
| DE | 102008054473 A1 | 6/2010 |
| JP | 2003062657 | 3/2003 |

* cited by examiner

Fig. 1

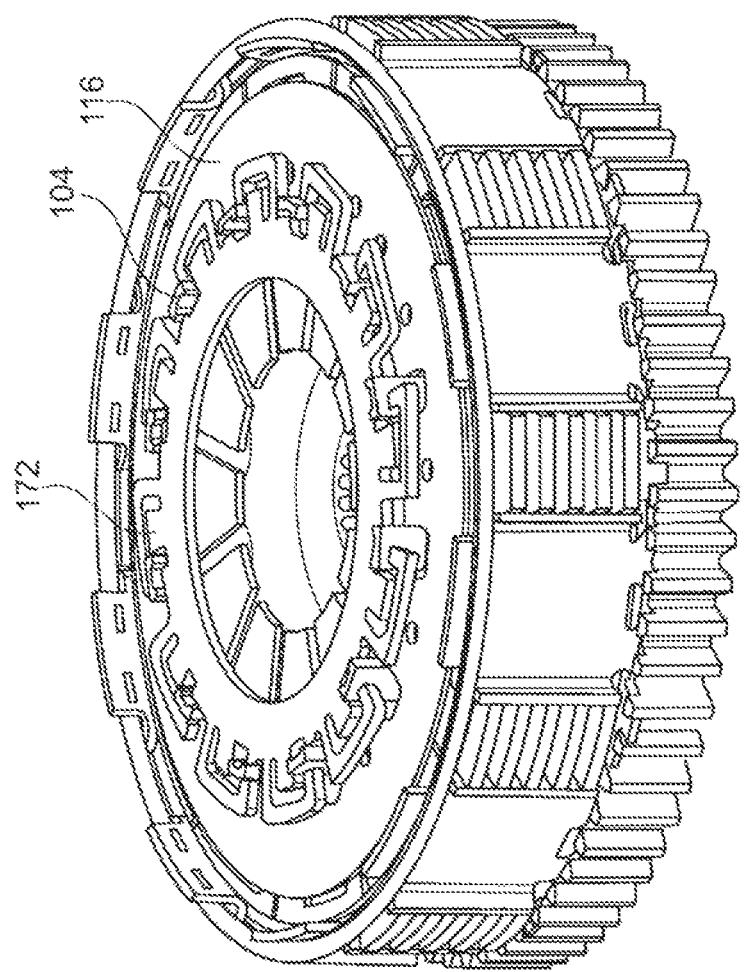

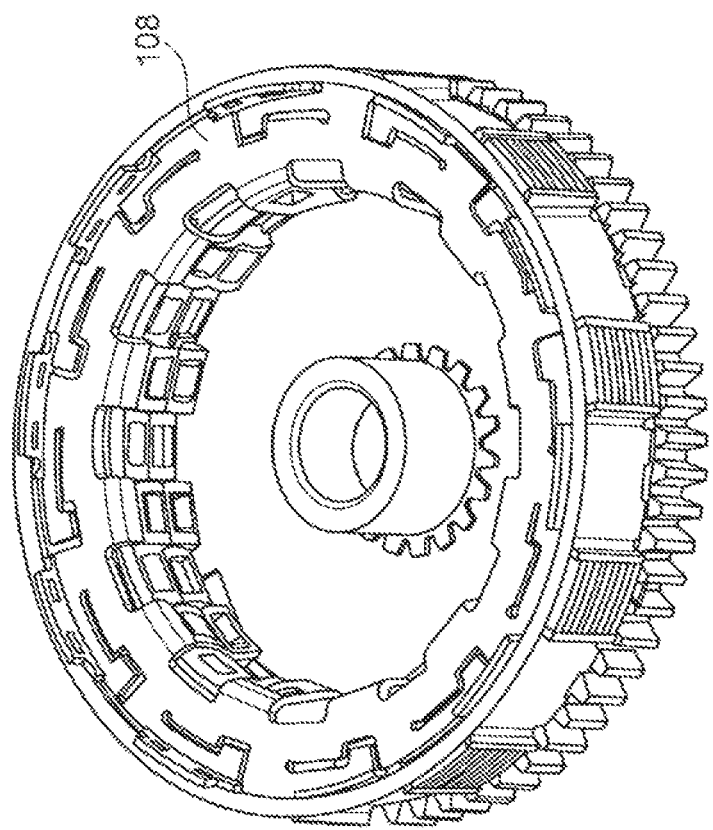

WET CLUTCH FOR A MOTORCYCLE

CROSS-REFERENCE TO RELATED APPLICATIONS

This patent is filed under 35 U.S.C. §120 and §365(c) as a continuation of International Patent Application No. PCT/DE2012/000651 filed Jun. 28, 2012, which application claims priority from German Patent Application No. 10 2011 106 021.2 filed Jun. 30, 2011, which applications are incorporated herein by reference in their entireties.

FIELD OF THE INVENTION

The invention relates to a wet clutch, and in particular, to a multiple-disk wet clutch for a motorcycle.

BACKGROUND OF THE INVENTION

A wet clutch for a motorcycle normally includes an inner basket and an outer basket, which are situated coaxially on a main transmission shaft. A number of first friction disks are engaged with the outer basket and a number of second friction disks are engaged with the inner basket, the first and second friction disks being situated coaxially in alternating order. A frictional lock can be produced selectively between the inner basket and the outer basket, by pressing the stack of first and second friction disks against each other axially. A torque of a drive engine is normally input into the outer basket by means of spur gearing, and uncoupled to the main transmission shaft via an internal toothing of the inner basket. The entire clutch runs in an oil bath, which normally also surrounds the transmission.

A number of suggestions have been made for the advantageous design of such a wet clutch. In order to be used in a motorcycle, the clutch must be robust and compact; in addition, it should be producible in large quantities at low cost, and if possible usable with different drive engines. For example, the clutch should also support the link-in of a kick-starter, for example by means of a kick-starter gear connected torsionally to the outer basket.

A usual embodiment for the described clutch uses parts made of a die-cast alloy for the inner and outer baskets. The outer gearwheel for coupling the engine torque into the outer basket is formed in a single piece with the kick-starter gear. The axial clamping force on the friction disks is supplied by means of coil springs. This clutch is relatively complicated to produce, has a high mass moment of inertia, and the clamping force of the coil springs varies over a decrease in height of the friction disks which is a function of wear. Thus, there is a long-felt need to provide a wet clutch for a motorcycle, which fulfills the demands described above in an improved manner.

BRIEF SUMMARY OF THE INVENTION

The invention generally includes a wet clutch for a motorcycle, in particular for a lightweight motorcycle, having an outer basket having a first toothing as the input side of the wet clutch, an inner basket which is coaxial to the outer basket having a second toothing as the output side of the wet clutch, first frictional elements which are torsionally connected to the outer basket, second frictional elements which are torsionally connected to the inner basket, the first and second frictional elements being situated axially alternating between the inner basket and the outer basket, and a clamping element to compress the first and second frictional elements axially in order to produce a torsional connection between the input side and the output side. The inner basket and/or the outer basket can essentially be produced from one or more sheet metal parts.

That makes it possible to provide a wet clutch for a lightweight motorcycle, which has reduced production costs while requiring little construction space. For example, for a lightweight motorcycle of the approximately 200 $cm^3$ class, the proposed wet clutch can be easily producible in large quantities. This makes it possible to dispense with a complex casting or die casting process to produce elements of the wet clutch. Using the wet clutch can make it easier to mass produce lightweight motorcycles, for example, for the Asian market. Furthermore, a mass moment of inertia of the proposed wet clutch can be smaller than that of a conventional clutch.

In an embodiment, one of the baskets comprises a deep-drawn part. This enables the inner or outer basket to be easily and quickly produced from one metal sheet, resulting in a simple, robust and precise clutch basket. A toothing element for introducing or extracting force can be produced separately and attached to the inner or outer basket.

In an embodiment, a starter gear is positively connected coaxially to the outer basket. The starter gear can be set up to engage with a kick-starter. Because of the positive connection of the starter gear with the outer basket, a substantial part of the outer basket can be produced from the metal sheet, while the toothing of the input side and of the starter gear can be realized in a material-saving way, for example, from cast, turned or machined parts.

In an embodiment, the starter gear can be integrated with a plain bearing bush for supporting the outer basket. In this way, the outer basket can be realized in a compact, production- and installation-friendly manner. By providing the starter gear near the bearing bush, the starter gear can be dimensioned with a relatively small circumference, which can be exploited to match an actuation travel distance of the foot pedal to a torsional angle of the wet clutch, and thus, a crank angle of the drive engine.

In an embodiment, the clamping element includes a membrane spring. The membrane spring can likewise be made from a sheet metal part. Through the use of similar procedural steps to produce the membrane spring and at least one of the clutch baskets, fabrication quality of the friction clutch can be improved overall, thus reducing production costs.

In another embodiment, an elastic element is provided for torsionally elastic connection of the outer basket to the assigned toothing element. This makes it possible to implement a shock absorber, which can contribute to reducing load change reactions or attenuating torsional vibrations, which may be introduced into the wet clutch, for example, by the drive engine.

The elastic element includes a number of radial sheet metal straps. This enables the use of sheet steel as a source material for producing the wet clutch to be extended consistently to the elastic element, which can result in additional advantages in the production technique. In one embodiment, the sheet metal straps can be designed in a single piece with one of the two clutch baskets.

The outer basket can include an additional encircling ring to support the outer basket under centrifugal force loading, thus reducing the danger of the outer basket bending or breaking under high speeds of rotation. In this way, an additional safety reserve can be provided, without having to significantly increase expense with regard to the material used or the production of the wet clutch.

In an embodiment, a device for producing an axial pretensioning on the clamping element is provided, in order to compensate for a decrease in the height of the stacked first and second frictional elements which is a function of wear. For example, in comparison to a conventional clutch having coil springs, in this way an actuation travel distance needed to operate the clutch can be kept essentially constant over the life of the frictional elements. This eliminates the need for an external mechanism to compensate for a corresponding actuation play, for example, a manually-operated mechanism; thus making it possible to increase the reliability of use of the wet clutch, or of a vehicle in which the wet clutch is used.

BRIEF DESCRIPTION OF THE DRAWINGS

A total of 12 different embodiments V1 through V12 are described. Each of the embodiments is described through eight views P1 through P8. P1 shows the total construction, P2 a gear wheel that serves as the input of the wet clutch, P3 a damping of the gear, P4 a starter gear, P5 an outer basket, P6 an inner basket, P7 a fastening of the inner basket at one of its axial ends, and P8 the fastening of the inner basket at the other axial end.

Some of the embodiments V1 through V12 build on each other, so that not all views P1 through P8 are different among all embodiments V1 through V12. For example, the embodiment V1 represents a basic form on which the embodiments V2, V3 and V8 build, Variations of the embodiment V3 are found in the embodiments V4 through V7. V9 is a variation of the embodiment V8, on which the embodiments V10 and V11 build. Finally, V12 is a variation of the embodiment V11.

Figure 10:
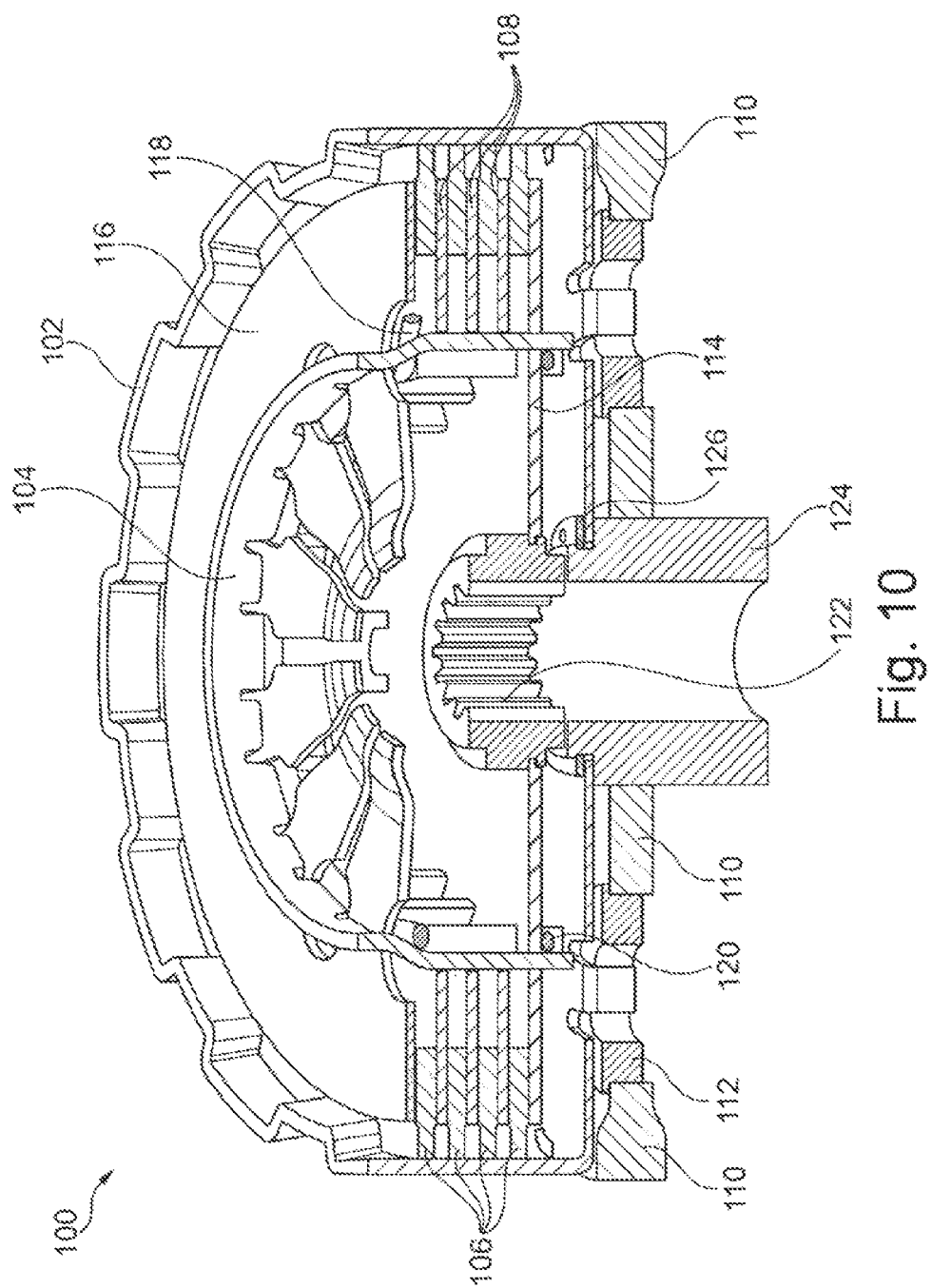
Figure 11:
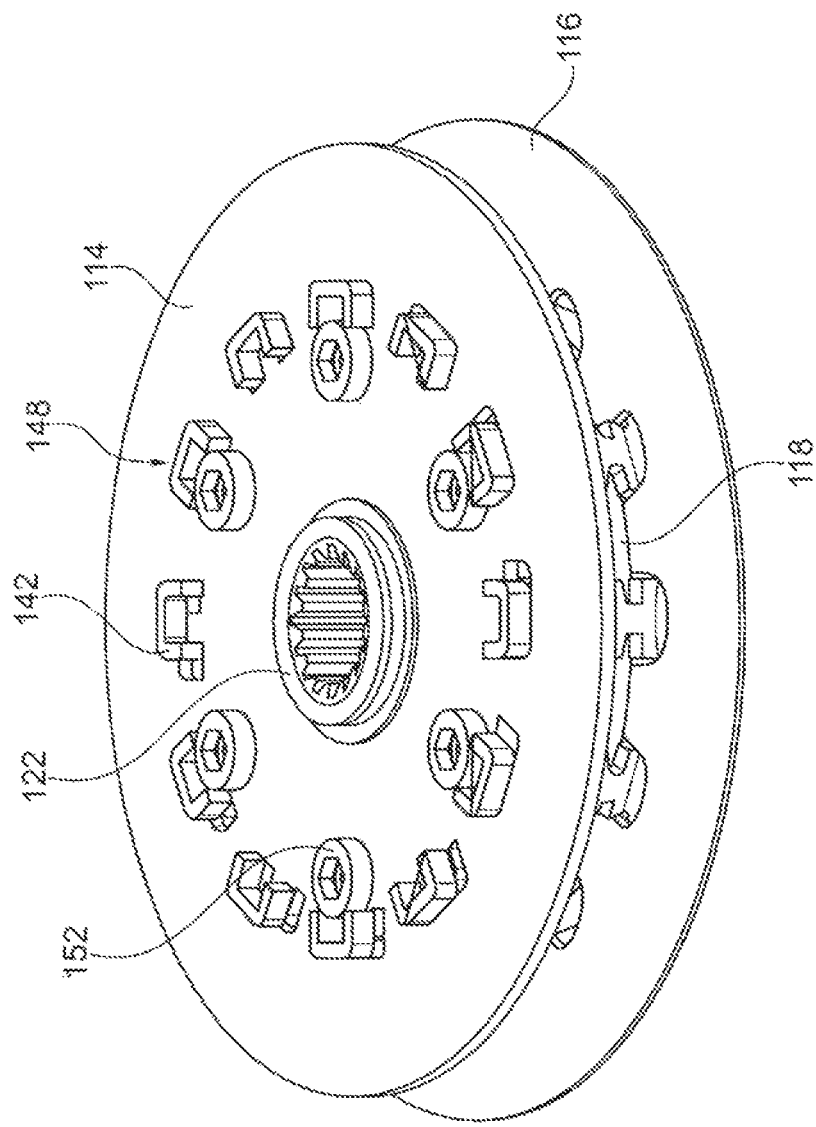

The nature and mode of operation of the present invention will now be more fully described in the following detailed description of the invention taken with the accompanying drawing figures, in which:

Figure 1:
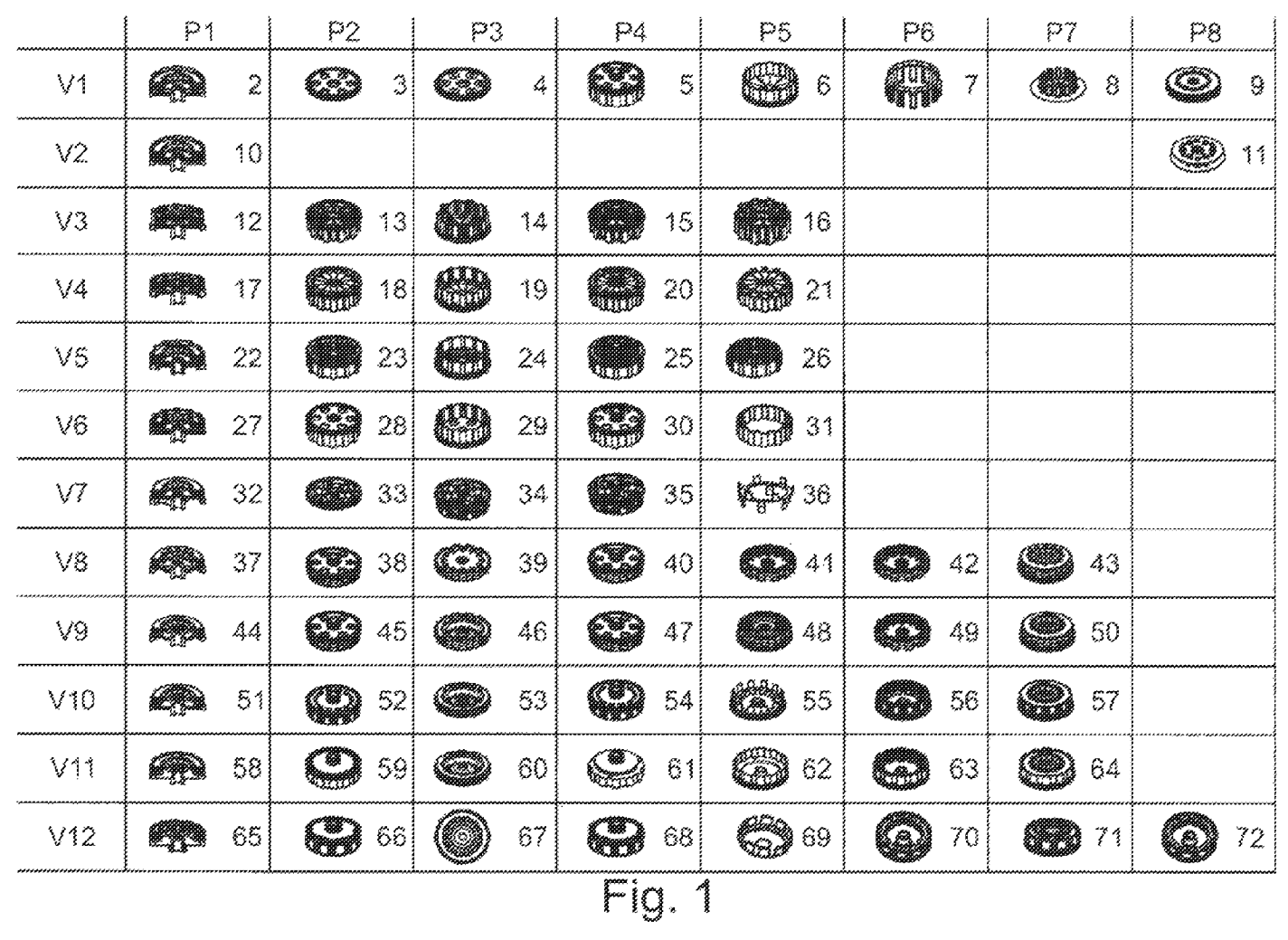

FIG. 1 is a matrix which makes it easier to assign the following figures to different embodiments;

FIGS. 2 through 9 depict embodiment V1 of the wet clutch of the present invention;

FIGS. 10 and 11 depict embodiment V2 of the wet clutch;

FIGS. 12 through 16 depict embodiment V3 of the wet clutch;

FIGS. 17 through 21 depict embodiment V4 of the wet clutch;

FIGS. 22 through 26 depict embodiment V5 of the wet clutch;

FIGS. 27 through 31 depict embodiment V6 of the wet clutch;

FIGS. 32 through 36 depict embodiment V7 of the wet clutch;

FIGS. 37 through 43 depict embodiment V8 of the wet clutch;

FIGS. 44 through 50 depict embodiment V9 of the wet clutch;

FIGS. 51 through 57 depict embodiment V10 of the wet clutch;

FIGS. 58 through 64 depict embodiment V11 of the wet clutch; and,

FIGS. 65 through 72 depict embodiment V12 of the wet clutch.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, my, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Embodiment V1

Figure 2:
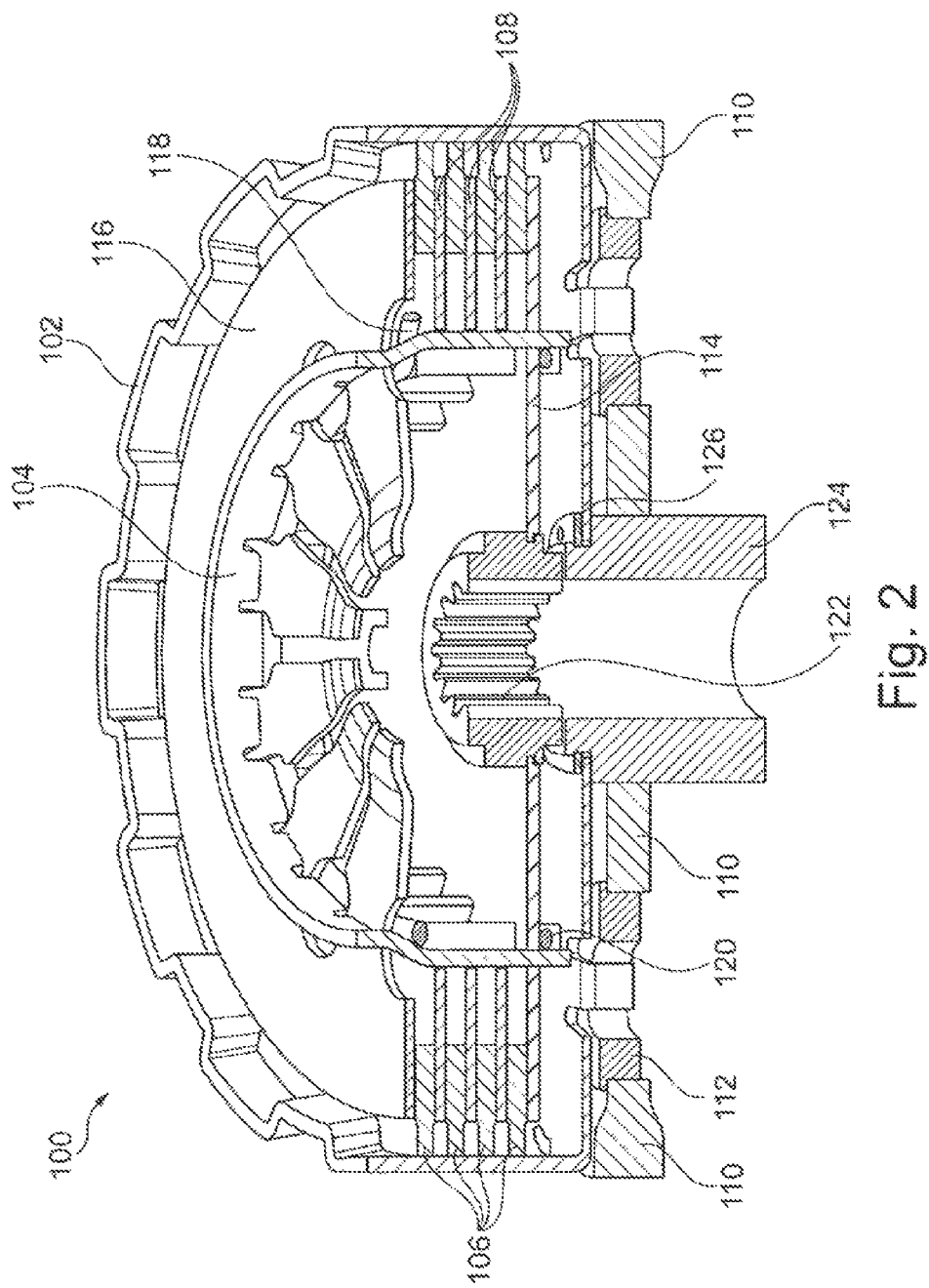

FIG. 2 shows wet clutch 100 for use in a motorcycle, in particular in a lightweight motorcycle having a reciprocating internal combustion engine with one or more cylinders and a cylinder capacity of approximately 170-250 $cm^3$, for example, approximately 200 $cm^3$. Wet clutch 100 includes outer basket 102, inner basket 104, friction disks 106, laminae 108, primary gear 110, shock absorbers 112, floor plate 114, lamellar spring 116, supporting wire 118, closing wire 120, output hub 122, bearing bush 124 and locking ring 126. A torque of a drive engine can be introduced into wet clutch 100 via primary gear 110. A pinion that meshes with primary gear 110 normally sits directly on a crankshaft of the drive engine. Primary gear 110 includes cutouts into which shock absorbers 112, which are designed as elastic elements are introduced. Each shock absorber 112 has an additional cutout, with which a corresponding axial strap of outer basket 102 engages.

A number of friction disks 106 are torsionally engaged with outer basket 102, friction disks 108 however being shiftable in an axial direction in outer basket 102. In the vertical direction, there is lamina 108 located between each two adjacent friction disks 106, laminae 108 being torsionally connected to inner basket 104 such that lamellae 108 can be shifted in the axial direction relative to inner basket 104.

Beneath lowest friction disk 106 is floor plate 114, which is supported on inner basket 104 by means of closing wire 120. Floor plate 114 is torsionally connected to inner basket 104. Above uppermost friction disk 106 is lamellar spring 116, which is likewise torsionally connected to inner basket 104. Lamellar spring 116 is braced against supporting wire 118, which is positioned along an inner circumference of inner basket 104. Radially within inner basket 104, lamellar spring 116 has twelve tongues directed radially inward. If the tongues are moved axially downward, a section of lamellar spring 116 lying radially outside of inner basket 104 is raised; if the tongues are raised, then the section lying outside is lowered. By raising the tongues, friction disks 106 and laminae 108 are compressed axially between lamellar spring 116 and floor plate 114, so that a frictional force between friction disks 106 and laminae 108 or floor plate 114 or lamellar spring 116 is increased, in order to produce a torsional connection between outer basket 102 and inner basket 104.

Floor plate 114 is torsionally connected to output hub 122, which has inner toothing, in order to deliver torque from inner basket 104. The delivery normally takes place at a primary shaft of a transmission, for example, a centrifugally-controlled automatic transmission or a shiftable multiple-speed spur gear transmission.

Primary gear wheel 110 has a recess in the area of its axis of rotation, in which bearing bush 124 is accommodated. Bearing bush 124 extends further downward through a coaxial cutout in the floor section of outer basket 102. The cutout in outer basket 102 has a smaller diameter than that in primary gear wheel 110, and bearing bush 124 accordingly has a shoulder, which constitutes the upper limit of an axial position of bearing bush 124. On a section of bearing bush 124 which extends through the cutout in the floor section of inner basket 104, a radially encircling groove is formed, with which locking ring 126 engages in order to prevent bearing bush 124 from falling out downward. In combination with the described shoulder, the axial position of bearing bush 124 relative to outer basket 102 is thus fixed in both directions.

Figure 3:
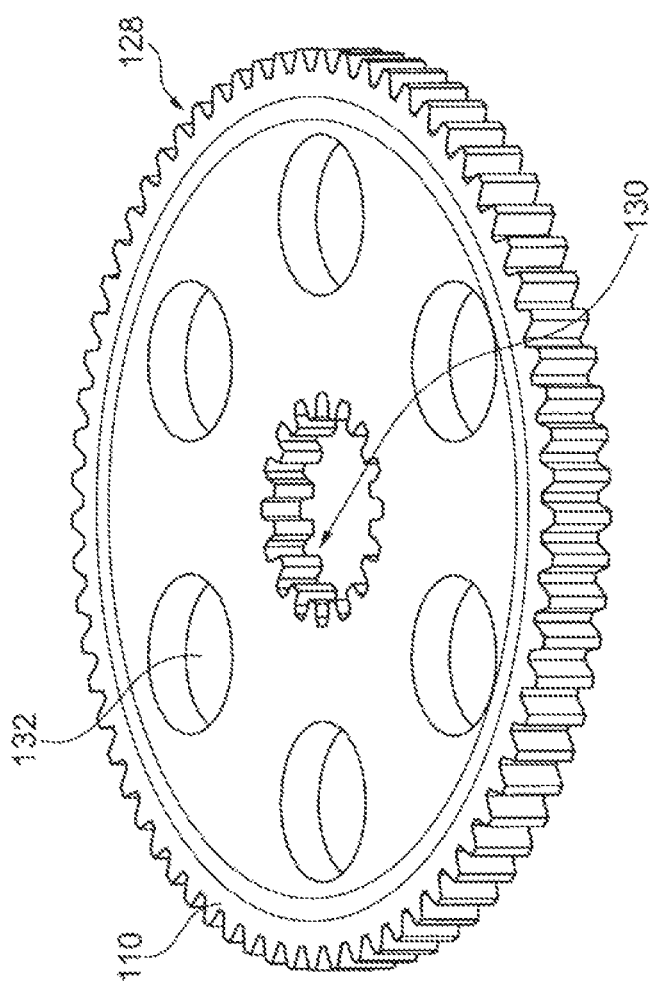

FIG. 3 shows primary gear wheel 110 from FIG. 1. Primary gear wheel 110 is preferably made of steel, and may be produced by means of any known fabrication methods, such as forming, reshaping or machining. Primary gear wheel 110 has external toothing 128, internal toothing 130 and six axial receptacles 132, which are distributed uniformly over a circumference around the axis of rotation of primary gear wheel 110. Teeth 128 and 130 can be produced by any known fabrication method such as milling, eroding or broaching.

External toothing 128 is set up to mesh with a pinion of a drive engine. Internal toothing 130 is set up for the torsional reception of bearing bush 124. Alternatively, the torsional connection may also be brought about by a different type of connection, such as by caulking, wedging, welding or shrink-fitting. Receptacles 132 are set up to receive shock absorbers 112; receptacles 132 may also have a different shape than the circular form shown.

Figure 4:
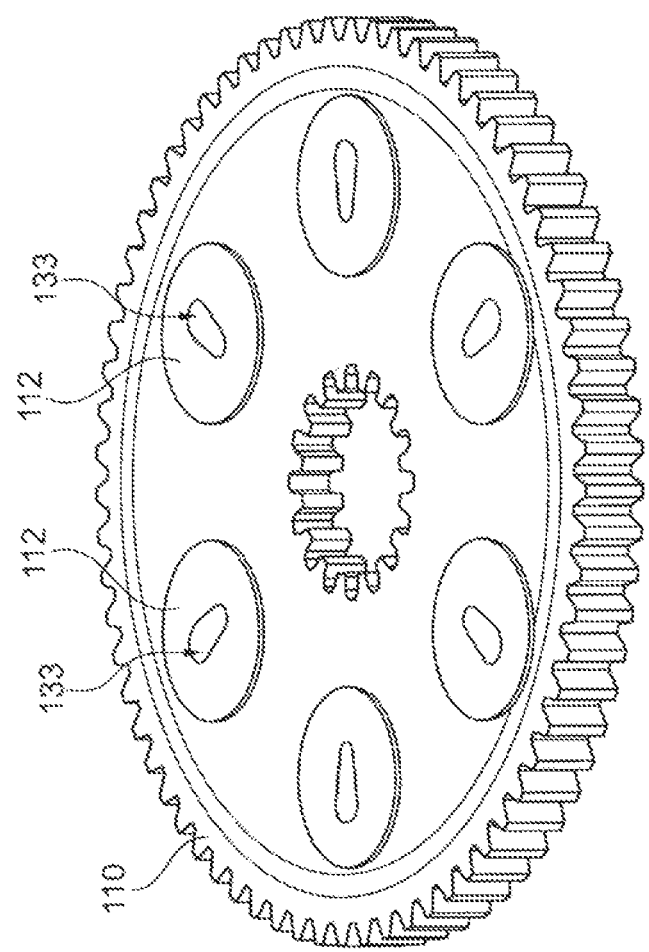

FIG. 4 shows primary gear wheel 110 with shock absorbers mounted. Otherwise, the depiction corresponds to that in FIG. 3. Shock absorbers 112, for their part, have receptacles 133, which are essentially drop-shaped, with narrow ends directed radially inward.

Figure 5:
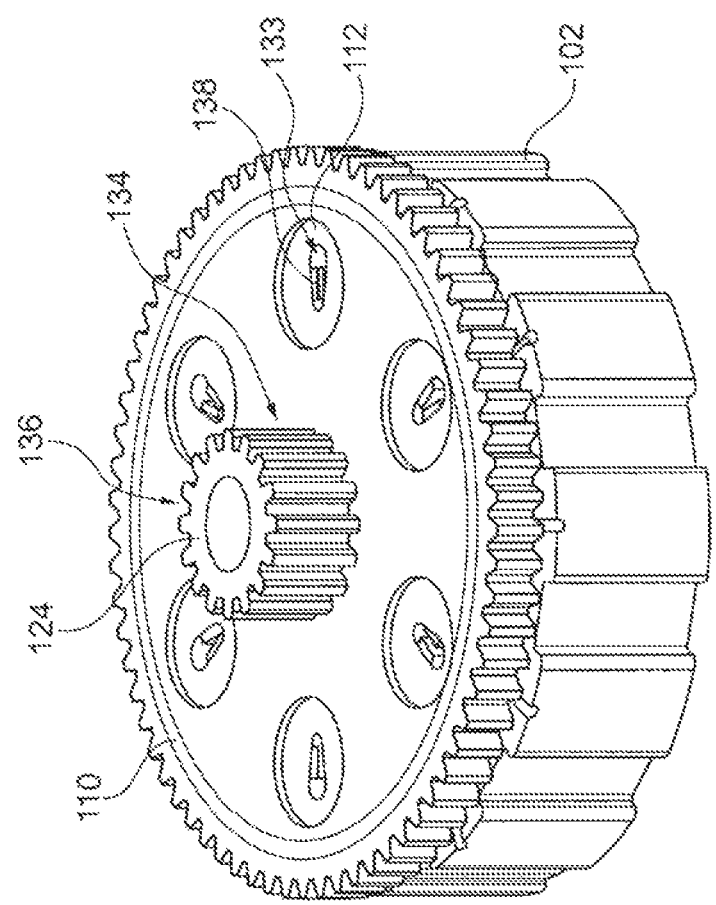

FIG. 5 shows primary gear wheel 110 with mounted shock absorbers 112 from FIG. 4, with outer basket 102 and bearing bush 124 additionally attached. In contrast to the depiction in FIG. 2, bearing bush 124 faces upward instead of downward. In addition, bearing bush 124 carries external toothing 134, which is intended to engage with a pinion of a starter device. The starter device may include in particular a foot pedal, which may act on starter gear 136 by means of an engaging device and/or an intermediate gear set. In another embodiment, a pinion of an electric starter may also engage with external toothing 134 of bearing bush 124. Bearing bush 124 together with external toothing 134 will be referred to hereinafter as starter gear 136.

Outer basket 102 is made from a sheet metal material, for example, by roller processing. Furthermore, six straps 138 are formed by bending from the sheet metal material of outer basket 102, which are accommodated in receptacles 133 of shock absorbers 112. In the depicted embodiment, straps 138 are duplicated in each case, so that there are always two straps 138 located in one receptacle 133.

Figure 6:
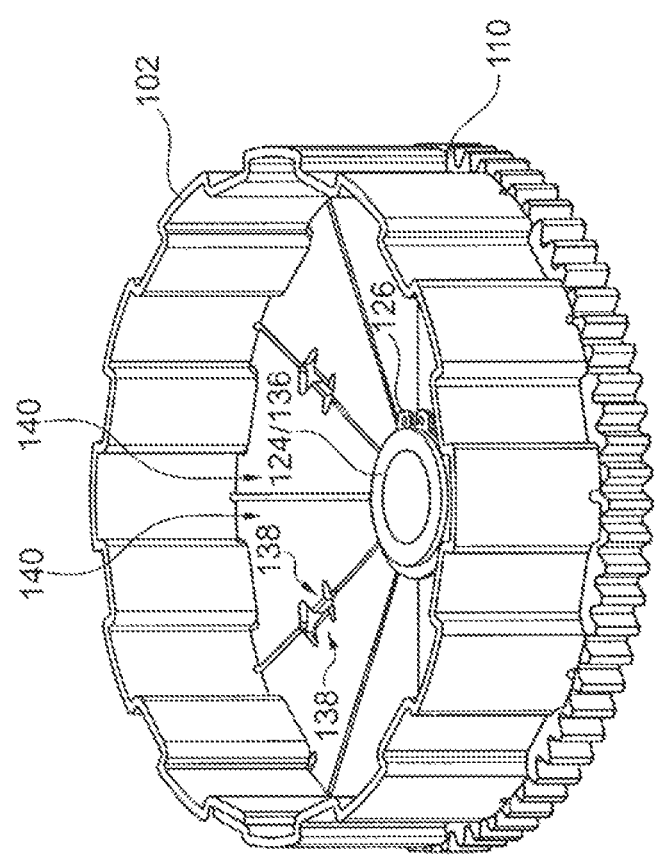

FIG. 6 shows the sub-assembly from FIG. 5 from an upside-down perspective. Twelve webs 140 are bent inward radially by 90° from the sheet metal material which forms the radial delimitation of outer basket 102. Each web 140 has essentially the form of a piece of pie or pizza. On each of webs 140 one of straps 138 is formed, which is shaped as shown in FIGS. 2 and 5 by bending downward by 90°. The points of webs 140 pointing radially inward fit radially against bearing bush 124 or starter gear 136, as shown in FIG. 2. Locking ring 126 secures bearing bush 124 against falling out downward, if necessary.

Figure 7:
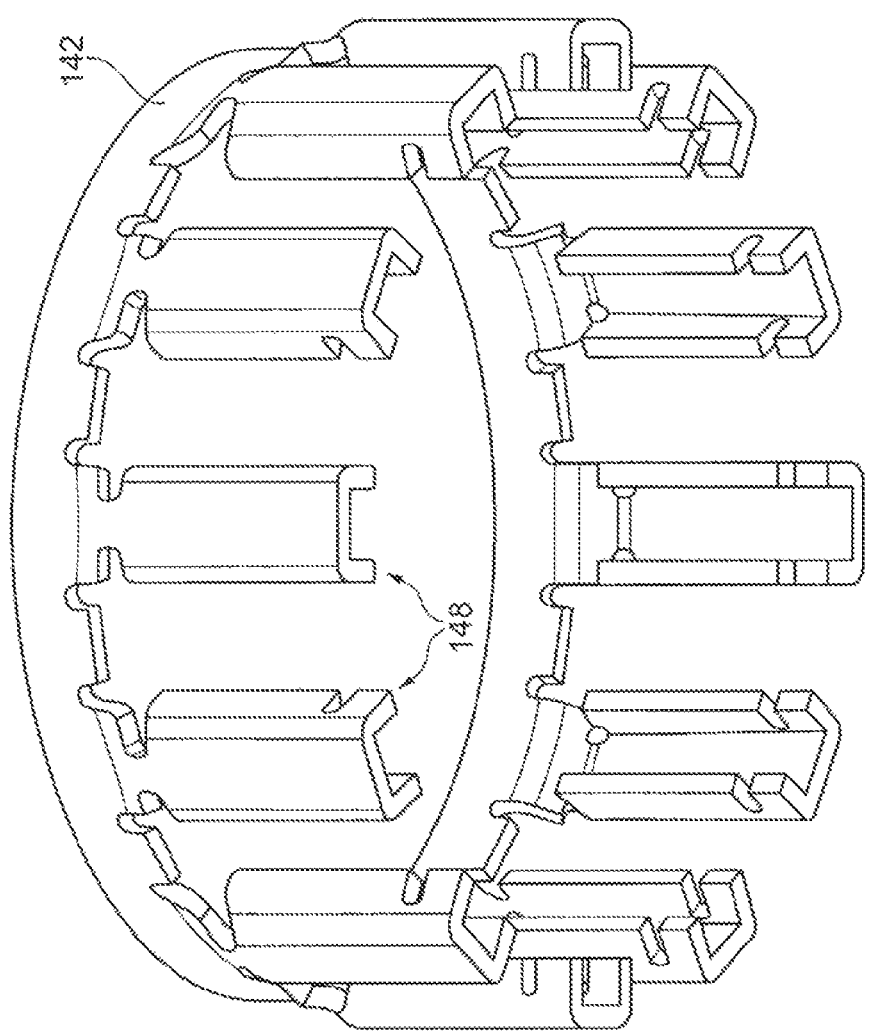

FIG. 7 shows inner carrier 142, which represents an essential element of inner basket 104 which is shown in FIG. 2.

Inner carrier 142 is likewise made from sheet metal, for example, by roller processing. Inner carrier 142 serves to drive or support laminae 108. Moreover, lamellar spring 116 is supported on inner carrier 142, so that inner carrier 142 serves as a bearing point of lamellar spring 116 and furthermore to brace the clamping force and disengaging force of wet clutch 100. In addition, lamellar spring 116 is centered over inner carrier 142 in the radial direction.

Inner support 142 includes ring-shaped upper section 144, out of which twelve U-shaped profiles 148 point axially downward. Profiles 148 are open radially downward, and include cutouts for supporting wire 118 and closing wire 120 from FIG. 2.

Figure 8:
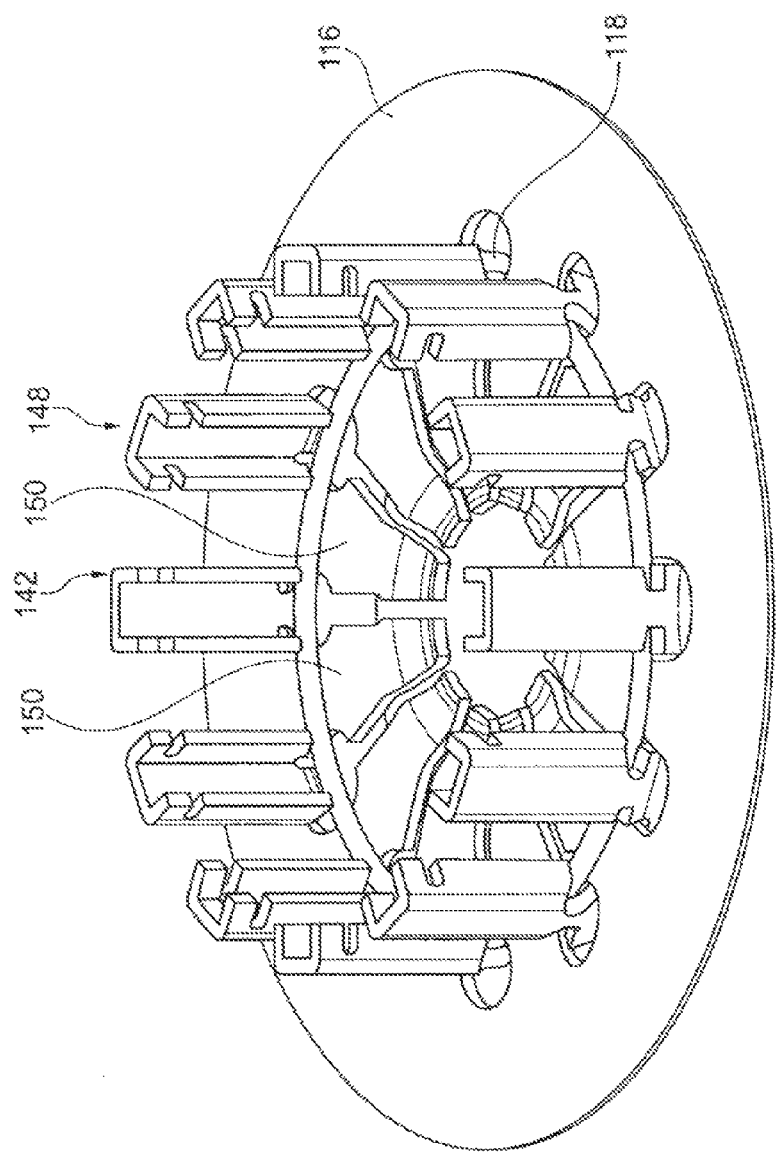

FIG. 8 shows inner carrier 142 from FIG. 7 together with lamellar spring 116 and supporting wire 118 in an upside-down perspective. Lamellar spring 116 can be produced from a sheet metal part, for example, by bending, stamping or other known types of processing. Similar to outer basket 102, lamellar spring 116 has twelve webs 150 pointing radially inward. Webs 150 extend on the inner surface of a circumference on which profiles 148 lie. On the outer surface of this circumference lamellar spring 116 is solidly formed. Webs 150 are bent in an S-shape in the axial direction.

Figure 9:
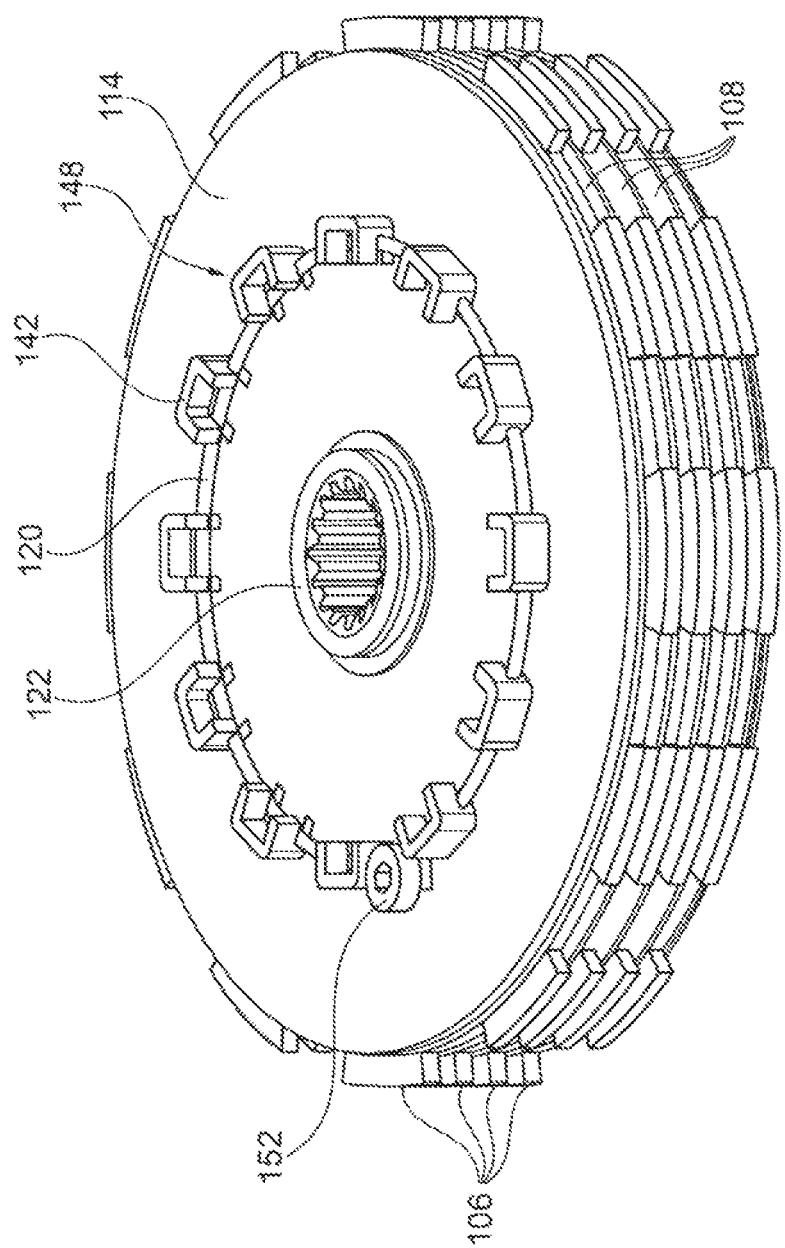

FIG. 9 shows the sub-assembly depicted in FIG. 8, friction disks 106 and laminae 108 as well as closing wire 120 being assembled in addition. Closing wire 120 runs through the provided cutouts of U-shaped profiles 148 of inner carrier 142, and secures stack of friction disks 106 and laminae 108 against falling out upward. Closing wire 120 is bent radially upward at both of its ends, and screw 152 secures closing wire 120 at this point against unintended loosening. Screw 152 is screwed into a recess having external threading in floor plate 114.

Embodiment V2

Embodiment V2 is based on embodiment V1, and differs essentially in the attachment of floor plate 114 to inner carrier 142. The rest of the features named above in reference to embodiment V1 are unchanged.

FIG. 10 shows wet clutch 100 of embodiment V2 in a view corresponding to FIG. 2.

FIG. 11 shows the attachment of floor plate 114 to inner carrier 142. The cutouts in U-shaped profiles 148 of inner carrier 142, which receive closing wire 120 in embodiment V1 (see FIG. 9), are changed in embodiment V2 in such a way that floor plate 114 can be set on profiles 148 and rotated around the axis of rotation of wet clutch 100 so that an axial securing of floor plate 114 on inner carrier 142 develops. Floor plate 114, and in particular, its U-shaped cutouts to receive profiles 148, do not differ from those of embodiment V1. Depending on the design of the cutouts on profiles 148 of inner carrier 142, floor plate 114 is secured on inner carrier 142 by turning it clockwise or counter-clockwise.

To secure floor plate 114 against twisting, and thus, against loosening of the axial securing on inner carrier 142, six screws 152 are provided, which are screwed into the corresponding threading of floor plate 114. Screws 152 are positioned so that a head of each screw 152 engages partially with the radial opening of assigned U-shaped profile 148. There are six screws 152 provided, which engage with every second one of profiles 148. In other embodiments, more or fewer screws 152 may also be provided, in which case screws 152 are distributed uniformly around a circumference of floor plate 114.

Embodiment V3

Embodiment V3 is based on embodiment V1, and differs from the latter essentially in the toothing of outer basket 102, the additional structure and producibility of outer basket 102, and shock absorbers 112.

Figure 12:
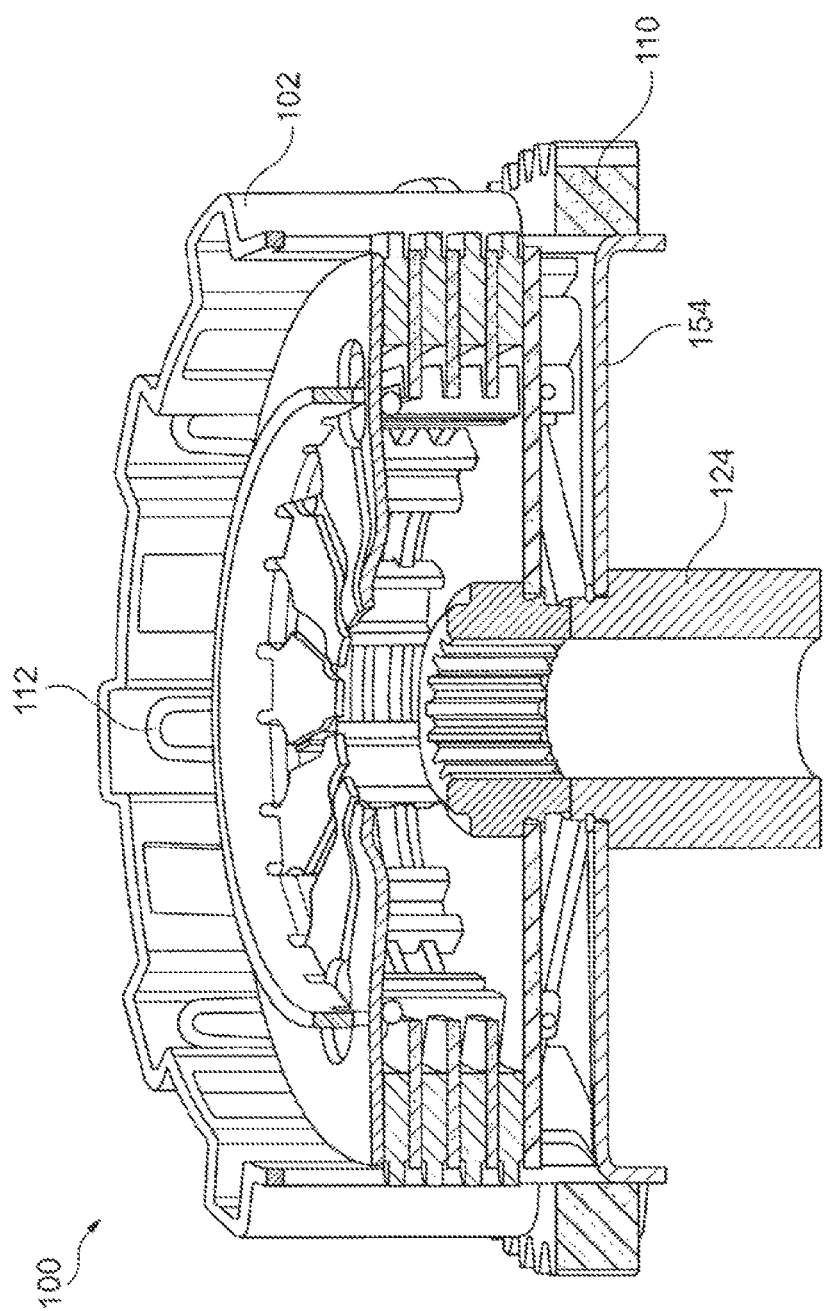

FIG. 12 shows wet clutch 100 in a depiction corresponding to FIG. 2. It differs from the latter in that primary gear wheel 110 is designed as a ring gear, a torsional connection of ring gear 110 to outer basket 102 being produced by a positive lock with the meandering external profile of outer basket 102.

A floor section of outer basket 102 is formed by ten webs 154, which extend radially inward as far as bearing bush 124. Shock absorbers 112 are implemented by twelve U-shaped spring elements, which make an elastic transfer of torque possible between ring gear 110 and outer basket 102.

Figure 13:
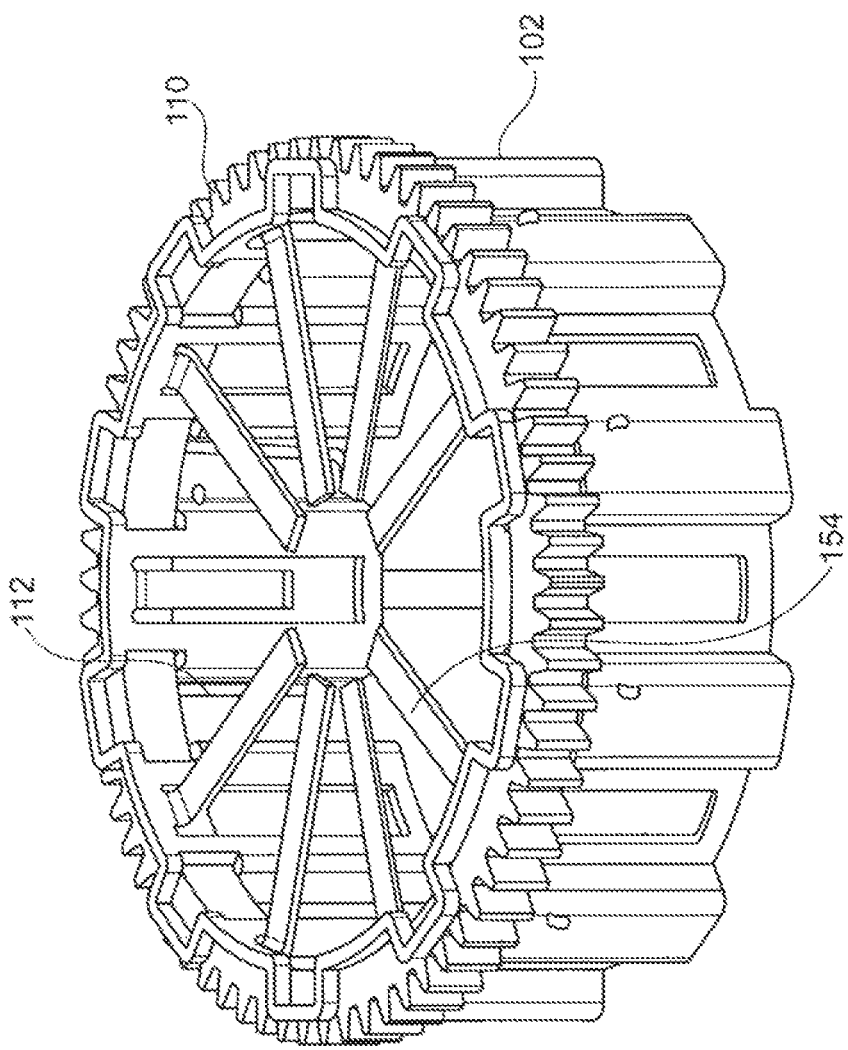

FIG. 13 shows outer basket 102 with ring gear 110 and shock absorbers 112. In reference to the depiction in FIG. 12, the depicted sub-assembly is turned upside-down. Outer basket 102 can be produced from a sheet metal material, for example, by roller processing. Ten radial webs 154 are made by bending corresponding straps of the sheet metal material of outer carrier 102 radially inward by 90°. Between every two adjacent webs 154 is a radial protrusion to receive friction disks 106 torsionally on outer basket 102. The number of protrusions and webs 154 may vary; however, there may also be twelve of them, as in embodiment V1.

Shock absorbers 112 lie in the radial protrusions of outer basket 102, and extend in an essentially axial direction. One leg of each shock absorber 112 extends straight upward, and is received in one of the corresponding axial cutouts of ring gear 110. The other leg is somewhat shorter in the axial direction, and is bent radially outward by 90° in order to engage with a corresponding radial cutout in outer basket 102. The end section of shock absorber 112 can be bent back again outside of outer basket 102 to secure it against falling out, for example, downward by 90°, as depicted in FIG. 13.

Shock absorbers 112 allow the spring-loaded turning of the ring gear contrary to outer basket 102. The turning of ring gear 110 in the depiction in FIG. 13 counter-clockwise is limited by the fact that a section of the sheet metal material of outer basket 102 bent radially outward strikes the longer leg of shock absorber 112. In the other direction of rotation, the turning is limited by the fact that the legs of shock absorber 112 strike each other. For example, the depicted embodiment of shock absorber 112 is used in such a way that ring gear 110 is turned in the clockwise direction when a normal transfer of force occurs, that is, from the drive engine to the transmission instead of the opposite direction.

Figure 14:
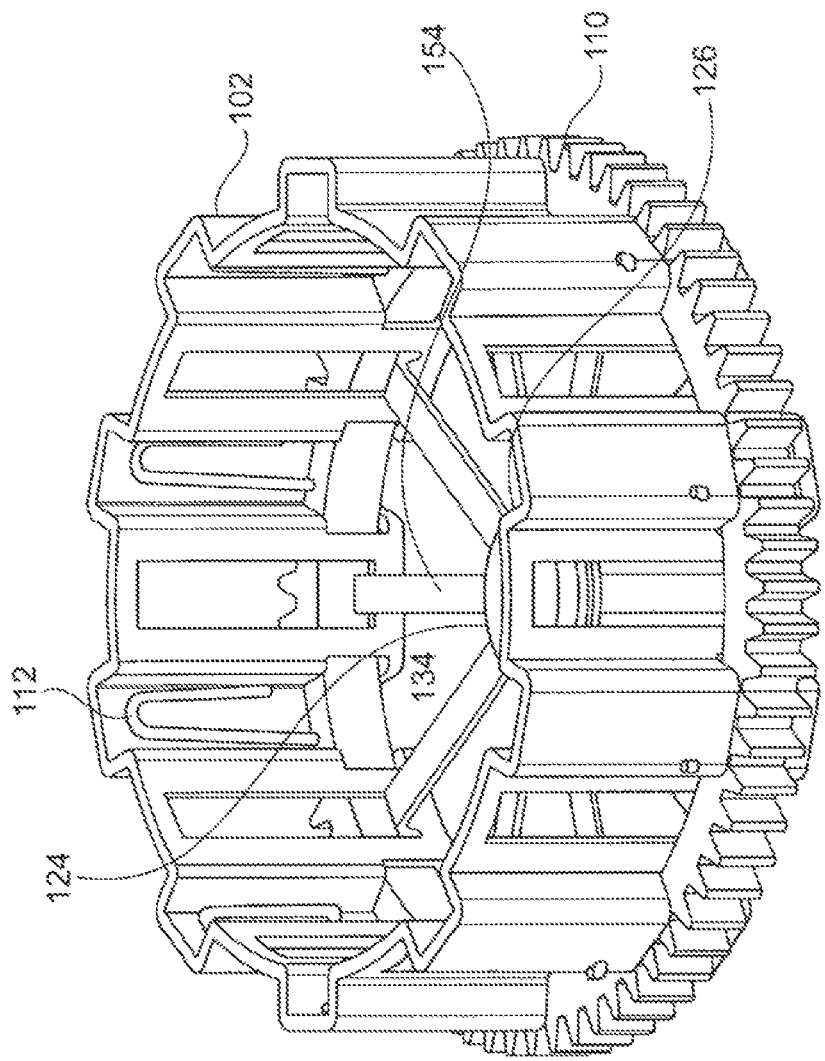

FIG. 14 shows the sub-assembly from FIG. 13 together with bearing bush 124 or starter gear 136, from a perspective corresponding to that of FIG. 12.

Starter gear 136 or bearing bush 124 is secured on outer basket 102 against falling out axially by means of locking ring 126.

Figure 15:
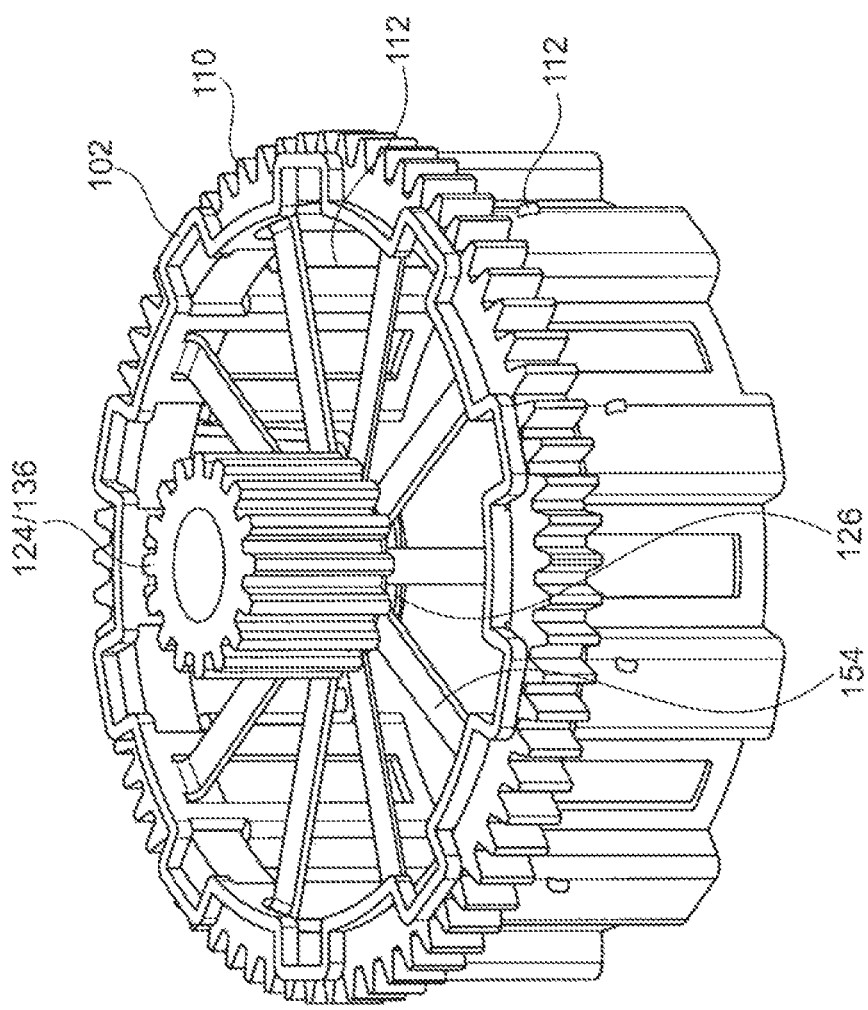

FIG. 15 shows the sub-assembly from FIG. 14 from a perspective corresponding to that of FIG. 13.

Figure 16:
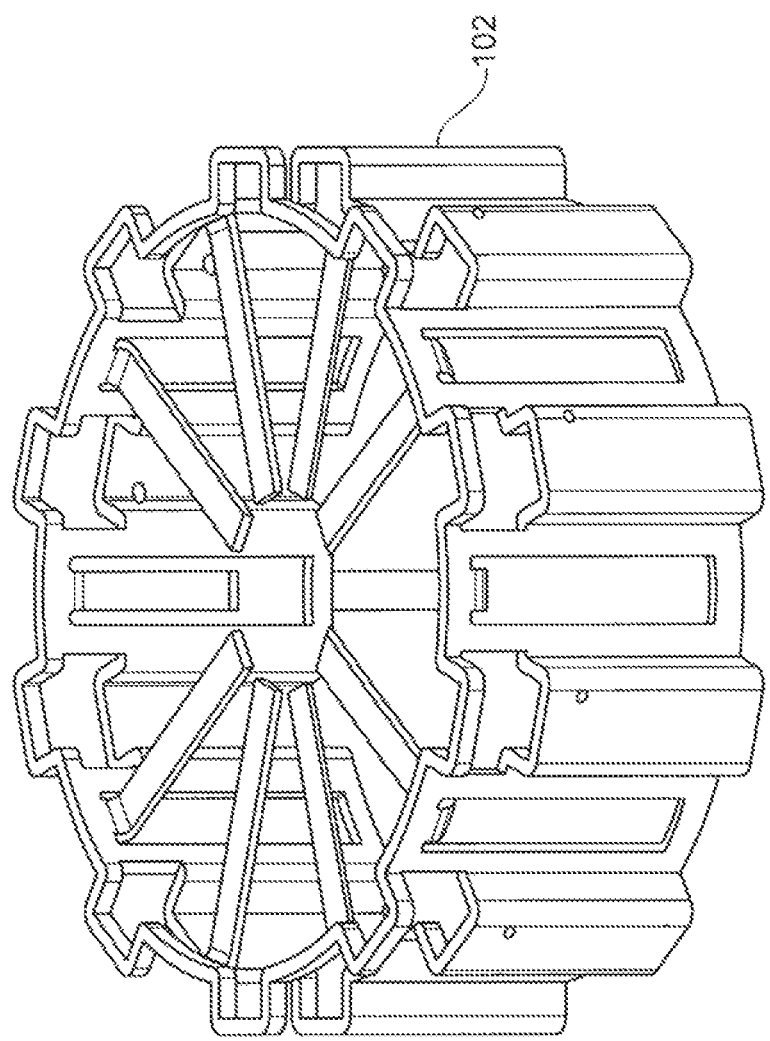

FIG. 16 shows outer basket 102 without additional structural components, from a perspective corresponding to those of FIGS. 13 and 15.

Embodiment V4

Embodiment V4 is based on embodiment V3. The two embodiments differ essentially in the fact that the floor section of outer basket 102 is similar in design to embodiment V1. The other features correspond to those of embodiment V3.

Figure 17:
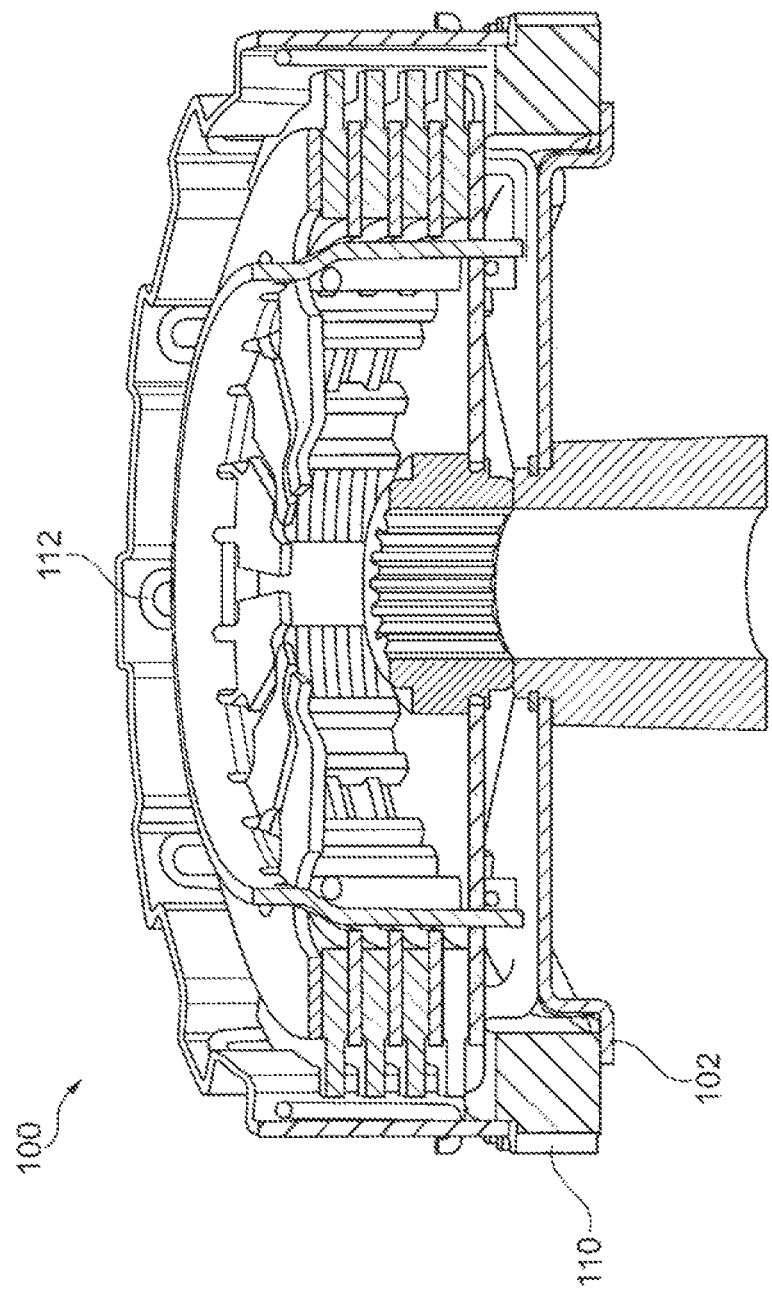

FIG. 17 shows wet clutch 100 in a depiction corresponding to FIG. 12. The floor section of outer carrier 102 is formed by a number of webs bent radially inward, as described above in reference to FIG. 6. Ring gear 110 is connected positively to outer basket 102, as explained above in reference to FIG. 12.

Figure 18:
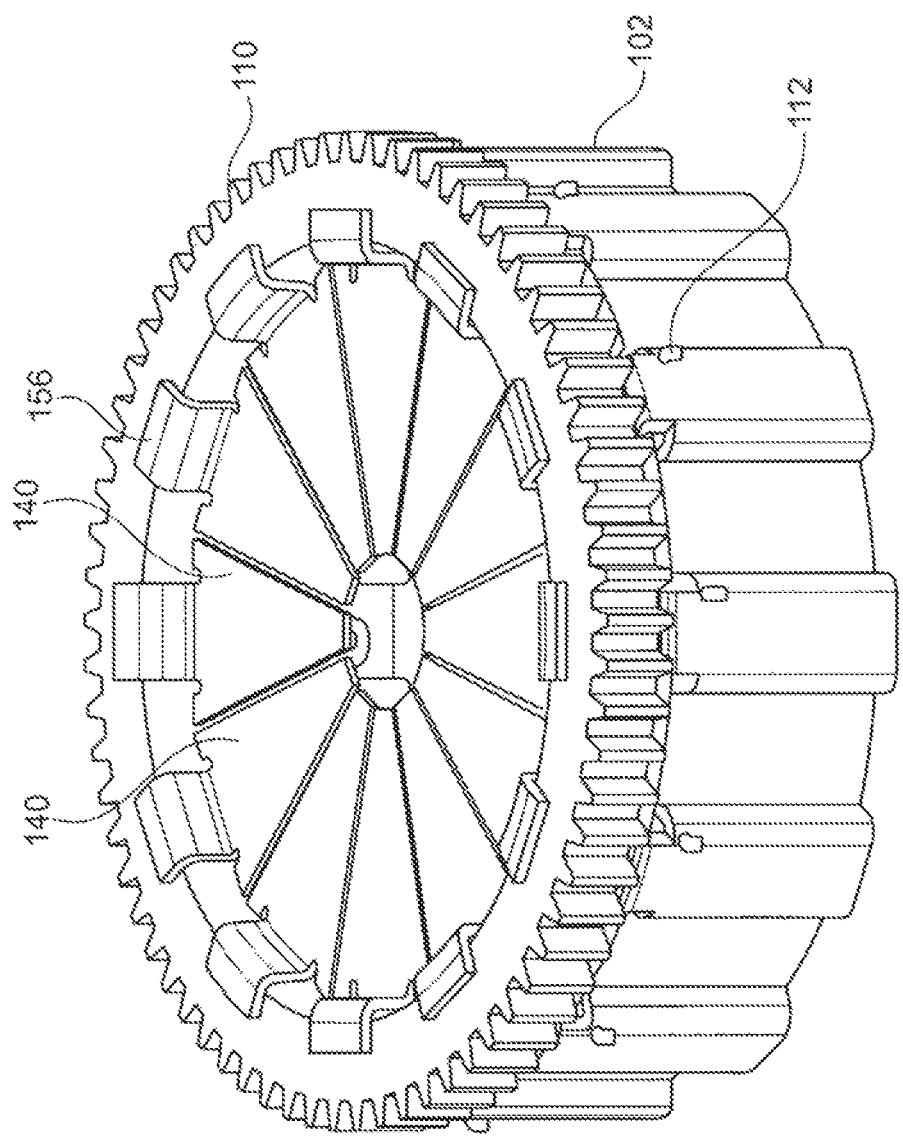

FIG. 18 shows outer basket 102 with spring elements 112 and ring gear 110 of FIG. 17 from a perspective corresponding to that of FIG. 13. Twelve webs 140 pointing radially inward are provided, although other numbers, for example ten, are also possible. Ring gear 110 is formed by a number of straps 156, which are formed from the sheet metal material of outer basket 102, held upward in the axial direction. Straps 156 are bent outward by 90° after ring gear 110 has been attached to outer basket 102.

Figure 19:
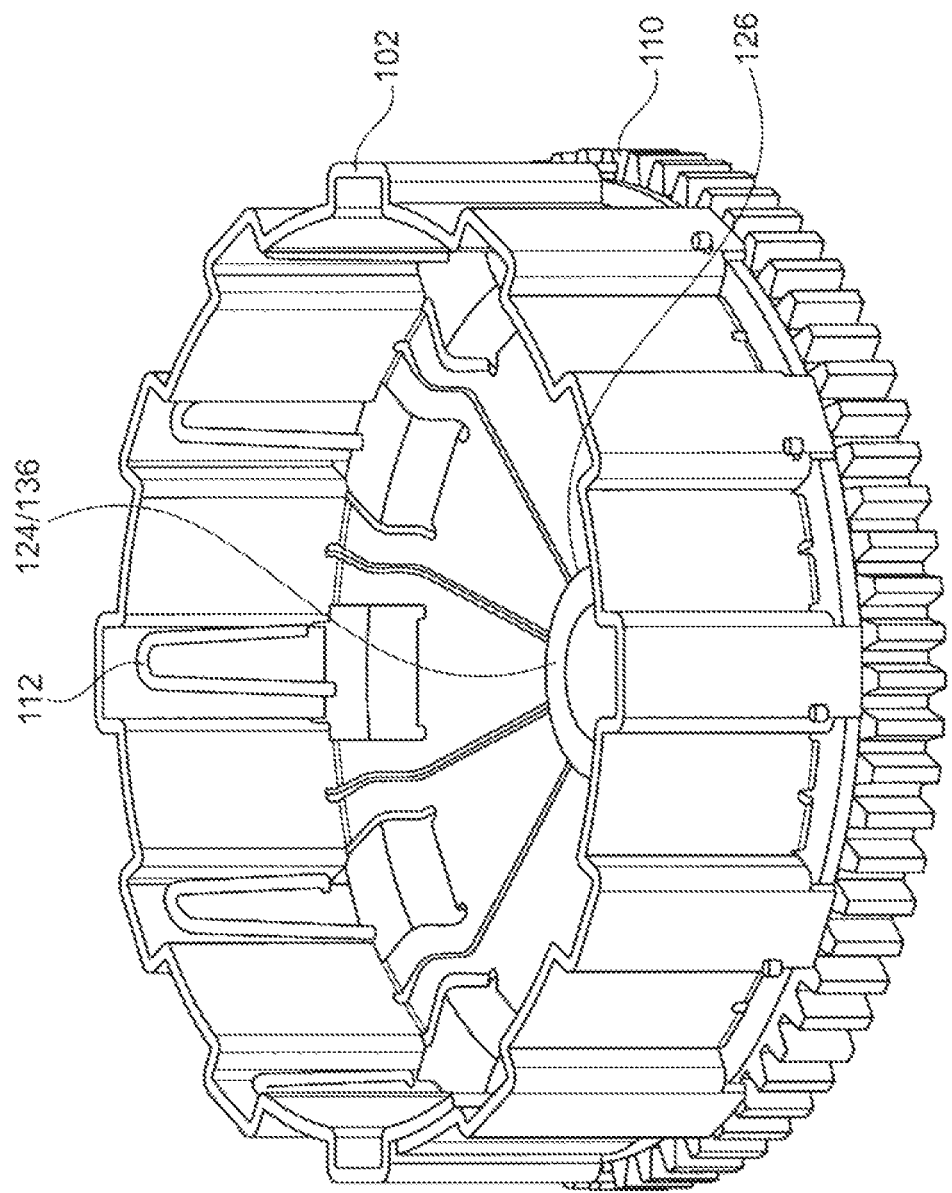

FIG. 19 shows the sub-assembly from FIG. 18 from a perspective corresponding to that of FIG. 17. In addition, bearing bush 124 or starter gear 136 is attached, and secured in the axial direction by means of locking ring 126.

Figure 20:
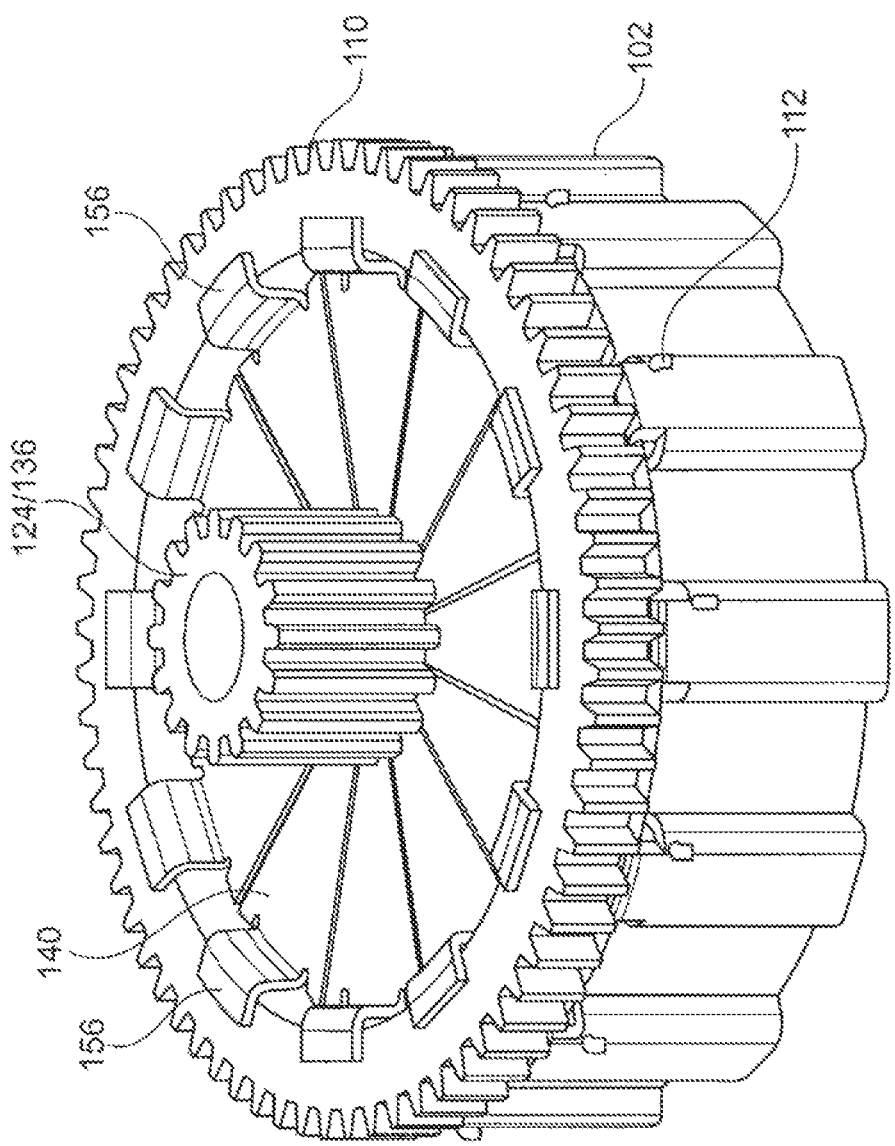

FIG. 20 shows the sub-assembly from FIG. 19 from a perspective corresponding to that of FIG. 18.

Figure 21:
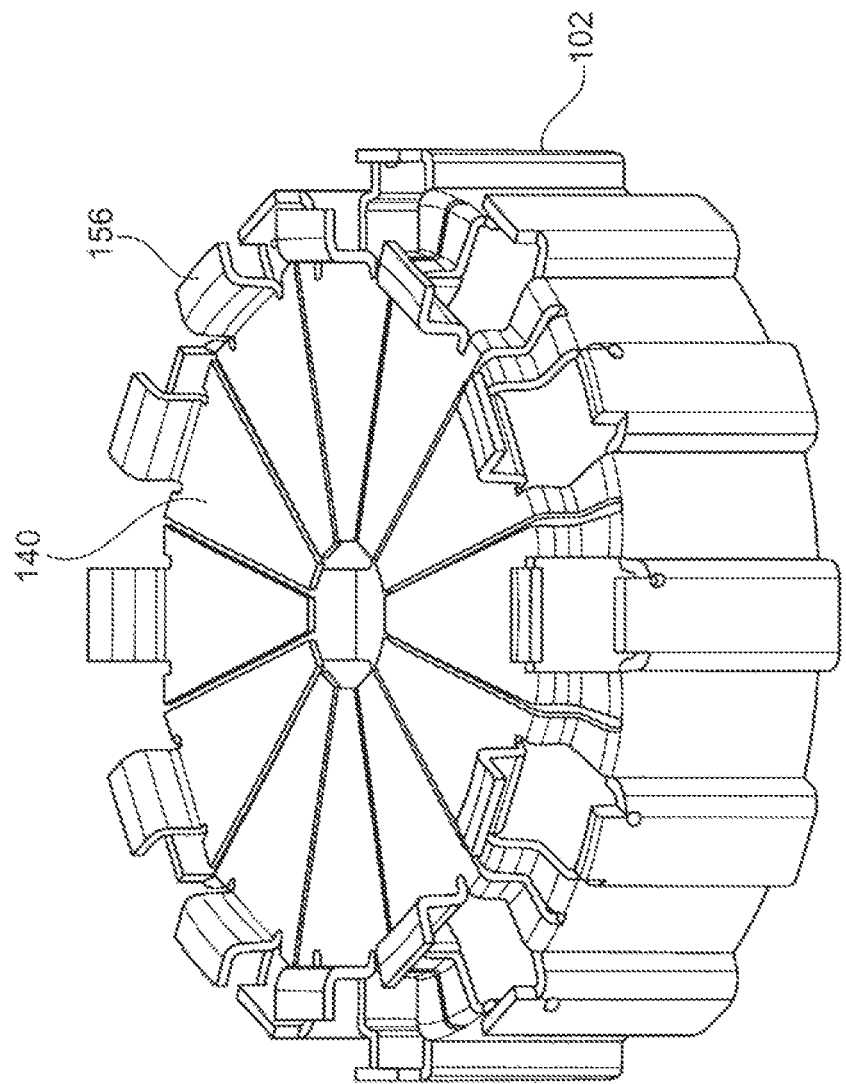

FIG. 21 shows outer basket 102 from FIG. 20 without additional structural components.

Embodiment V5

Embodiment V5 is based on embodiment V3. Essential differences pertain to a design of shock absorbers 112 and an attachment of ring gear 110 to outer basket 102.

Figure 22:
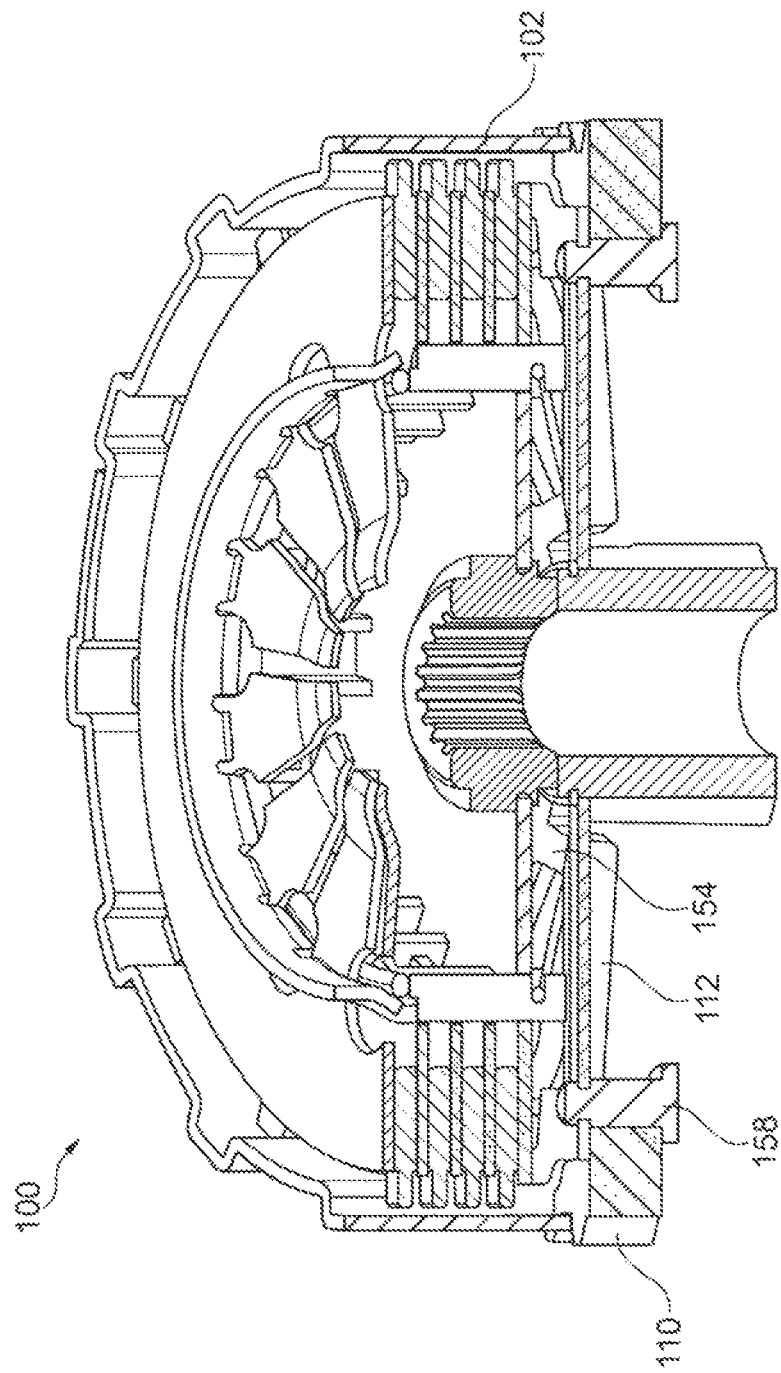

FIG. 22 shows wet clutch 100 corresponding to the depiction of FIG. 12. Ring gear 110 is joined to outer basket 102 by means of a number of rivets 158. A floor section of outer basket 102 is made from webs 154 of FIG. 13. Shock absorbers 112 are likewise realized in the floor region of outer basket 102 by sheet metal strips running essentially radially, which engage radially on the outside with ring gear 110.

Figure 23:
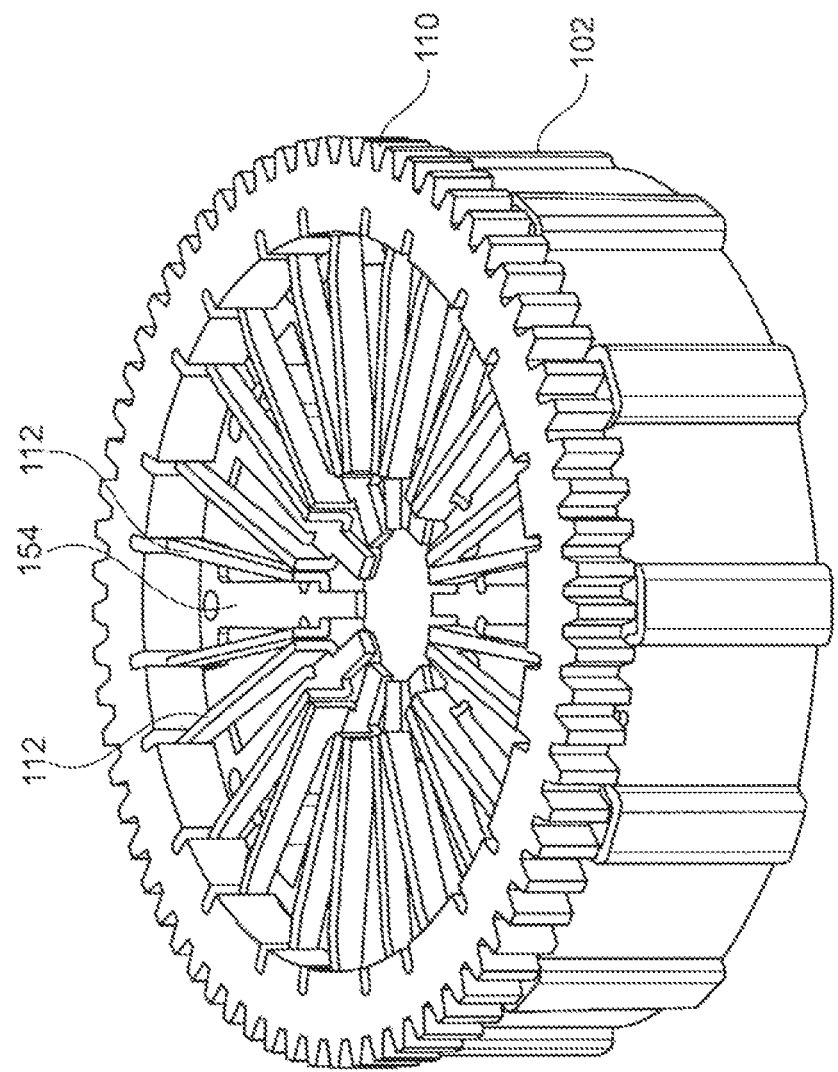

FIG. 23 shows outer basket 102 with ring gear 110 from a perspective corresponding to that of FIG. 13.

Each web 154 consists of a sheet metal strip, which is produced from the sheet metal material of outer basket 102 by bending it radially inward by 90°. From a radially inner section of each web 154 two sheet metal strips run radially outward, which stand essentially perpendicular on the sheet metal strip of web 154. The additional sheet metal strips form shock absorber 112, The sheet metal strips of shock absorber 112 engage at radially outer ends with corresponding grooves, which are formed in the axial direction on an inner circumference of ring gear 110. This enables ring gear 110 to rotate with respect to outer basket 102 in a measure allowed by the bending of shock absorbers 112.

To produce outer basket 102, the sheet metal strips of shock absorber 112 are formed in reference to the sheet metal strips of webs 154, before webs 154 are bent radially inward.

Figure 24:
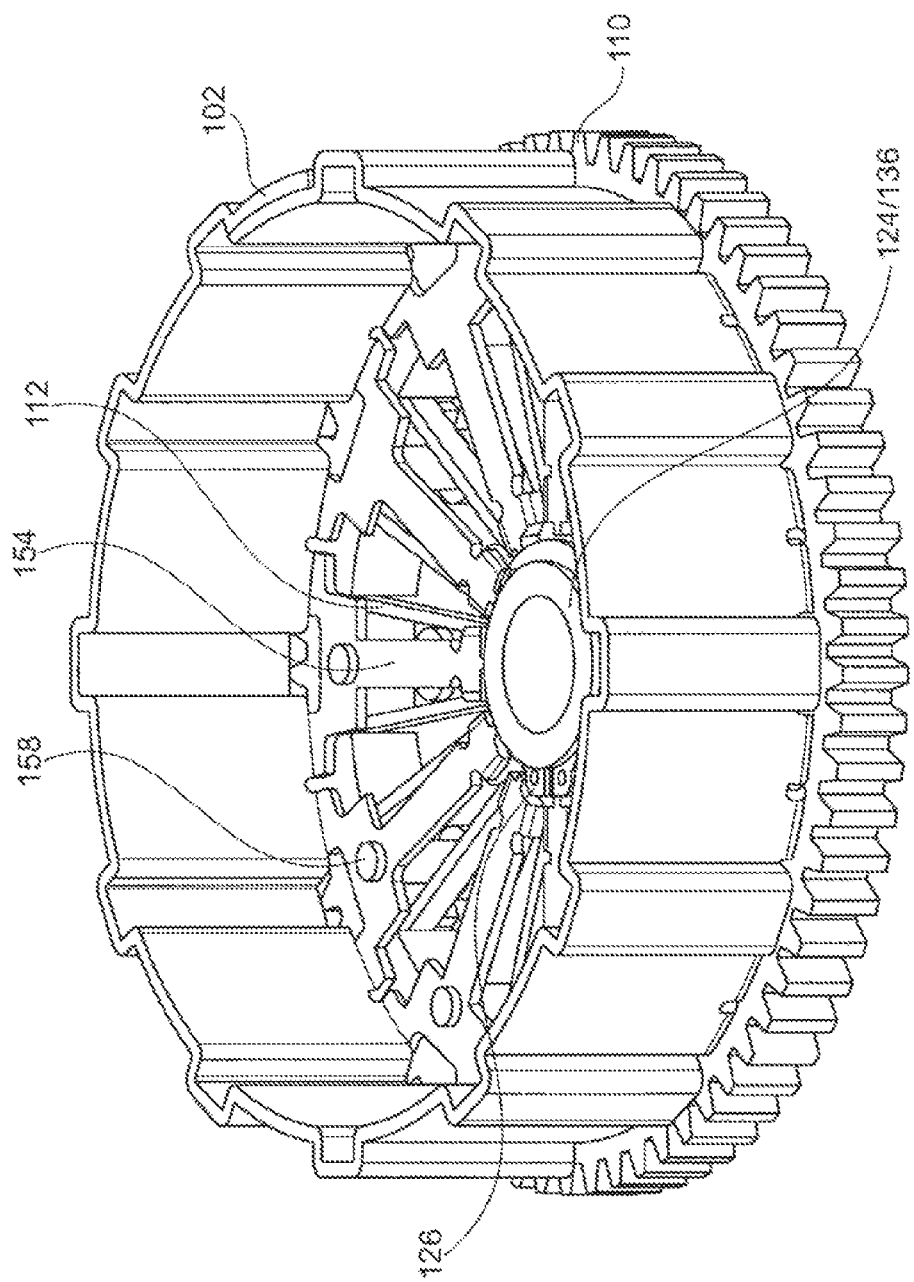

FIG. 24 shows the sub-assembly from FIG. 23 together with a number of rivets 158, bearing bush 124 or starter gear 136, and locking ring 126, from a perspective corresponding to that of FIG. 22.

Ring gear 110 is fastened on the lower part of outer basket 102 by means of rivets 158.

Figure 25:
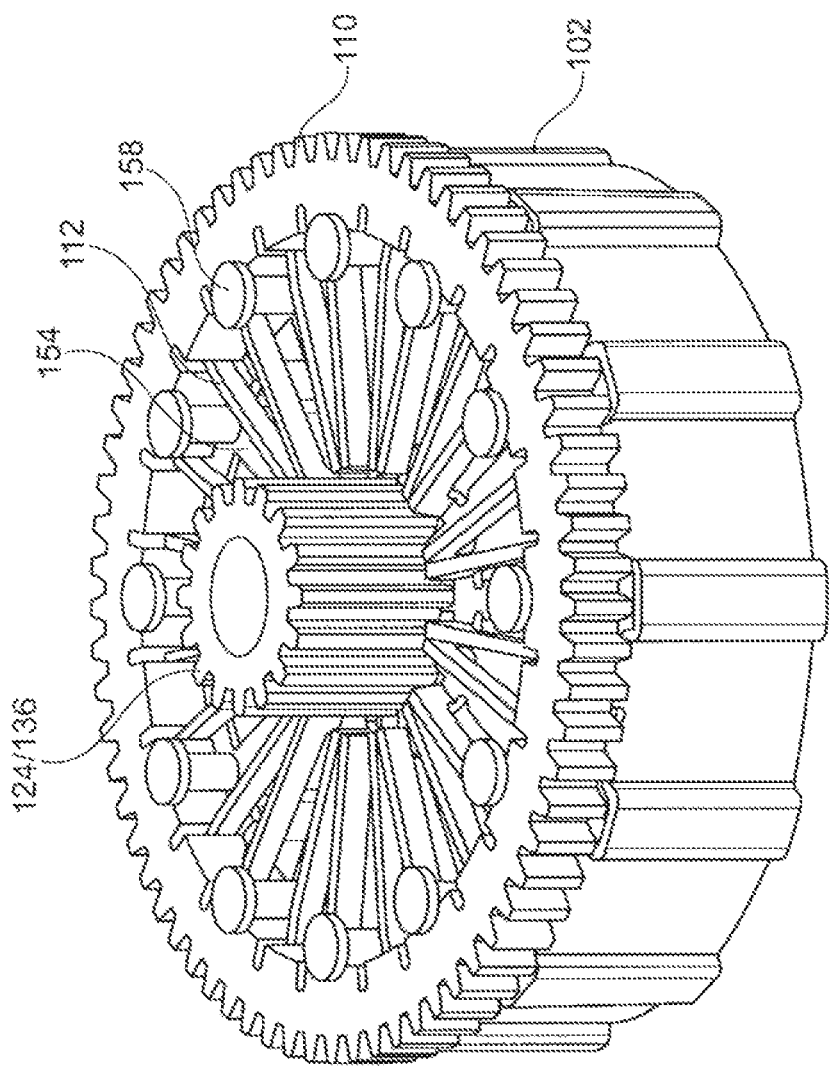

FIG. 25 shows the sub-assembly from FIG. 14 in a perspective corresponding to that of FIG. 23. Rivets 158 center ring gear 110 in reference to outer basket 102. In addition, rivets 158 limit a torsional angle between ring gear 110 and outer basket 102.

Figure 26:
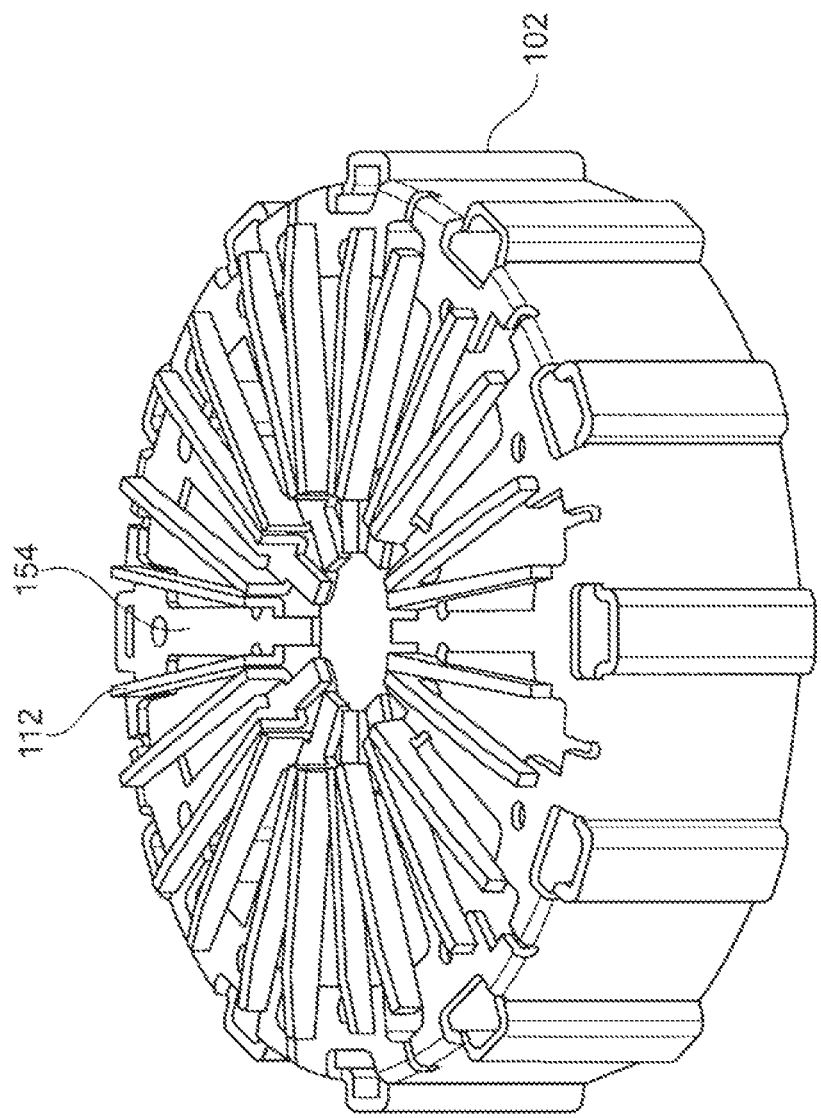

FIG. 26 shows outer basket 102 without additional elements in a perspective corresponding to that of FIG. 25.

Embodiment V6

Embodiment V6 is based on embodiment V3, however primary gear wheel 110 is designed similar to that in embodiment V1.

Figure 27:
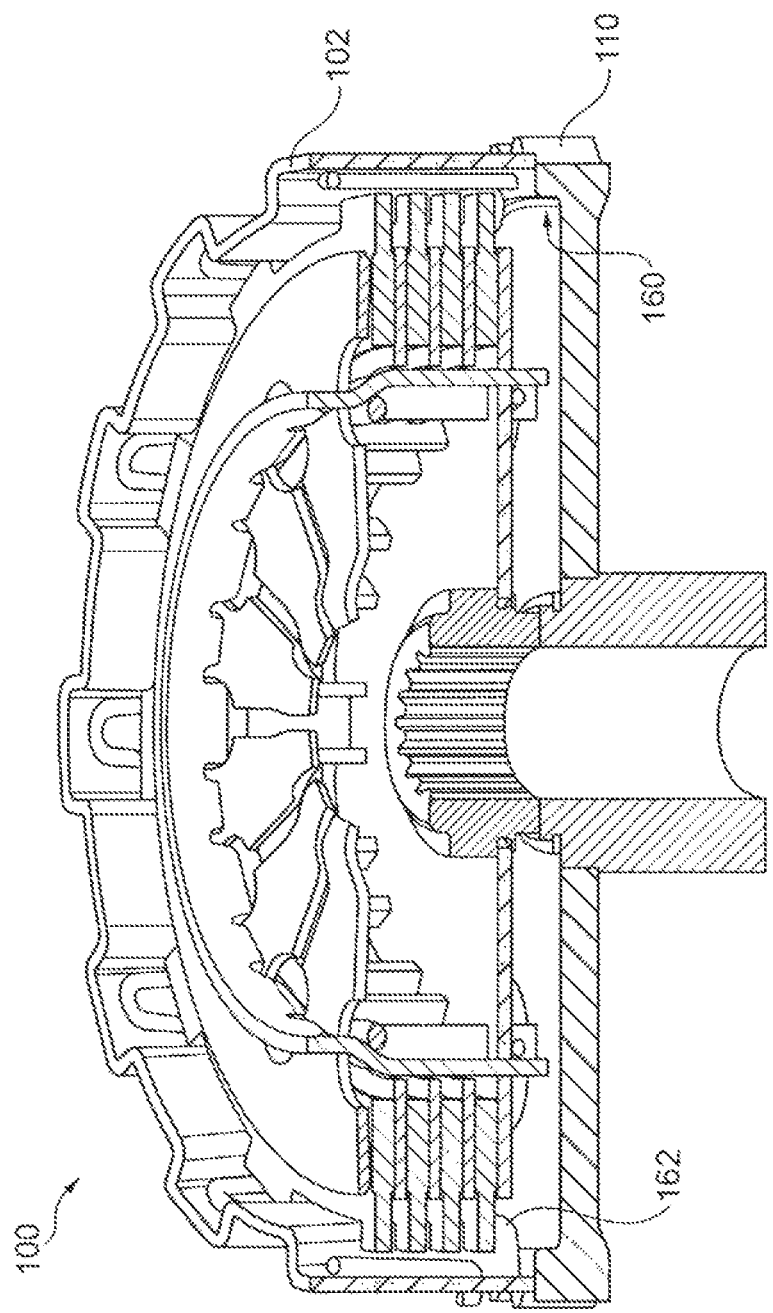

FIG. 27 shows wet clutch 100 in a depiction corresponding to that of FIG. 12. Instead of ring gear 110, primary gear wheel 110 corresponding to FIG. 2 is provided. In an outer gear region, primary gear wheel 110 has shoulder 160, with which axial centering webs 162 engage, which are formed in a radial outer region of outer basket 102.

Figure 28:
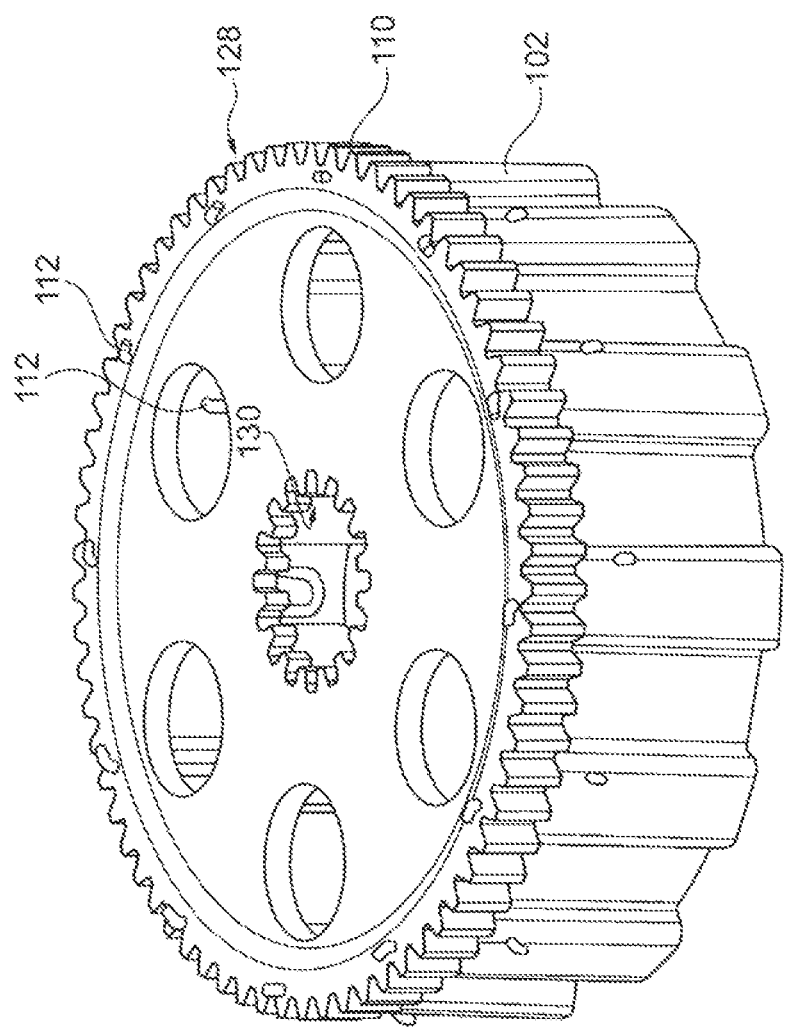

FIG. 28 shows outer basket 102 with primary gear wheel 110 and shock absorbers 112, in a perspective corresponding to that of FIG. 13. Primary gear wheel 110 is formed essentially like primary gear wheel 110 of embodiment V1 depicted in FIG. 3. In addition, axial holes are bored in an outer region in order to receive end sections of U-shaped shock absorbers 112. After the end sections have been passed through the bored holes, the spring wire is bent down by 90° in the circumferential direction in order to prevent it from falling out.

In one embodiment, primary gear wheel 110 can be produced by reshaping. To that end, a metal sheet can be used that is thickened in sections. External toothing 128 and internal toothing 130 can be produced in a known way, for example, by milling or broaching.

Figure 29:
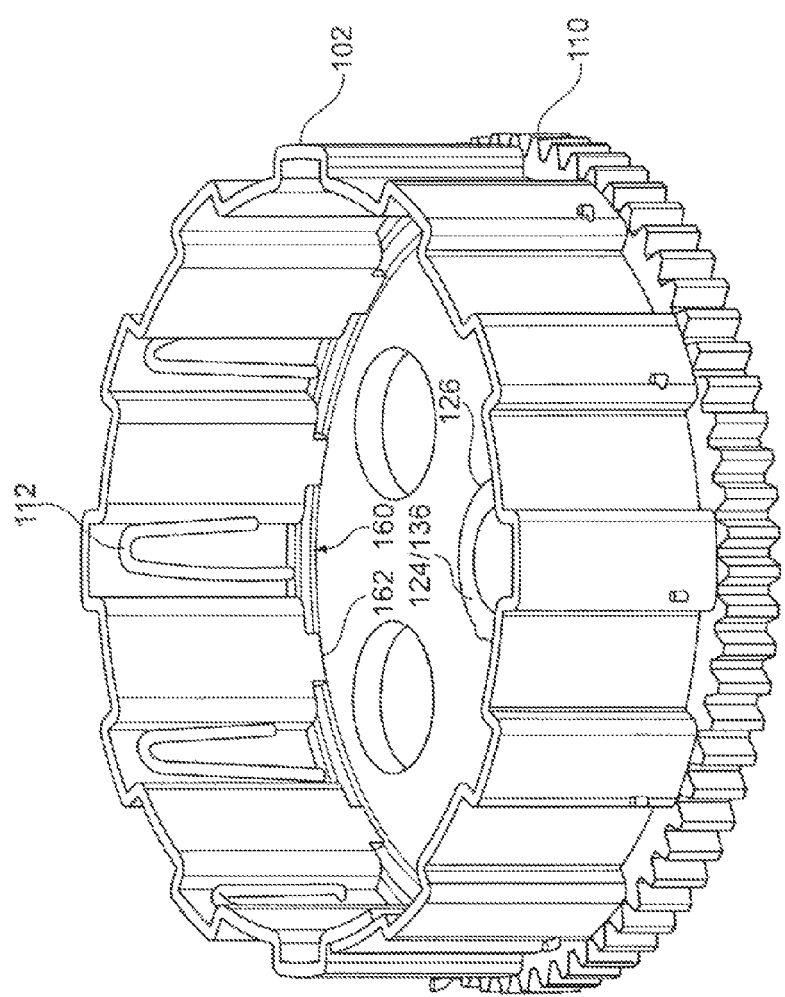

FIG. 29 shows the subassembly of FIG. 28 in a perspective corresponding to that of FIG. 27, where in addition bearing bush 124 or starter gear 136 is attached and is secured in the vertical direction on primary gear wheel 110 by means of locking ring 126.

Figure 30:
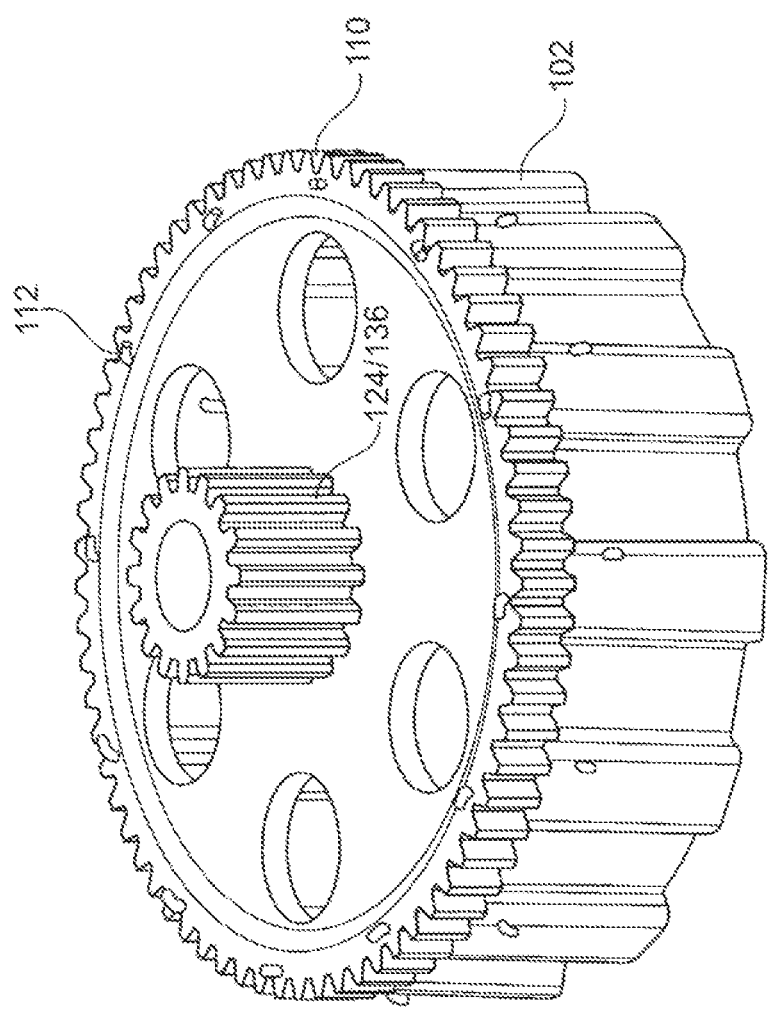

FIG. 30 shows the sub-assembly from FIG. 29 in a perspective corresponding to that of FIG. 28.

Figure 31:
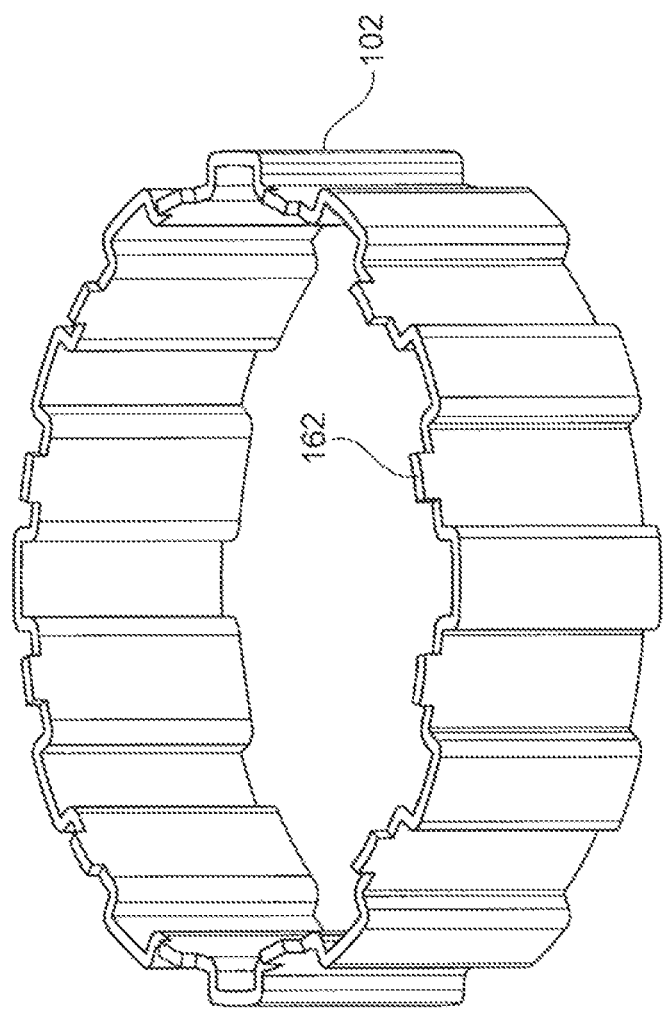

FIG. 31 shows outer basket 102 without additional structural components.

Embodiment V7

Embodiment V7 is based on embodiment V3. However, the floor section of outer basket 102 is formed by a number of spokes 164, which can be produced from separate sheet metal strips.

Figure 32:
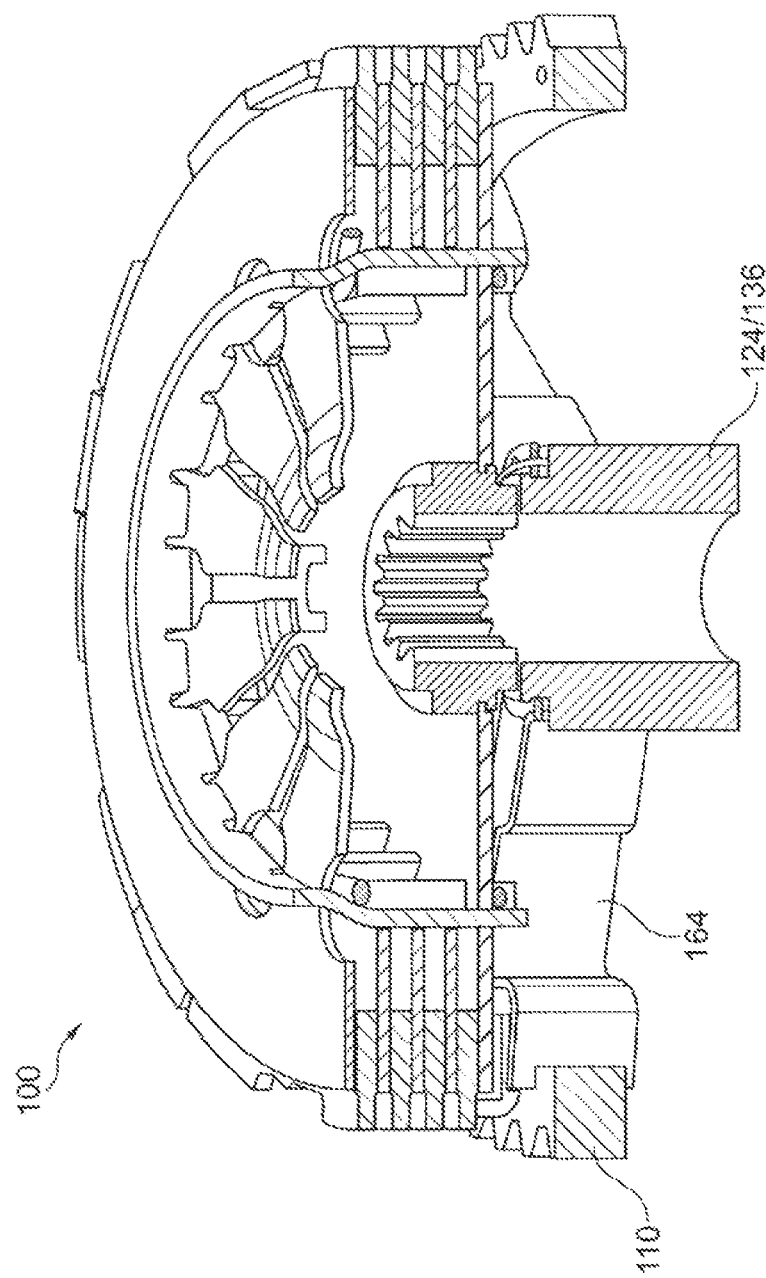

FIG. 32 shows wet clutch 100 in a depiction corresponding to that of FIG. 12. The sheet metal strips of spokes 164 lie in axial grooves in the inner circumference of ring gear 110 and additional grooves in the region of the outer circumference of bearing bush 124 or of starter gear 136.

Figure 33:
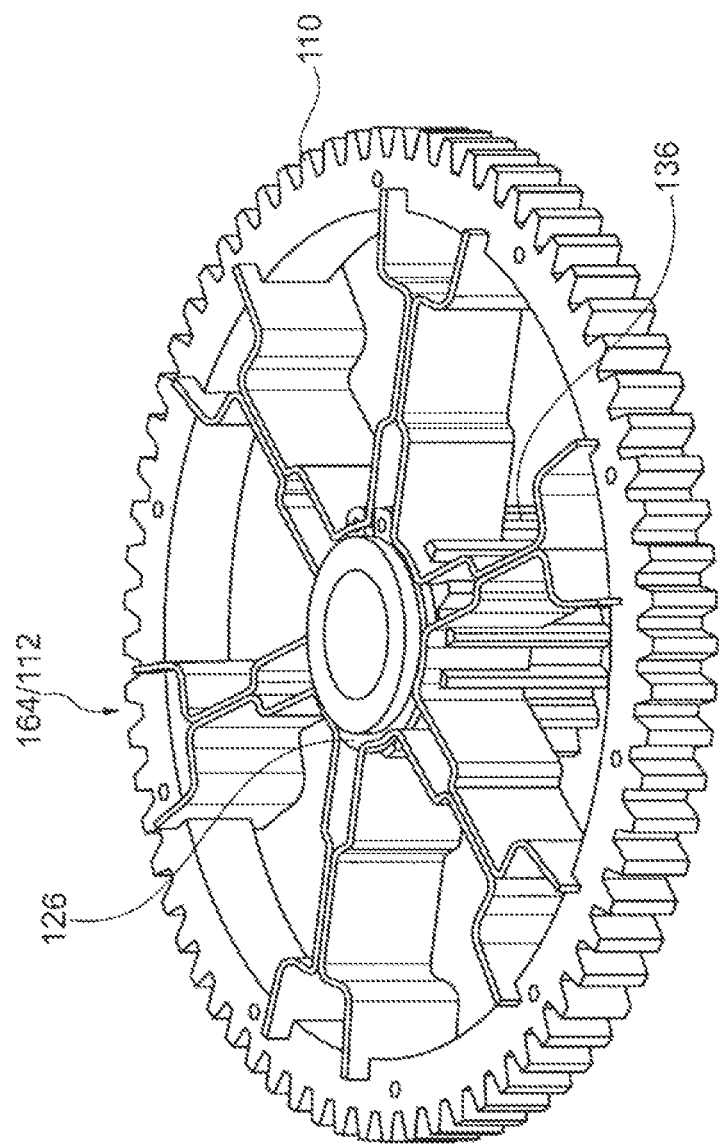

FIG. 33 shows primary gear wheel 110 with spokes 164, starter gear 136 and locking ring 126. Spokes 164 are each formed by sections of two sheet metal strips, end sections of the sheet metal strips, which are placed opposite each other being assigned in each case to adjoining spokes 164. In a radial center section of spokes 164, the sheet metal strips lie against each other and can be connected to each other, for example, by riveting or welding. Grooves in the starter gear 136, which each receive a center section of each sheet metal strip, preferably lie on a circumference around the axis of rotation of the starter gear 136, and each undercut two adjacent teeth of the starter gear 136.

Because of the sheet metal strips of spokes 164, starter gear 136 can be rotated by a certain measure relative to ring gear 110. In this sense, the sheet metal strips of spokes 164 serve as shock absorbers 112. The rotation distance between starter gear 136 and ring gear 110 is limited by straps of outer basket 102, as explained more precisely in reference to the following two figures.

Figure 34:
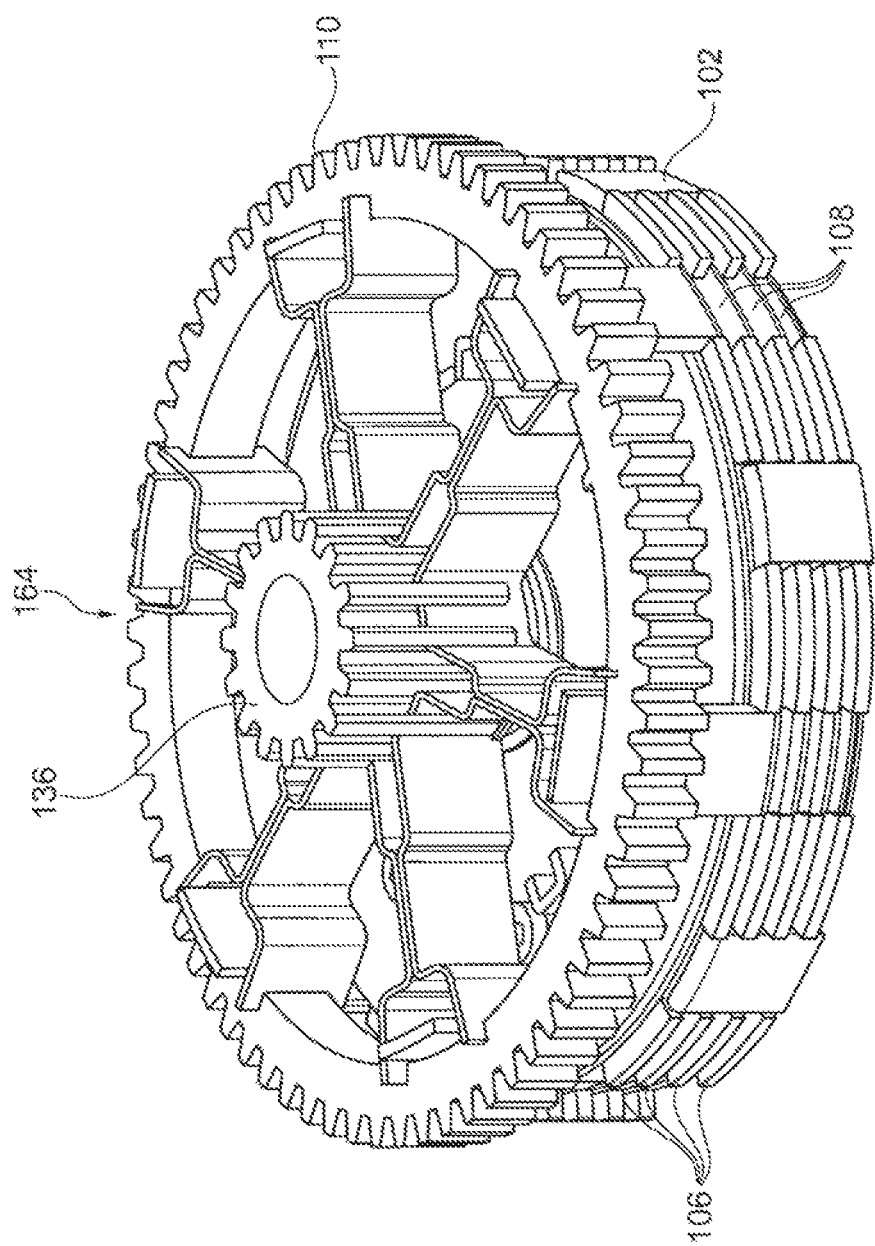

FIG. 34 shows primary gear wheel 110, starter gear 136, spokes 164 and outer basket 102, together with friction disks 106 and laminae 108, in a perspective corresponding to that of FIG. 13.

Outer basket 102 includes straps that extend downward, with which friction disks 106 engage torsionally. Furthermore, outer basket 102 includes straps that extend upward, each of which lies between two sheet metal strips, which together form spoke 164. The straps of outer basket 102 are narrower than the distance between the sheet metal strips of spokes 164, so that a distance of rotation of ring gear 110 relative to starter gear 136 is limited by means of the difference in width.

Figure 35:
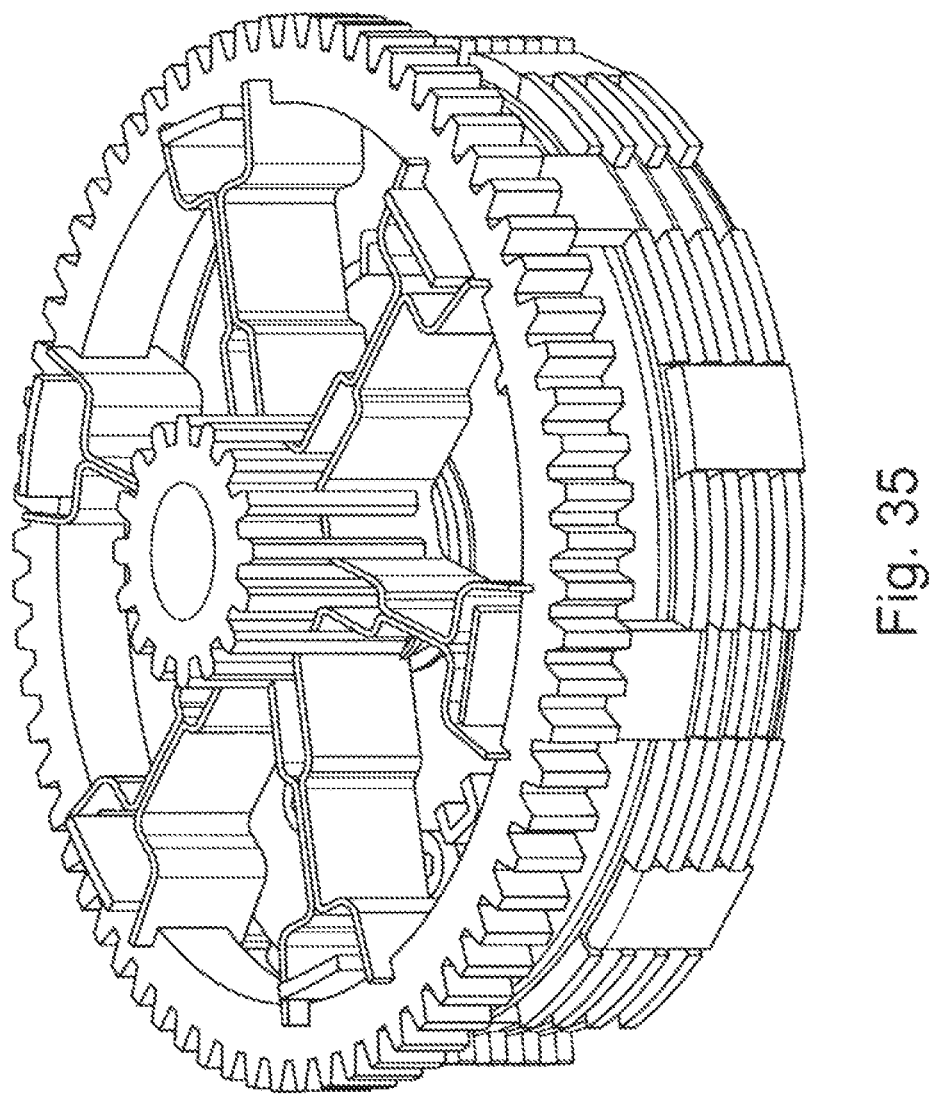

FIG. 35 shows the sub-assembly of FIG. 34 in a similar depiction.

Figure 36:
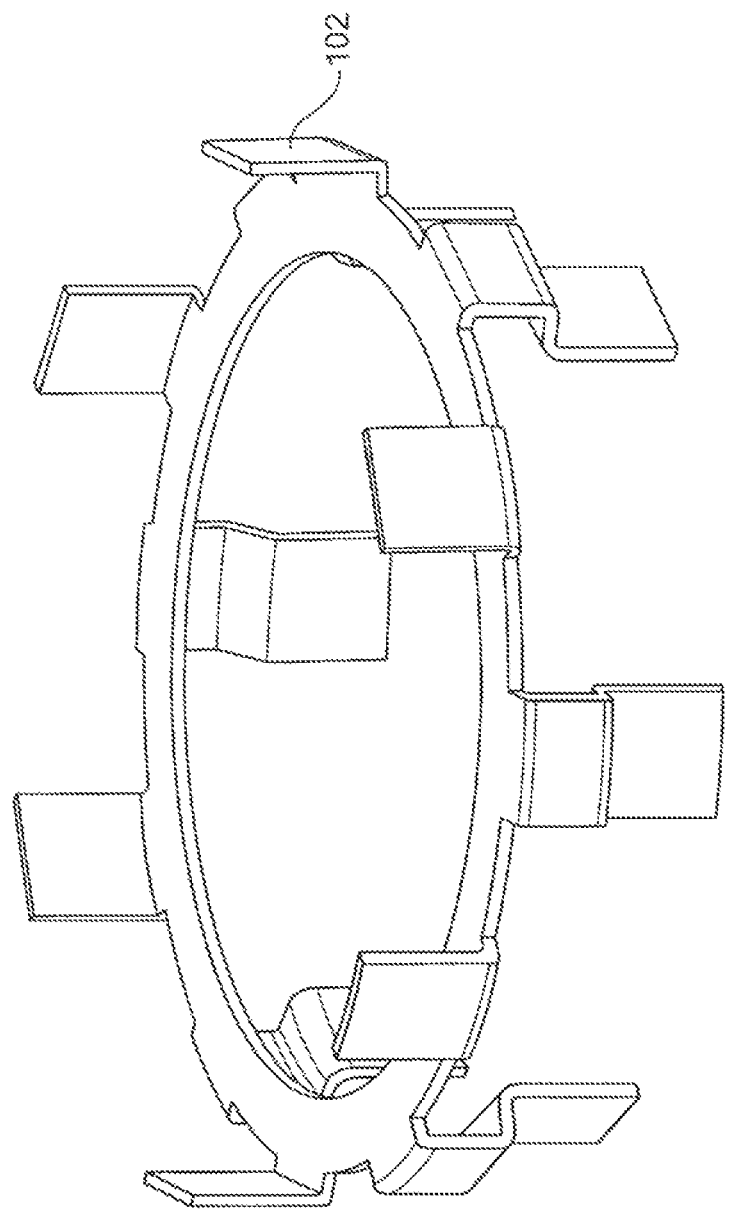

FIG. 36 shows outer basket 102 without additional structural components.

Embodiment V8

Embodiment V8 is based on embodiment V1. It differs from the latter in that friction disks 106 have webs bent down in the axial direction to transfer torque among each other. Lamellar spring 116 is secured on inner basket 114 by means of second supporting wire 118. Additional supporting wire 118 is secured by bolts 166. Shock absorbers 112 are realized by coil springs. The inner basket includes a base plate and an inner carrier.

Figure 37:
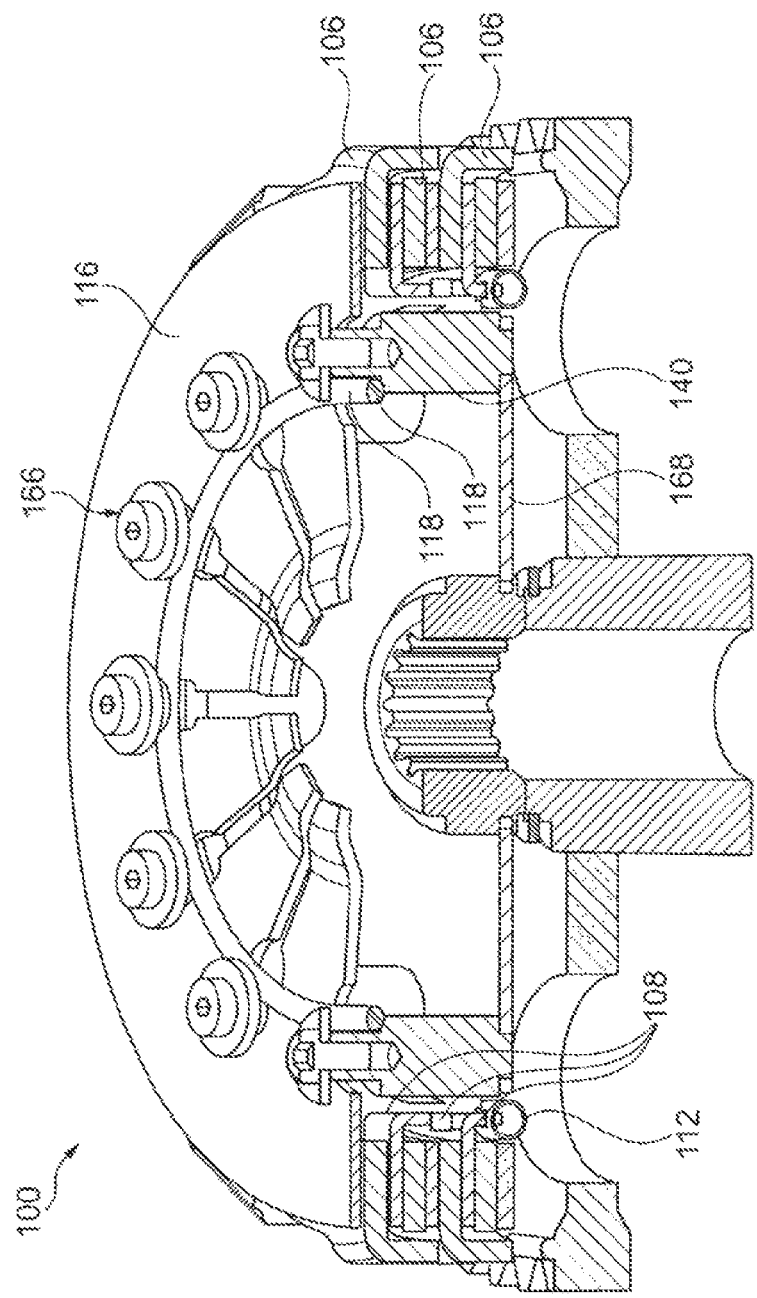

FIG. 37 shows wet clutch 100 in a depiction corresponding to that of FIG. 2. In addition to lower supporting wire 118, upper supporting wire 118 is provided, which is located opposite lower supporting wire 118 relative to lamellar spring 116. Bolts 166 each include stud 170 with female threading, which is connected to floor plate 168 of inner basket 104 for example by riveting, and a screw, which is screwed axially from above into the female threading of stud 170. Bolts 166 are distributed uniformly on a circumference around the axis of rotation of wet clutch 100.

Shock absorbers 112 each lie in a recess of base plate 168 of inner basket 104. The recesses are located on a circumference around the axis of rotation of wet clutch 100, and shock absorbers 112, in the unloaded state, rest with both ends against boundaries of the recesses. Moreover, the ends of shock absorbers 112 rest against webs of the laminae, which point downward in the axial direction. The recesses in base plate 168 are shaped so that the webs of laminae 168 can be displaced in the circumferential direction. That makes laminae 108 rotatable by a certain amount relative to base plate 168 of inner basket 104, in which case the shock absorbers are compressed. The webs of adjoining laminae 108 engage with each other, so that laminae 108 are torsionally connected to each other. A similar connection exists between adjoining friction disks 106, in which case the corresponding webs however lie on the radial outer surface of friction disks 106.

Figure 38:
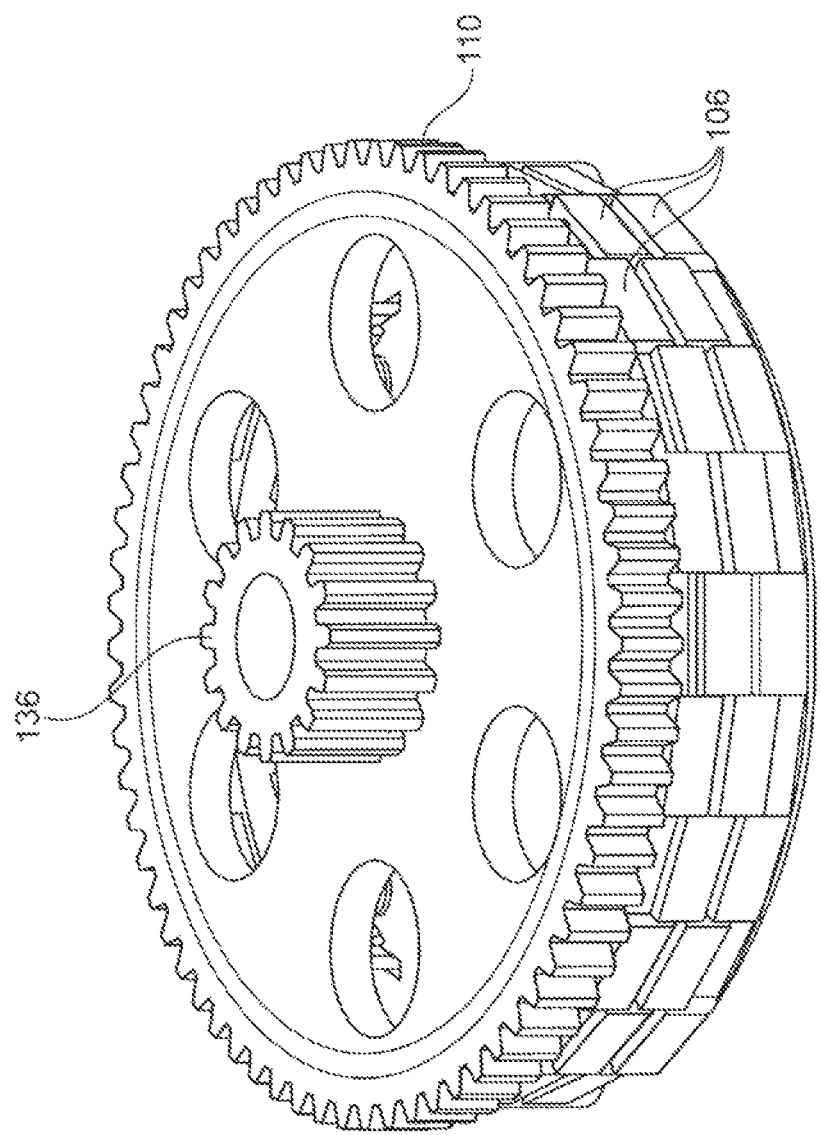

FIG. 38 shows primary gear wheel 110 with starter gear 136 and friction disks 106. The sub-assembly is turned upside-down relative to the depiction in FIG. 37.

Figure 39:
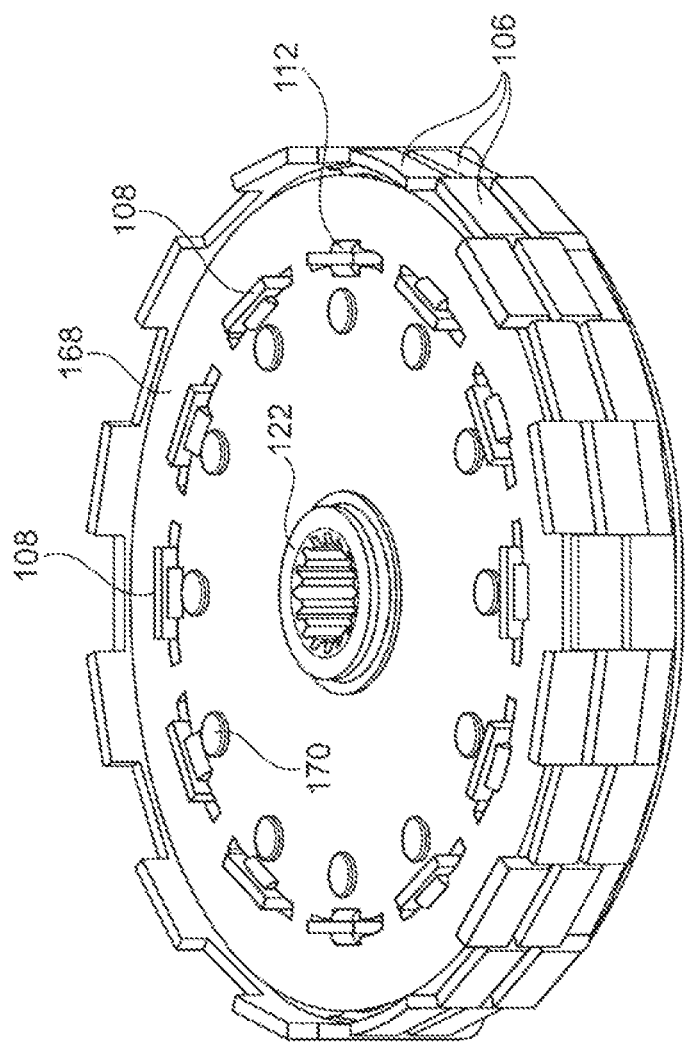

FIG. 39 shows base plate 168 and inner carrier 142 of inner basket 104 together with friction disks 106 and output hubs 122. The depicted sub-assembly is turned upside-down relative to the depiction in FIG. 37. It is possible to recognize the rivets of studs 170 for joining them to base plate 168, and straps of inner carrier 142, which protrude through base plate 168 and each encircle shock absorber 112. The side of the cutouts in base plate 168 to receive the axial straps of inner carrier 142 limits the rotation distance of inner carrier 142 relative to base plate 168.

Figure 40:
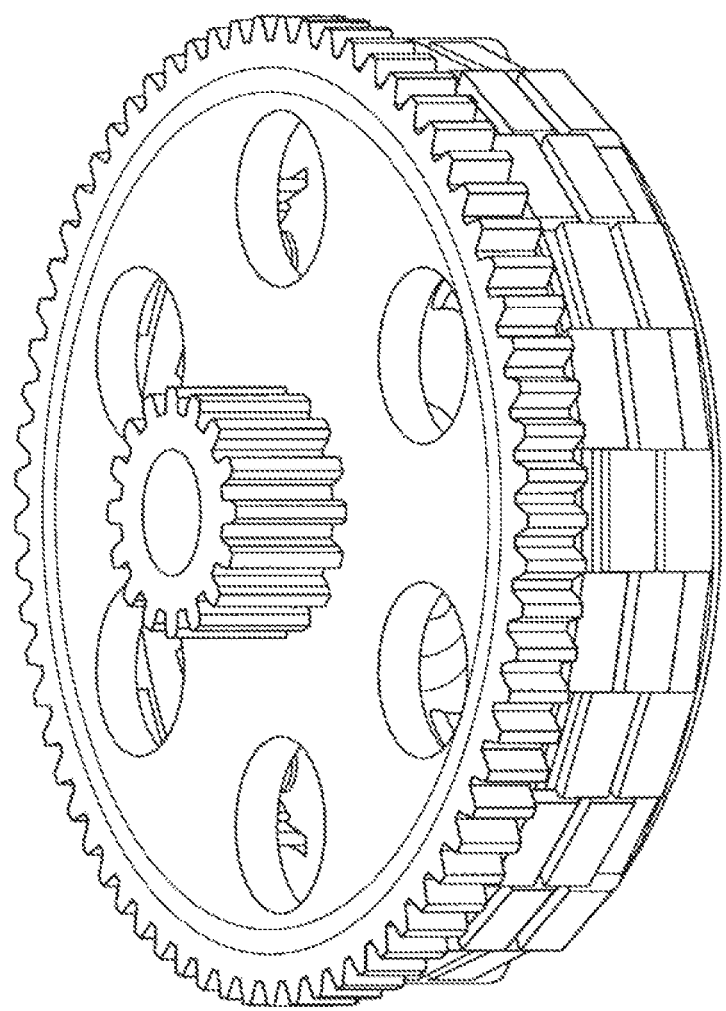

FIG. 40 shows a depiction of primary gear wheel 110 similar to that of FIG. 38.

Figure 41:
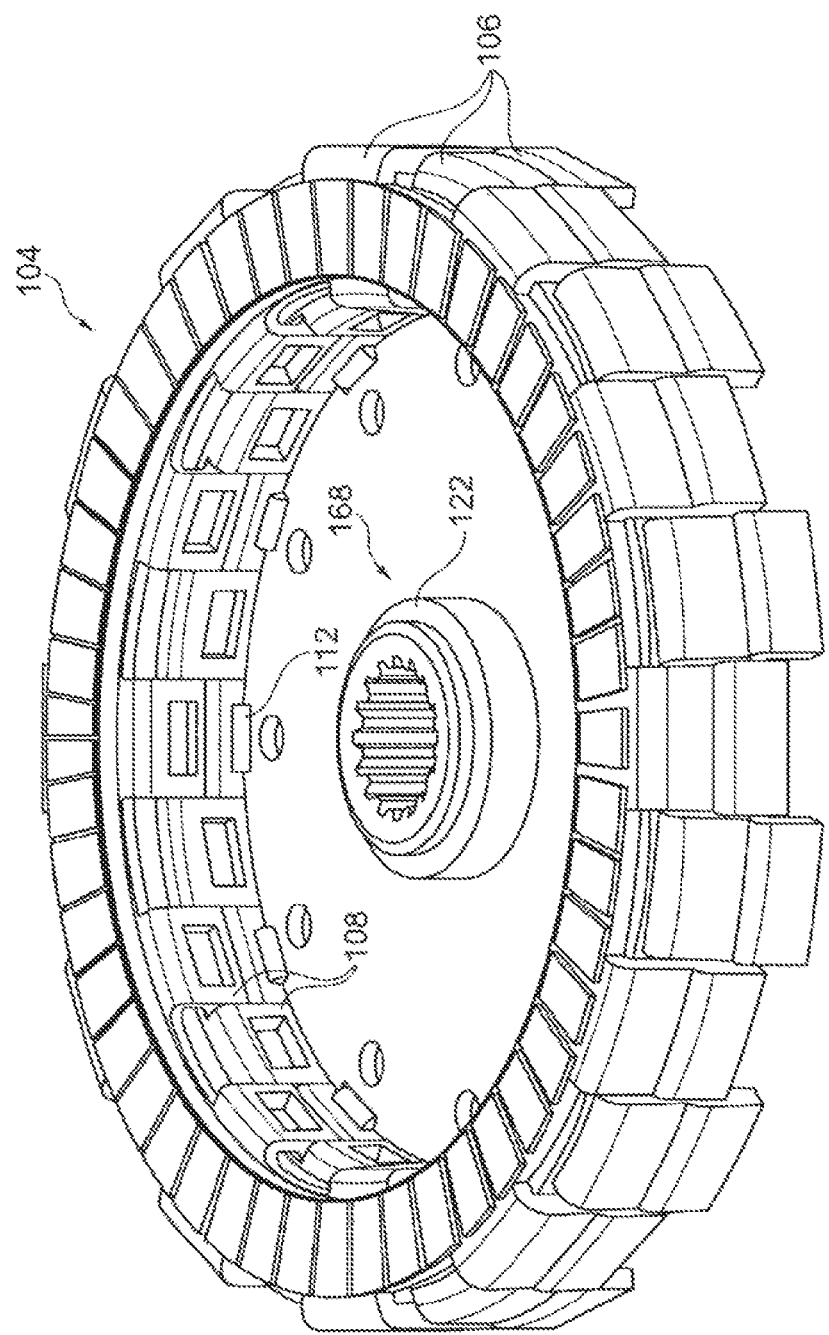

FIG. 41 shows inner basket 104 with base plate 168, friction disks 106, laminae 108 and output hub 122. It can be seen that inner basket 104 is formed by the straps of laminae 108 bent down in the axial direction and meshing with each other.

Figure 42:
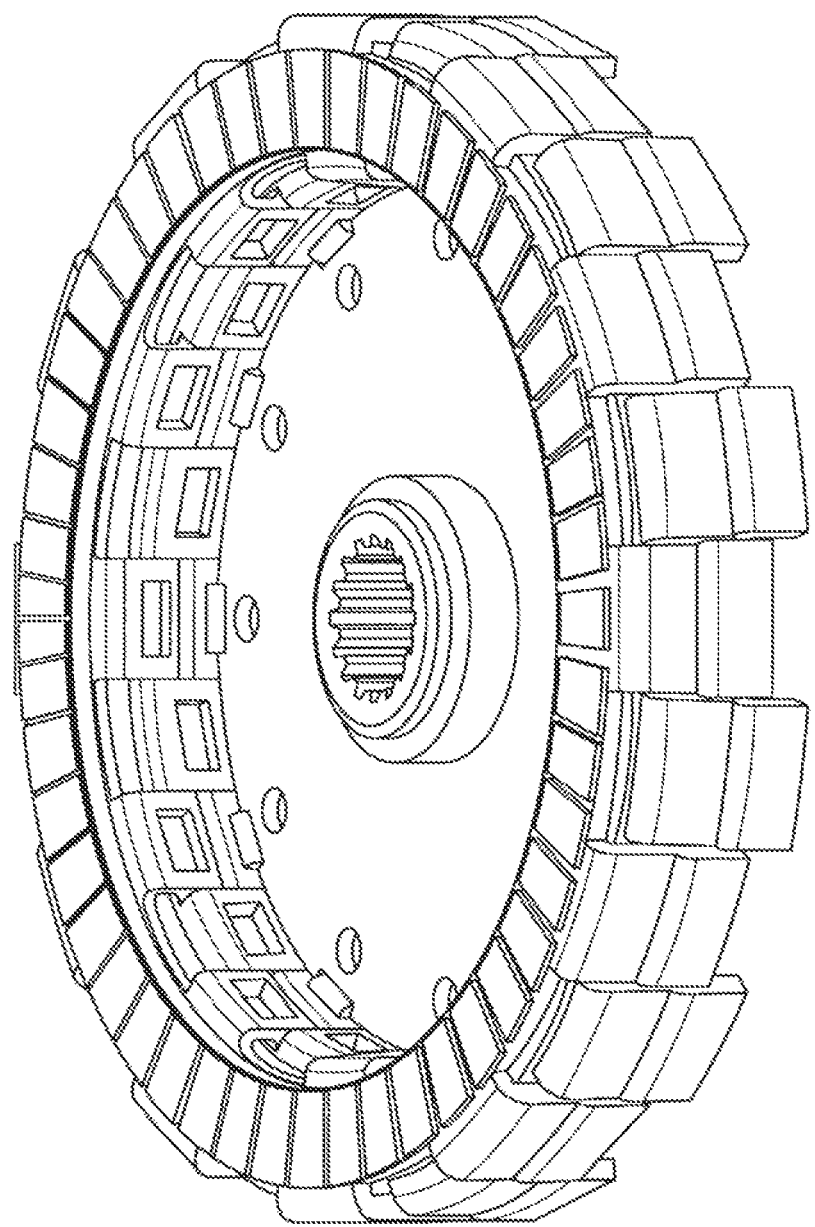

FIG. 42 shows a depiction similar to that of FIG. 41.

Figure 43:
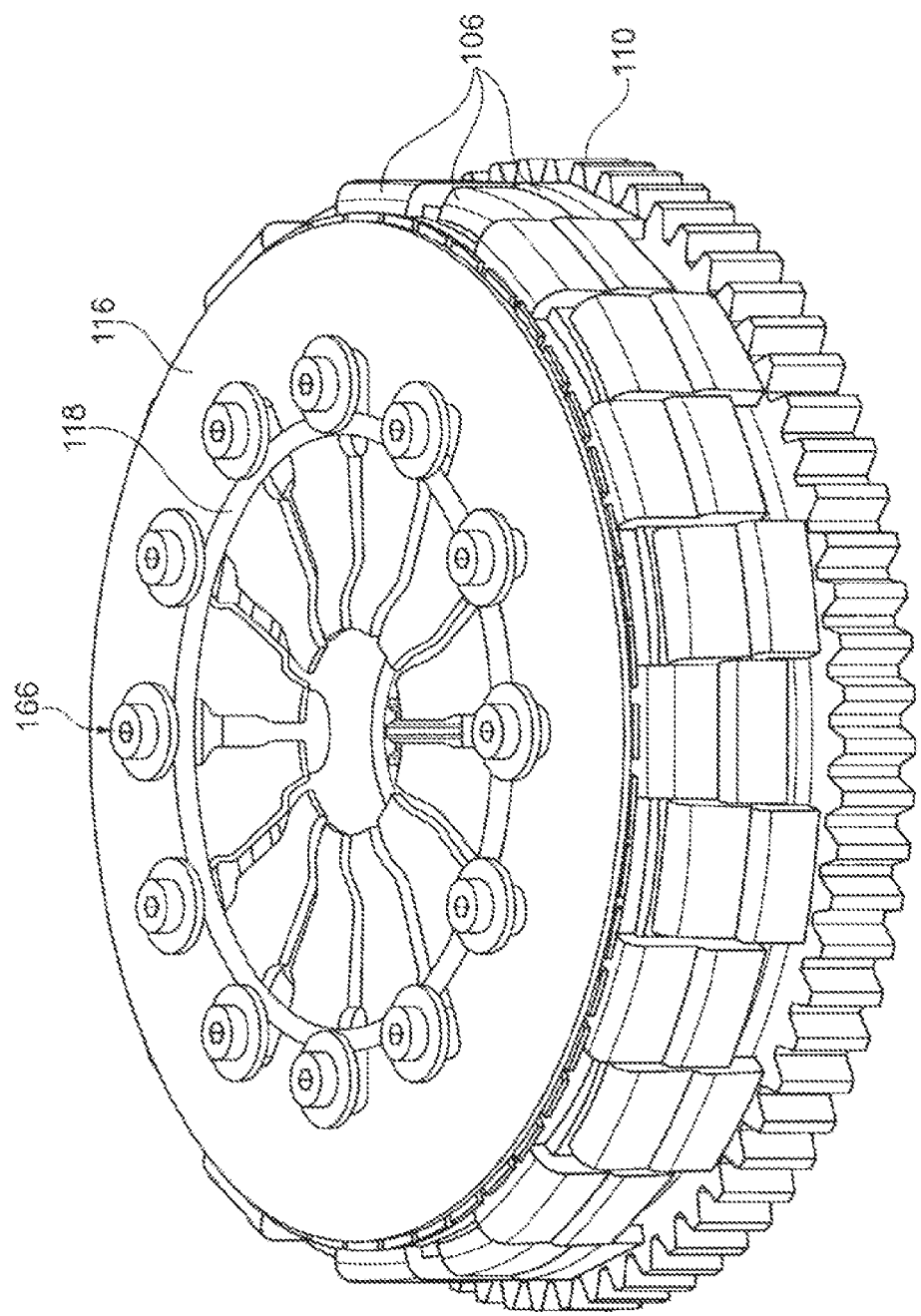

FIG. 43 shows primary gear wheel 110 with friction disks 106 and laminae 108, as well as lamellar spring 116 in the assembled state.

Embodiment V9

Embodiment V9 is based on embodiment V8. It differs essentially in the fact that inner basket 104 is deep-drawn, and another attachment of lamellar spring 116 is provided on inner basket 104.

Figure 44:
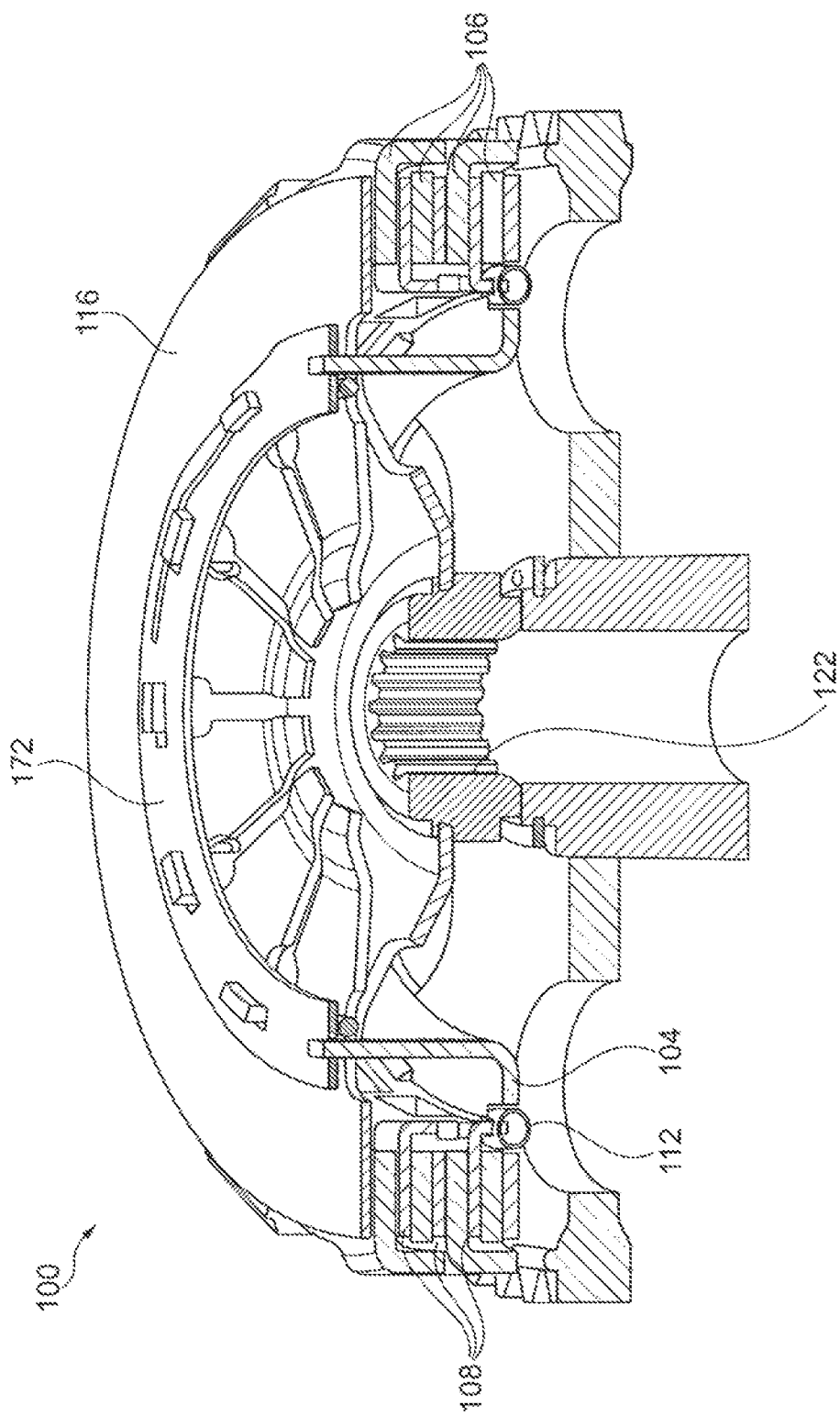

FIG. 44 shows wet clutch 100 in a depiction corresponding to that of FIG. 37. Inner basket 104 is formed by a deep-drawn part, which replaces base plate 168 and bolts 166 in embodiment V8 (see FIG. 37). Inner basket 104 includes a radial section, which has recesses in which shock absorbers 112 lie. As in embodiment V8, ends of shock absorbers 112 rest additionally against straps of laminae 108 which are directed downward, so that inner basket 104 can be rotated relative to laminae 108 which are folded together, while shock absorbers 112 are compressed.

Inner basket 104 also includes an axial section, which ends in twelve finger-like straps in the area of lamellar springs 116 that extend upward, which are passed through corresponding cutouts in lamellar spring 116.

To secure lamellar spring 116 axially on inner basket 104, support plate 172 is provided which has corresponding cutouts for the straps of inner basket 104. The straps of inner basket 104 each have a lateral groove, with which support plate 172 engages by twisting it around the axis of rotation of wet clutch 100. Lamellar spring 116 is thus fastened axially to inner basket 104.

Securing of support plate 172 against rotation is realized by two radial spring devices of support plate 172 located opposite each other, each in the area of one of the straps of inner basket 104. From the lower end of the axial straps, inner carrier 104 extends further inward radially in the form of a pot and abuts on drive hub 122. Drive hub 122 and inner basket 104 carry toothing that meshes with each other to transmit the torque. Inner basket 104 also serves to brace the axial clamping force on the stack of friction disks 106 and laminae 108, the clamping force being exerted by lamellar spring 116.

Figure 45:
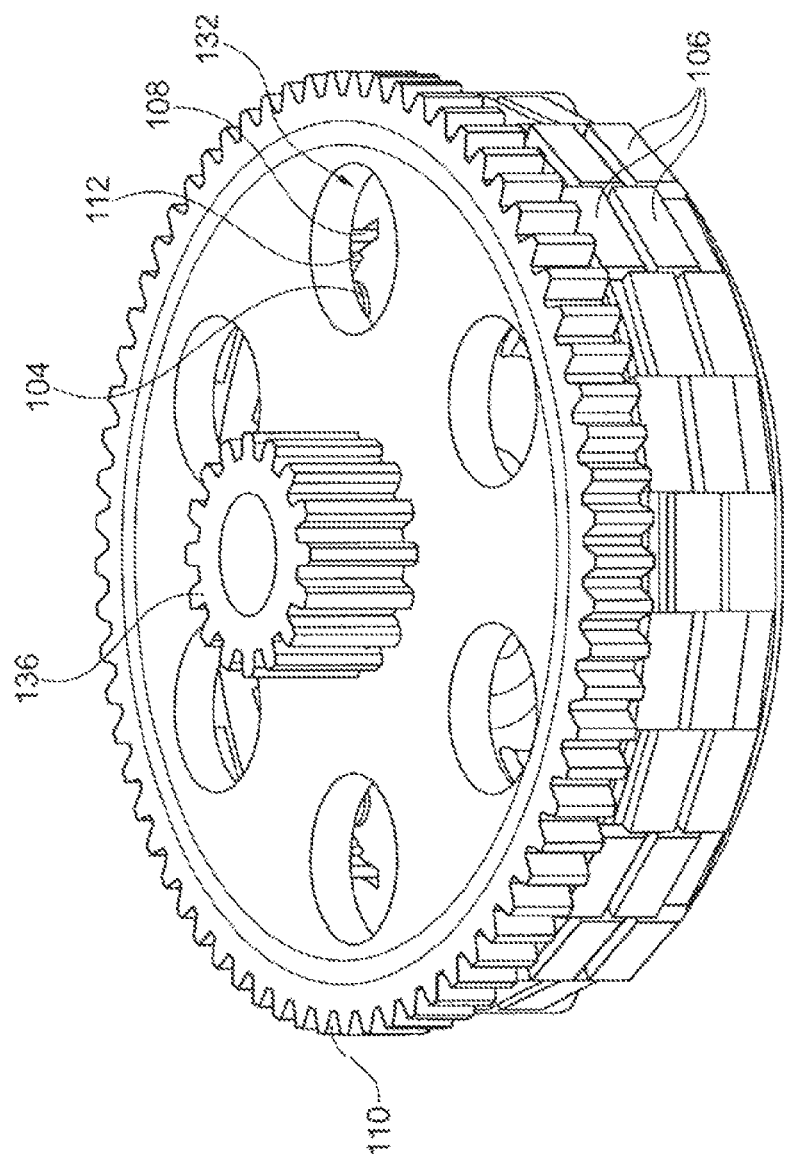

FIG. 45 shows primary gear wheel 110 with starter gear 136 and inner basket 104, to which friction disks 106 and laminae 108 are attached. The perspective here corresponds to that of FIG. 38.

Through one of receptacles 132 in primary gear wheel 110 it is possible to recognize the radial section of inner basket 104, which has a recess in which shock absorber 112 is located and from which a strap of one of the laminae protrudes.

Figure 46:
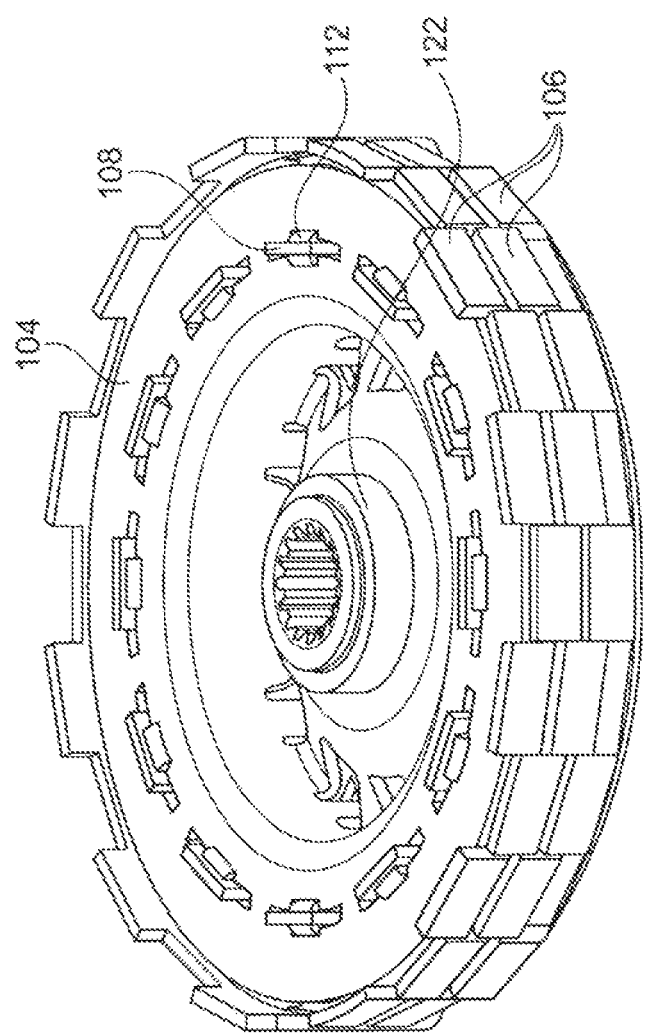

FIG. 46 shows inner basket 104 with output hub 122, together with friction disks 106 and laminae 108. The depiction corresponds to that of FIG. 45, primary gear wheel 110 being removed.

Figure 47:
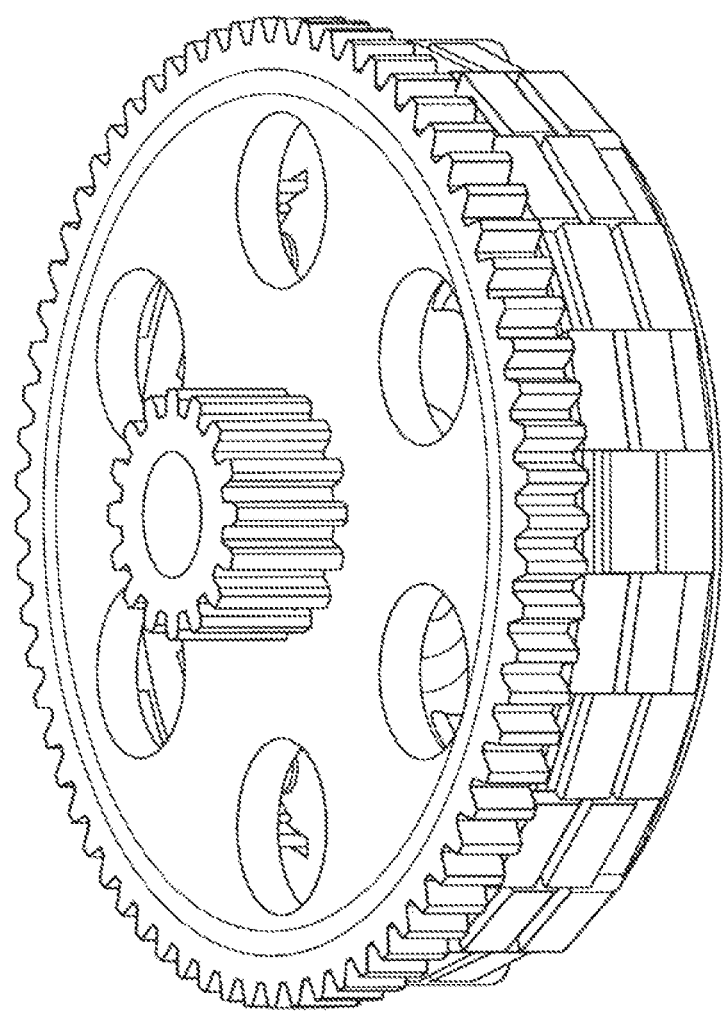

FIG. 47 shows a depiction similar to that of FIG. 45.

Figure 48:
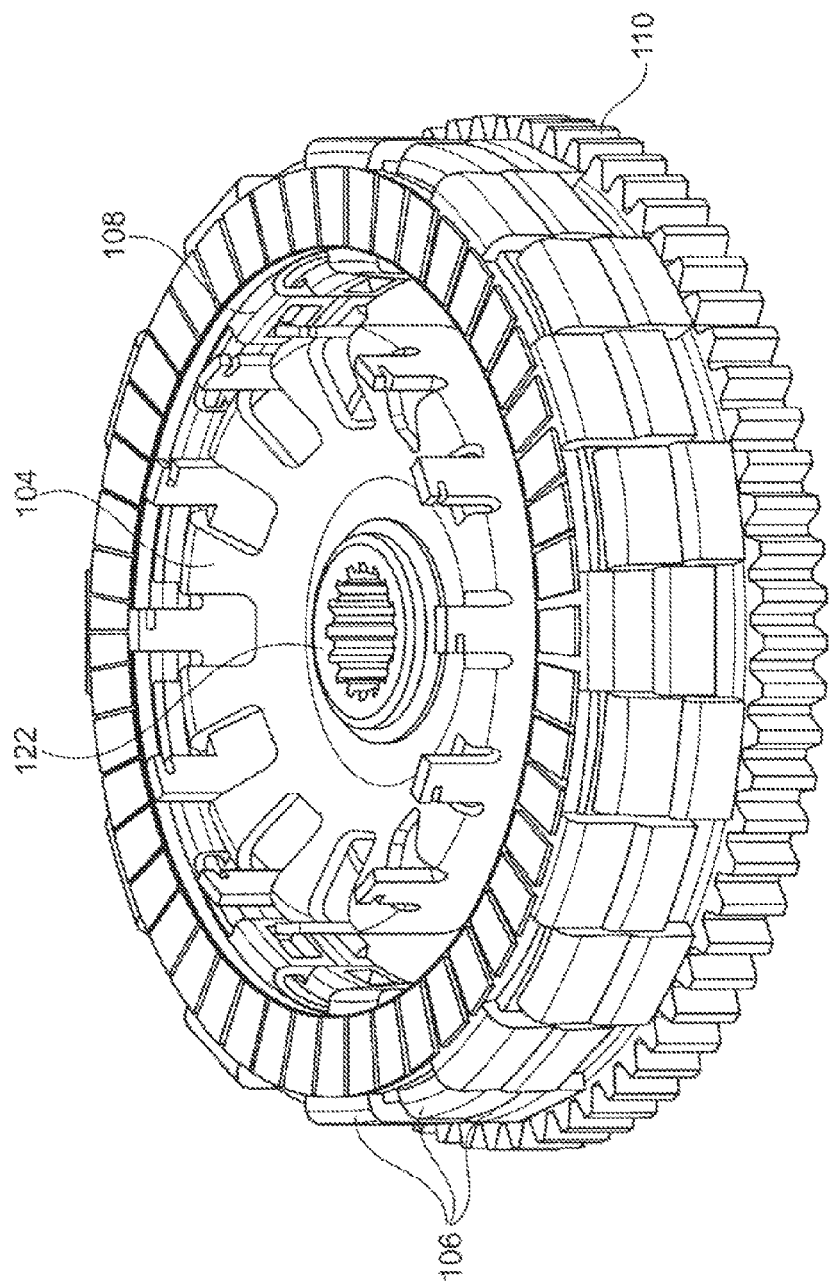

FIG. 48 shows the sub-assembly from FIG. 45 from a different perspective. The perspective corresponds to that of FIG. 41, and is upside-down in relation to that of FIG. 47.

Readily recognizable are the twelve finger-shaped straps protruding upward to receive lamellar spring 116 and support plate 172. The grooves leading in the circumferential direction are each made in the straps of inner basket 104 on the clockwise side. Accordingly, a securing is effected by the support plate, by turning the latter counterclockwise relative to inner carrier 104.

Figure 49:
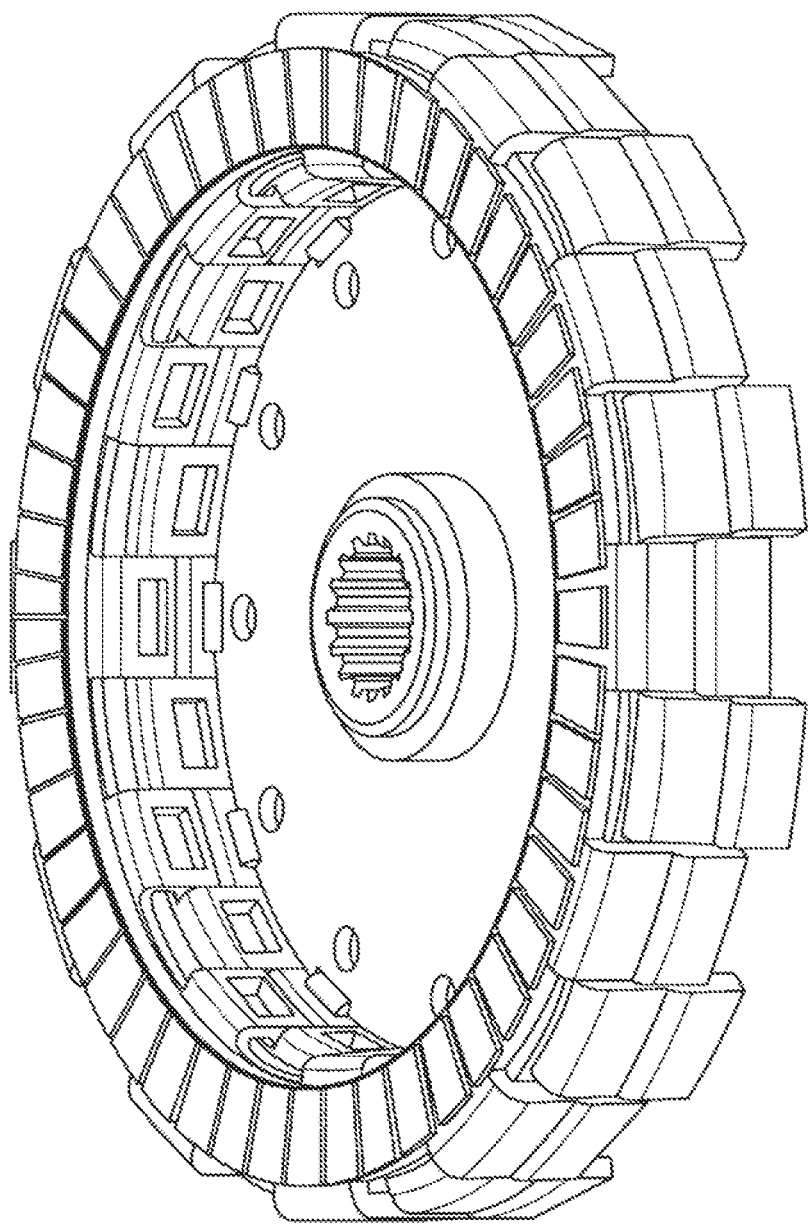

FIG. 49 shows another depiction of inner carrier 104, having additional elements of wet clutch 100.

Figure 50:
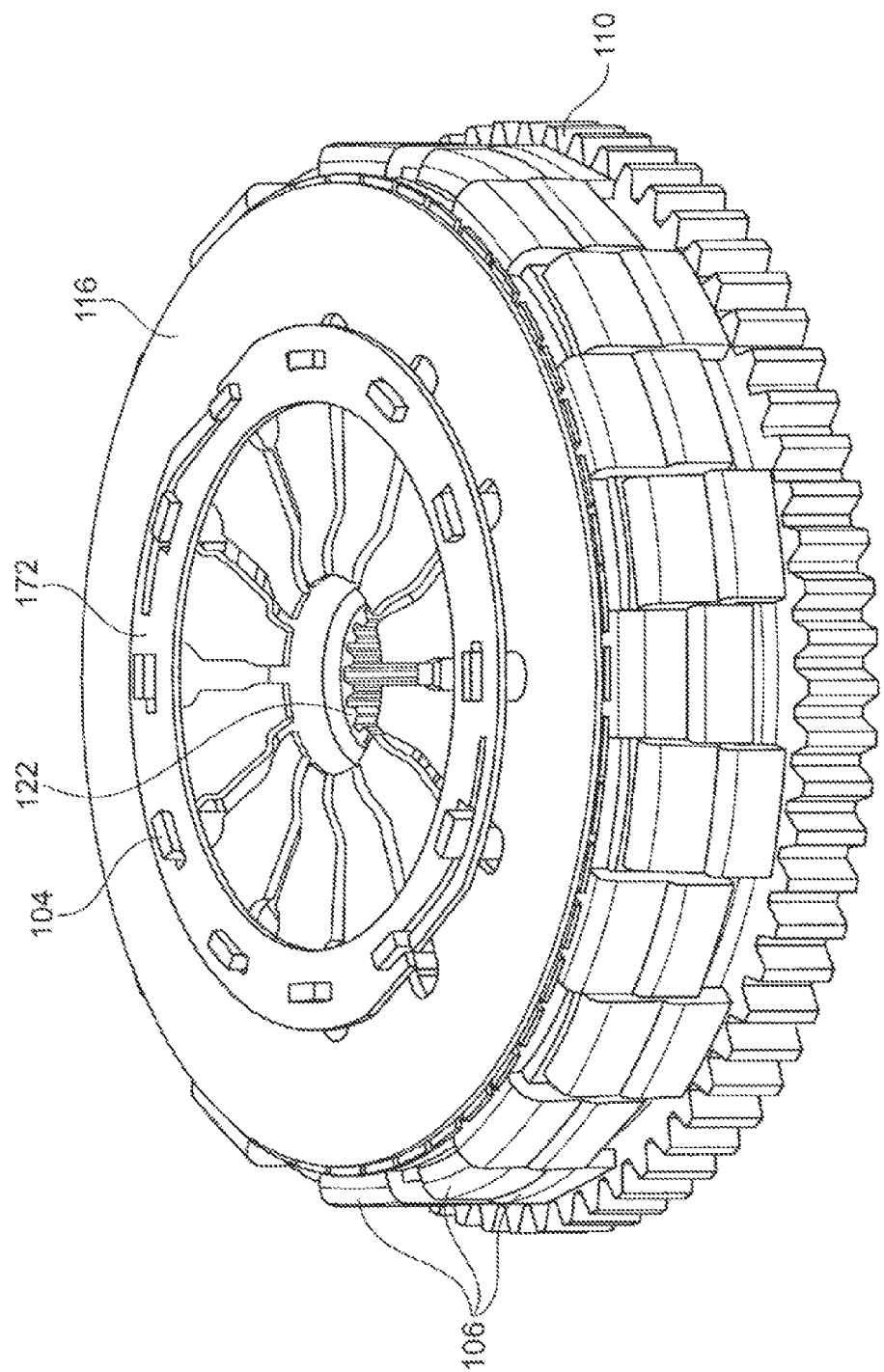

FIG. 50 shows the sub-assembly from FIG. 48 with additionally attached lamellar spring 116 and support plate 172.

Embodiment V10

Embodiment V10 is based on embodiment V9. It differs from the latter in that outer basket 102 is realized by bent parts.

Figure 51:
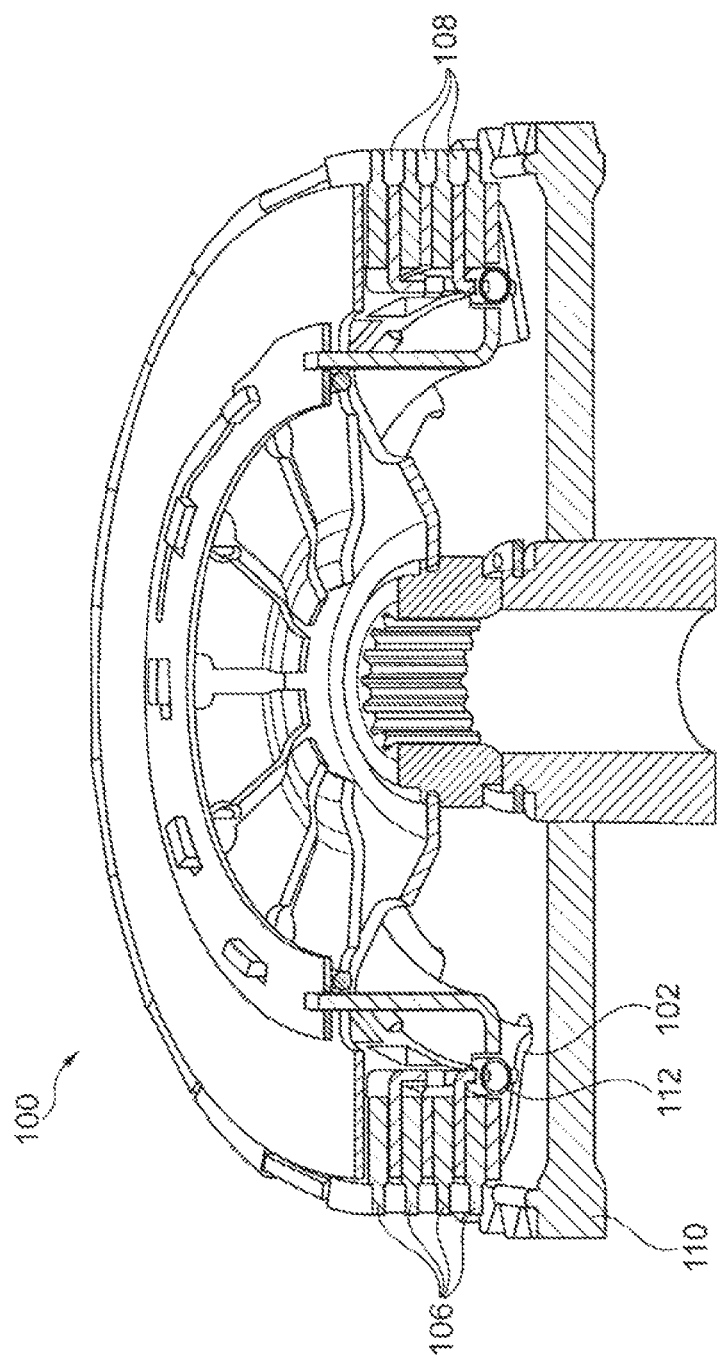

FIG. 51 shows wet clutch 100 in a depiction corresponding to that of FIG. 44. Outer basket 102 is realized by twelve bent elements, which extend in the axial direction between the webs of friction plates 106 running radially outward. Furthermore, the bent elements of outer basket 102 include an extension running essentially radially at the lower end of the axial section, while at one radially inner end of the radial section a meshing element engages with a corresponding cutout in primary gear wheel 110.

Figure 52:
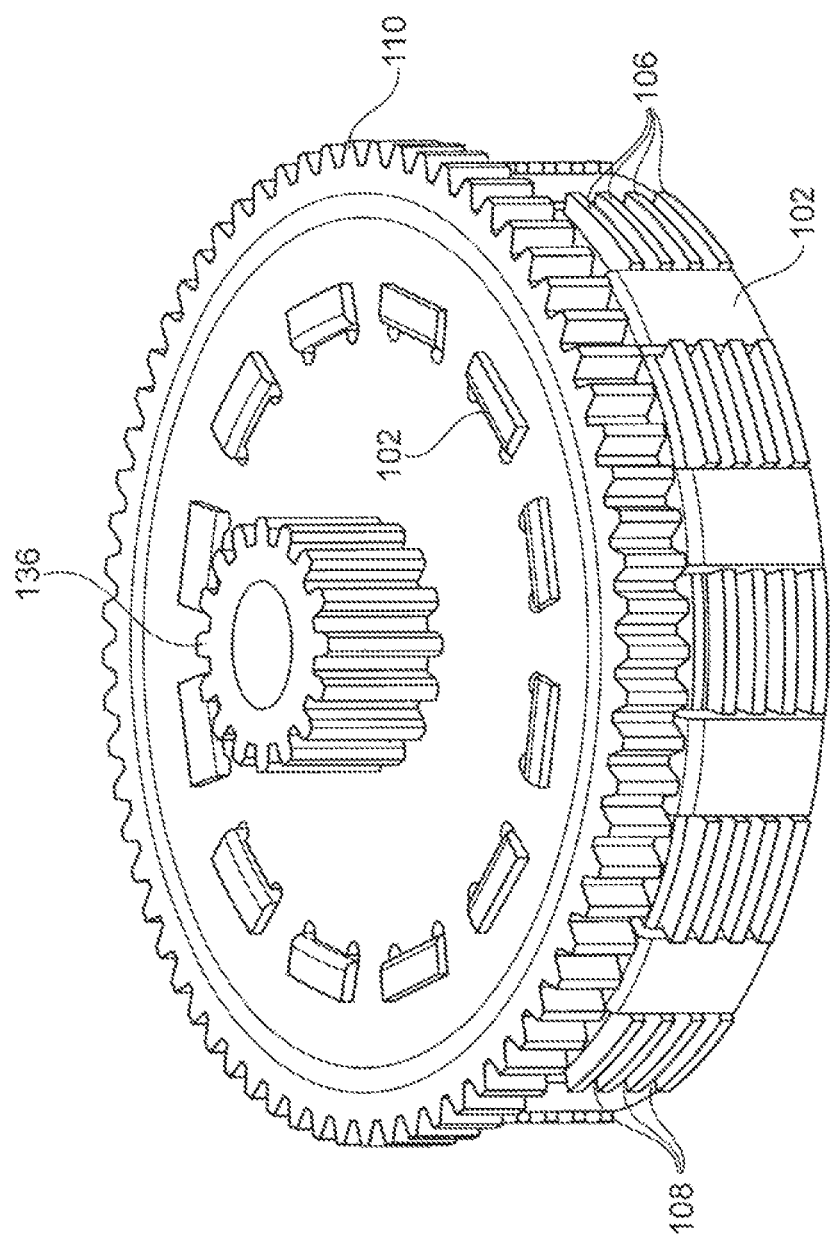

FIG. 52 shows primary gear wheel 110 with starter gear 136, outer basket 102 and friction disks 106 and laminae 108, in a perspective corresponding to that of FIG. 45. The bent elements of outer basket 102 are twelve elements that are independent of each other, which are mounted individually on primary gear wheel 110. After the end section of each bent element has been passed through one of the cutouts in primary gear wheel 110, the corresponding end section is bent radially outward by 90° in order to secure the bent element on primary gear wheel 110.

Figure 53:
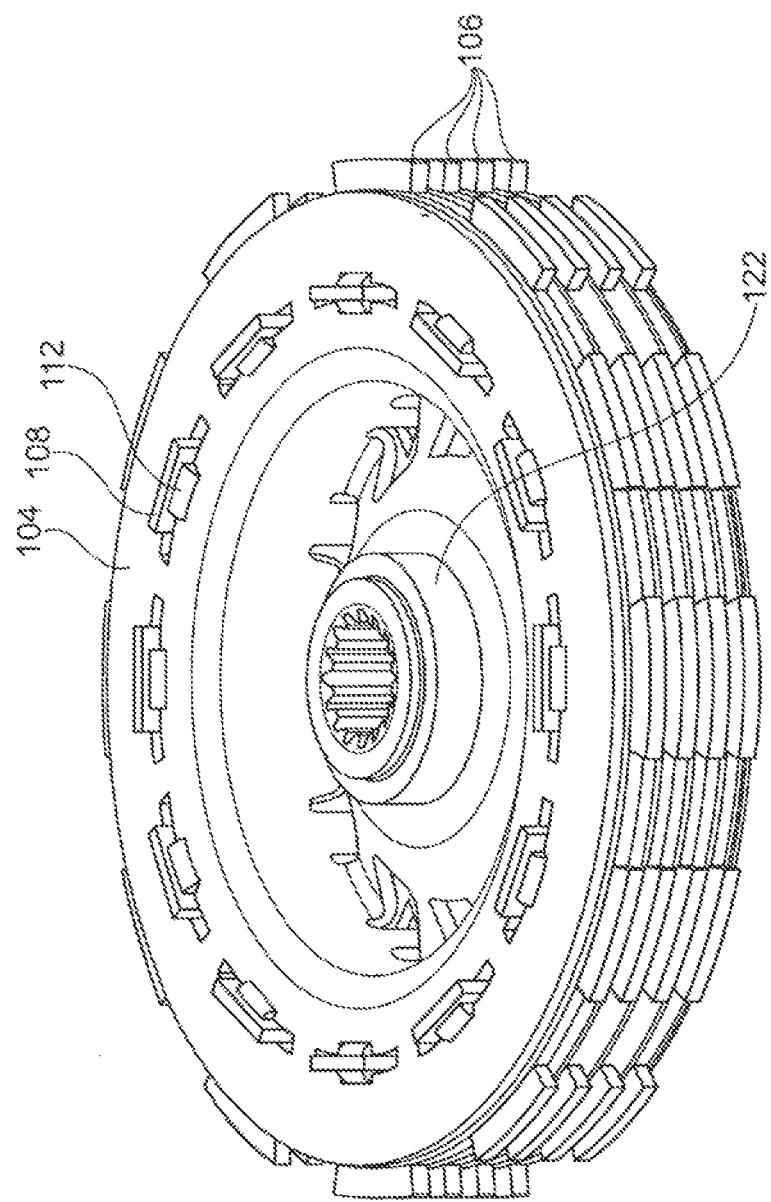

FIG. 53 shows the sub-assembly from FIG. 52 without primary gear wheel 110, from the same perspective. Friction disks 106 have meshing elements running axially outward to introduce a torque. After outer basket 102 is assembled, its axial sections lie between these meshing elements. Laminae 108 have meshing elements bent down in the axial direction, which are interconnected with each other in such a way that the meshing elements of uppermost lamina 108 in FIG. 53, which protrude upward through the cutouts in inner basket 104, can be used to introduce a force or a torque into all of laminae 108.

Figure 54:
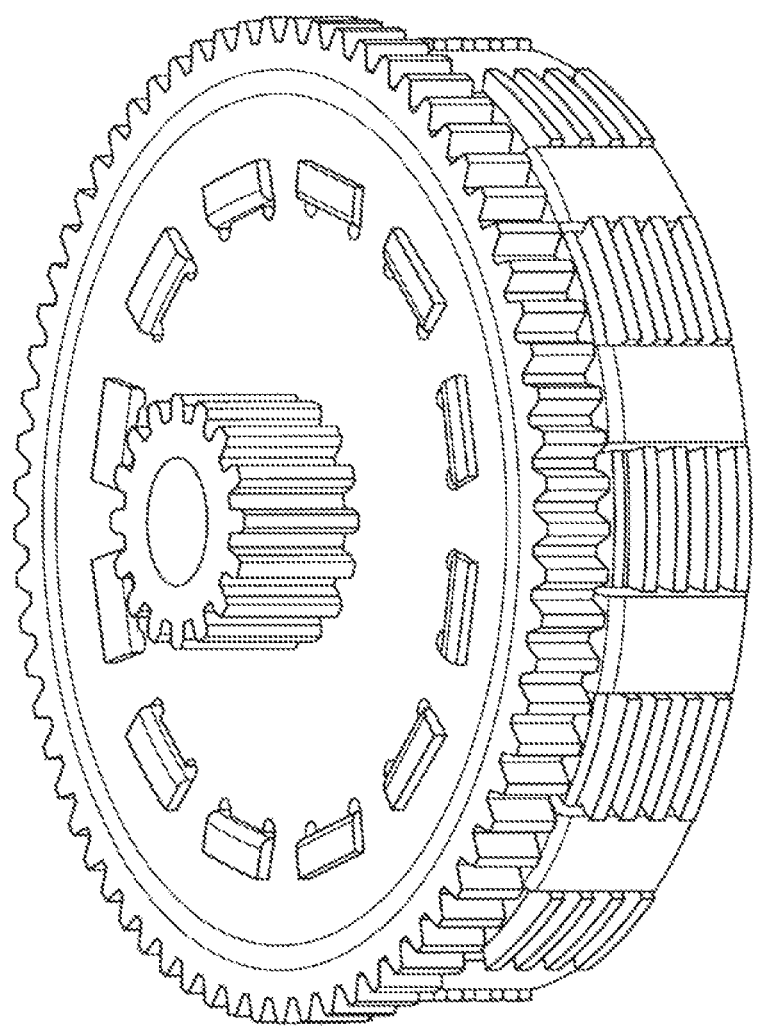

FIG. 54 shows a depiction similar to that of FIG. 52.

Figure 55:
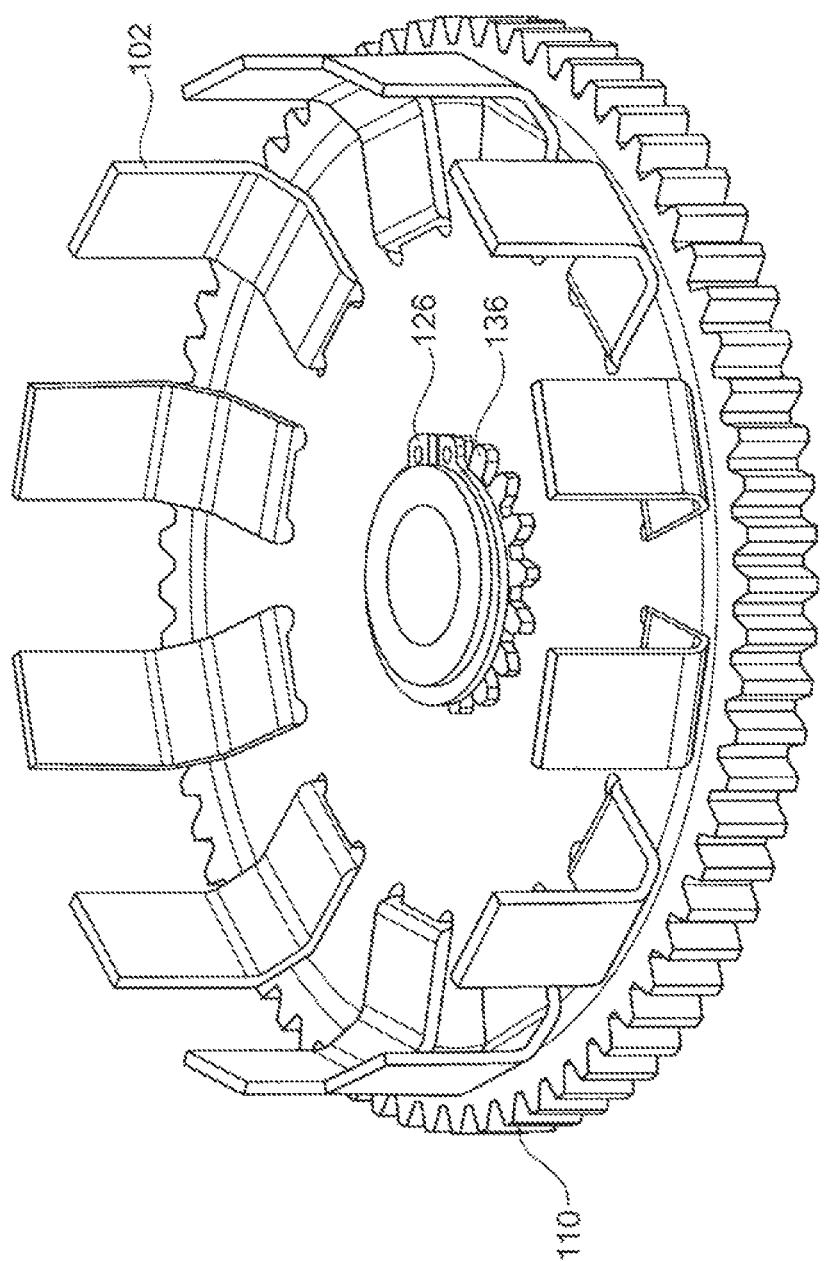

FIG. 55 shows the sub-assembly from FIG. 52 without friction disks 106 and laminae 108, in a perspective corresponding to that of FIG. 51. The twelve bent elements of outer basket 102 are mounted on primary gear wheel 111). Starter gear 136 meshes with the corresponding internal toothing of primary gear wheel 110, and is secured in the axial direction by means of locking ring 126.

Figure 56:
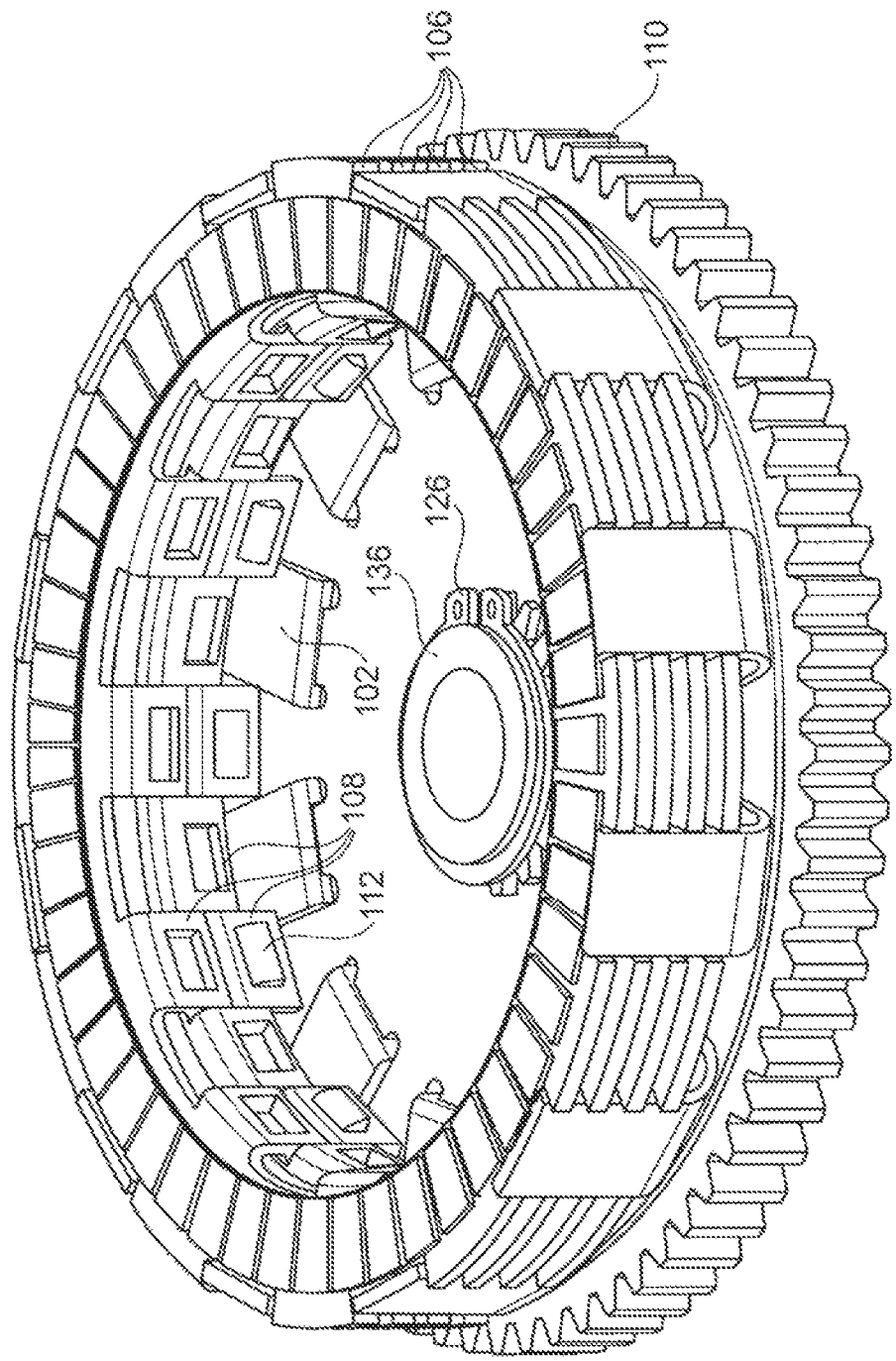

FIG. 56 shows the sub-assembly from FIG. 52 from a perspective corresponding to that of FIG. 51. Inner basket 104 is not shown, so that shock absorbers 112 lie only in the recesses in the straps of lowest lamina 108, which are provided for that purpose.

Figure 57:
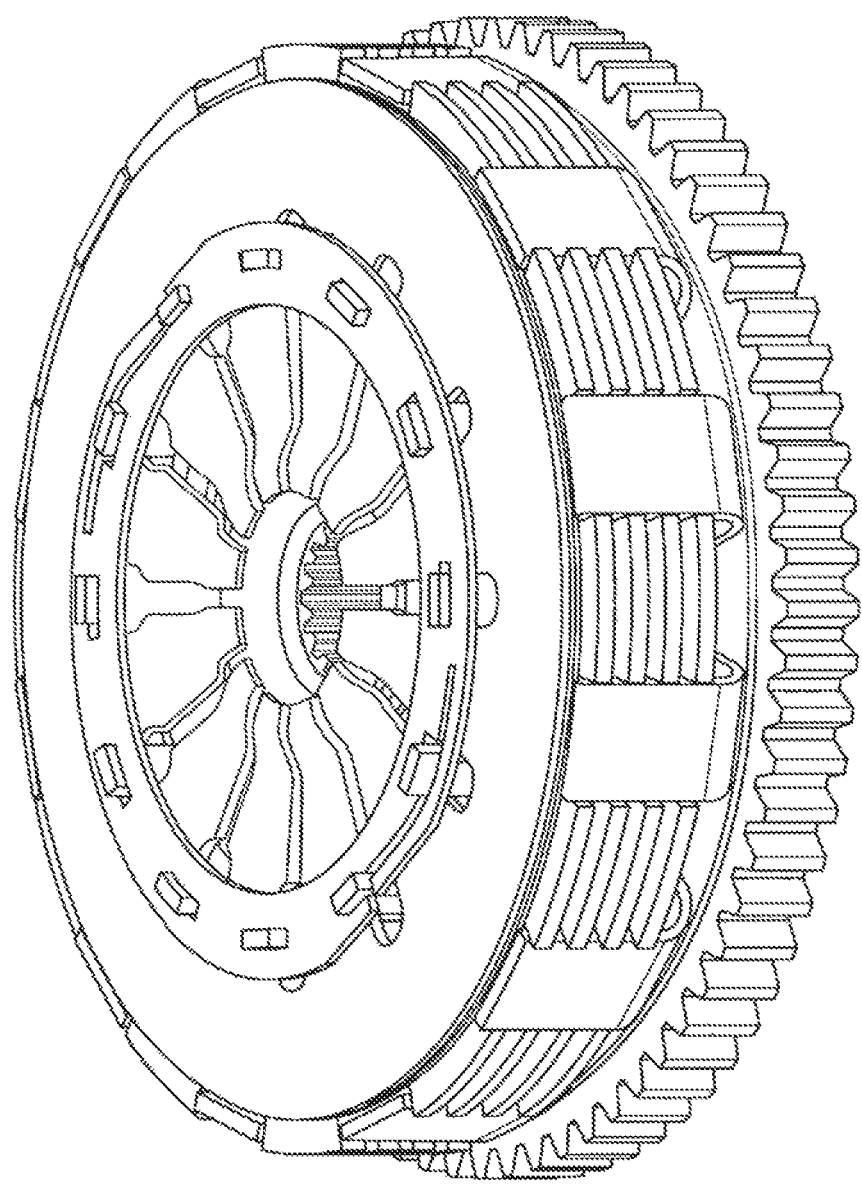

FIG. 57 shows the sub-assembly from FIG. 56 together with inner basket 104, lamellar spring 116 and support plate 172, from a corresponding perspective.

Embodiment V11

Embodiment V11 is based on embodiment V9. It differs from the latter in that outer basket 102 is a deep-drawn part and primary gear wheel 110 is replaced by ring gear 110.

Figure 58:
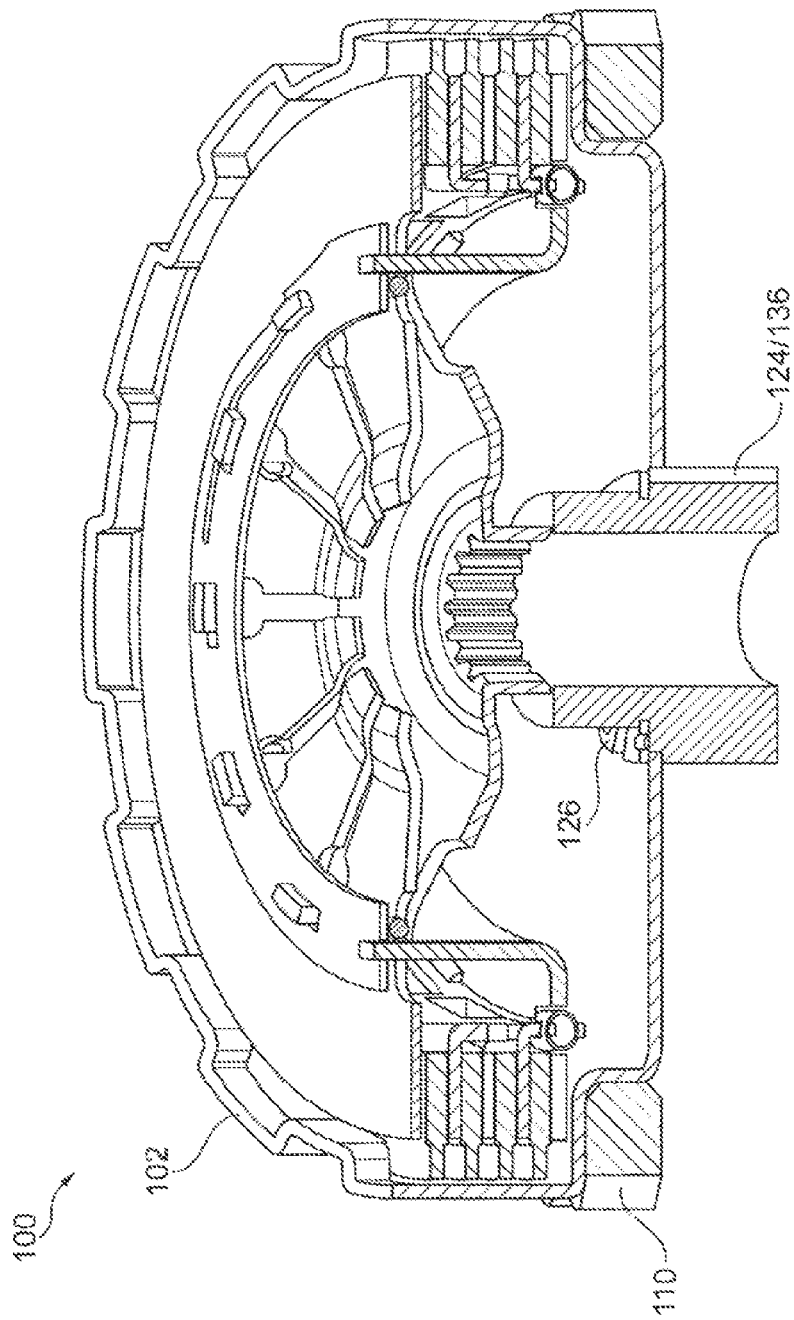

FIG. 58 shows wet clutch 100 from a perspective corresponding to that of FIG. 44. Outer basket 102 is formed similar to that in embodiment V1 (see FIG. 2). Outer basket 102 is deep-drawn, however, so that the radial floor section of outer basket 102 has no gaps or joints. In the area between the radial and the axial section of outer basket 102 a shoulder is provided, in which ring gear 110 comes to lie. Bearing bush 124 or starter gear 136 is torsionally connected to outer basket 102 by means of toothing, and is secured in the axial direction on outer basket 102 by means of locking ring 126.

Figure 59:
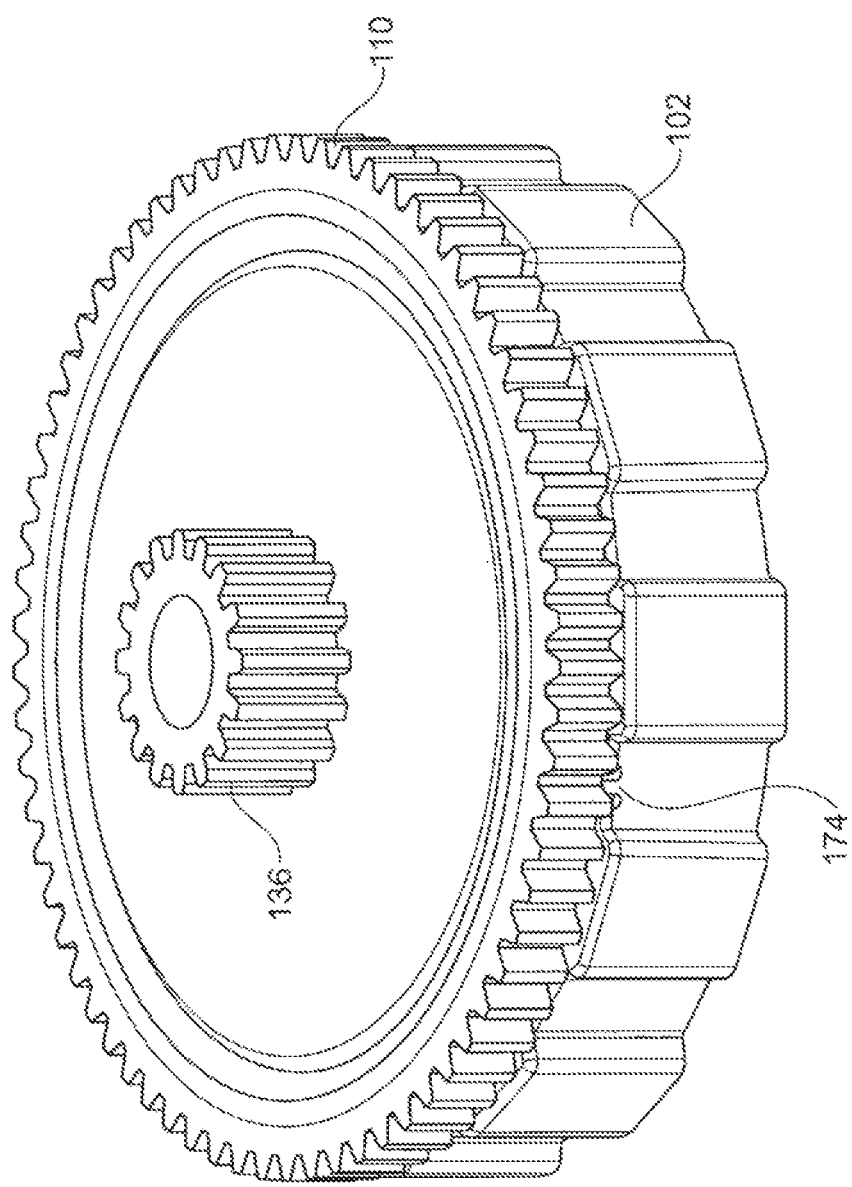

FIG. 59 shows outer basket 102 together with ring gear 110 and starter gear 136 from a perspective corresponding to that of FIG. 44. Three cogs for axial engagement with corresponding cutouts in ring gear 110 are provided on deep-drawn outer basket 102, in order to transmit a torque between ring gear 110 and outer basket 102. In one embodiment, three such cogs 174 are distributed uniformly around the circumference of outer basket 102. Cogs 174 can be formed, for example, by bending them out of the deep-drawn outer basket.

Figure 60:
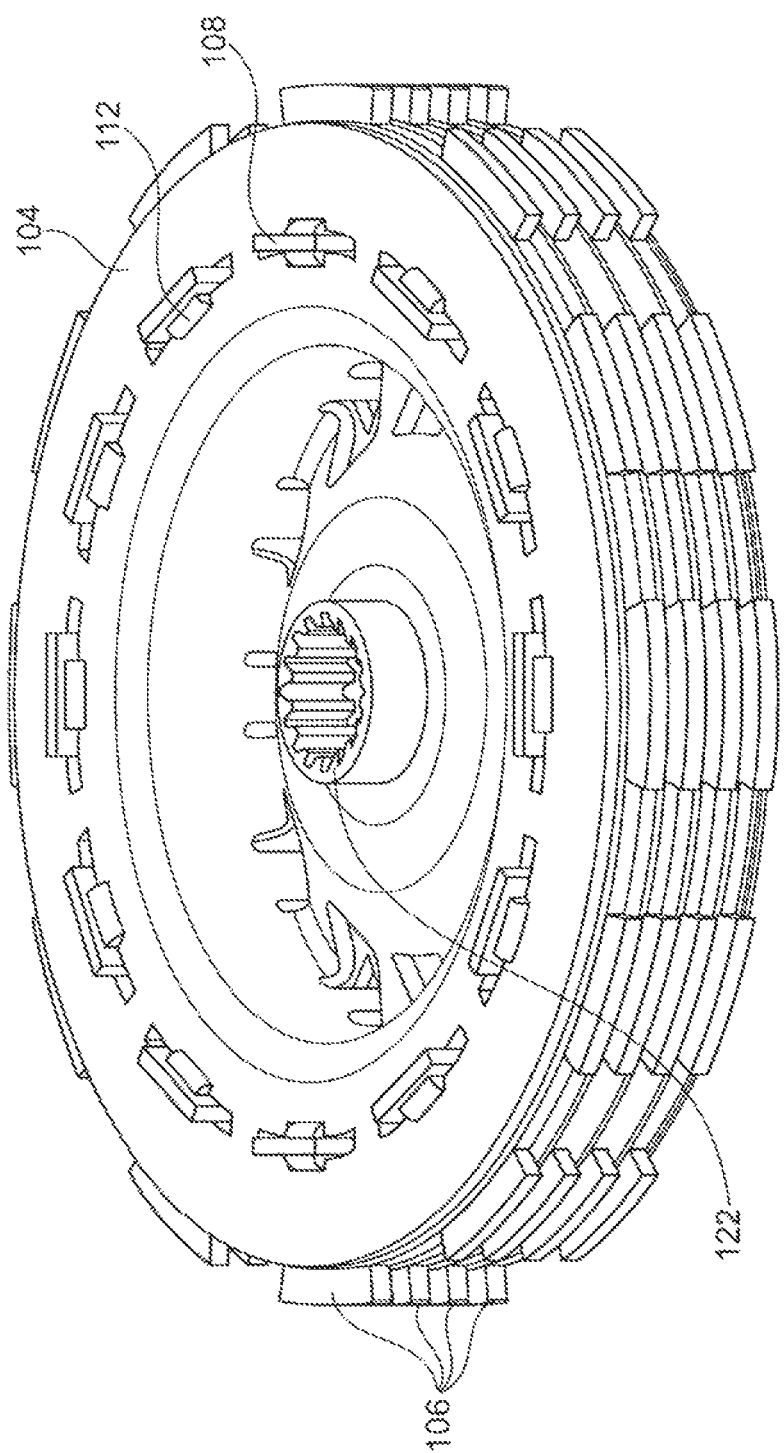

FIG. 60 shows inner basket 104 with output hub 122, friction disks 106, laminae 108 and shock absorbers 112. The depicted sub-assembly corresponds essentially to that of embodiment V10 (see FIG. 53), with the difference that output hub 122 is formed in a single piece with inner basket 104.

Figure 61:
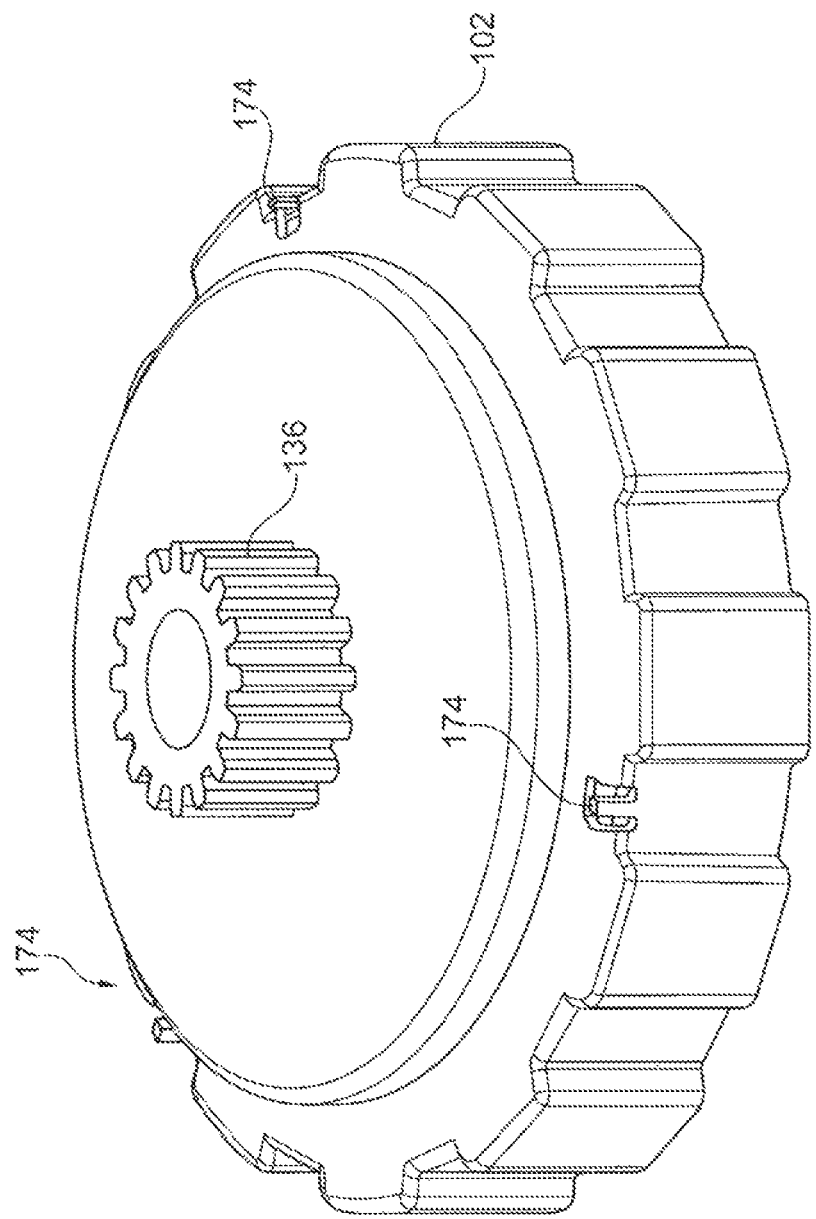

FIG. 61 shows outer basket 102 with starter gear 136 from a perspective corresponding to that of FIG. 59. Readily recognizable are three cogs 174, which extend axially upward, distributed around a circumference. In other embodiments, a different number of cogs 174 may also be provided on outer basket 102.

Figure 62:
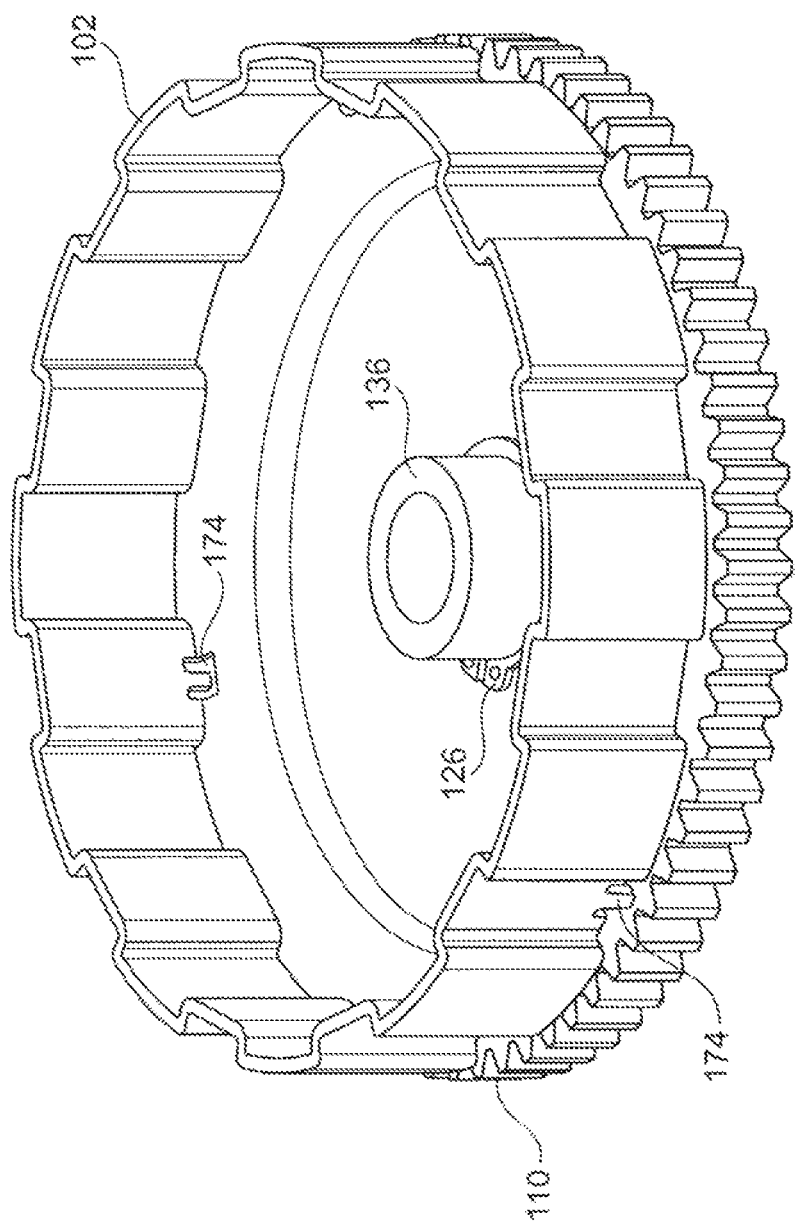

FIG. 62 shows the sub-assembly from FIG. 59 from an upside-down perspective.

Figure 63:
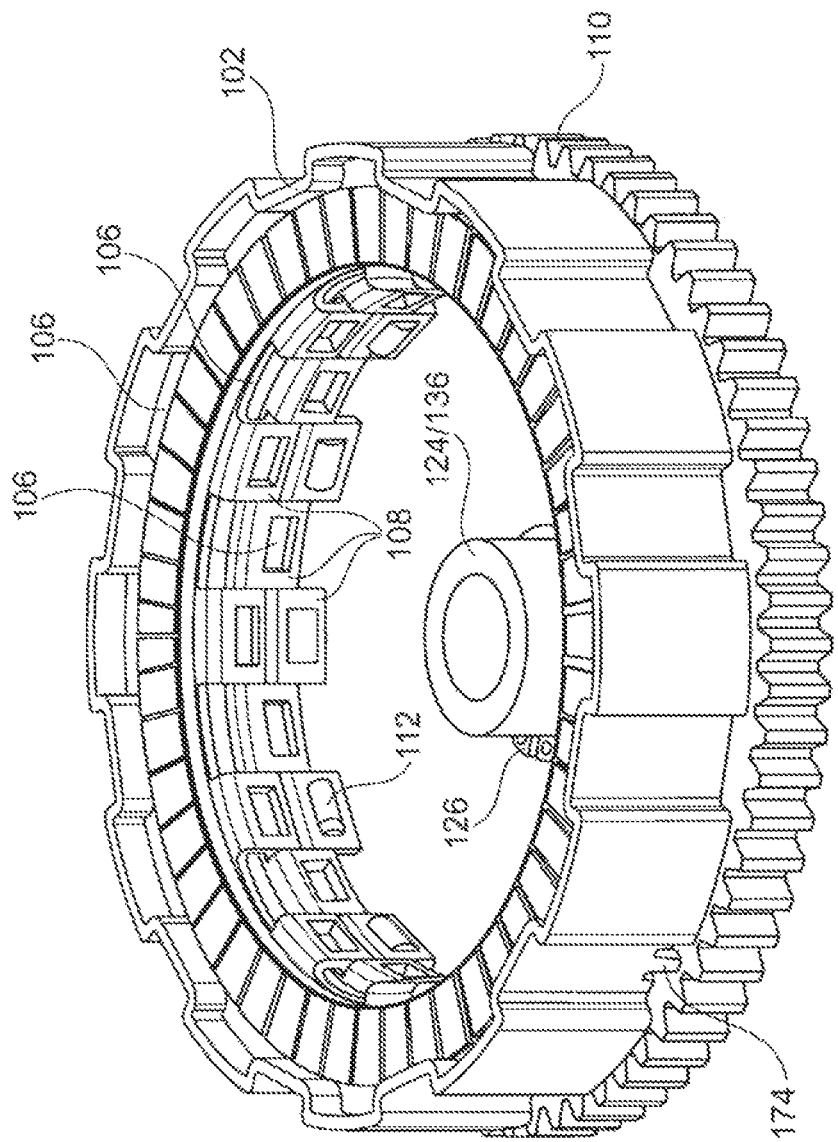

FIG. 63 shows the sub-assembly from FIG. 62, together with friction disks 106 and laminae 108. Inner basket 104 is not attached, so that shock absorbers 112 lie only in the recesses in the straps of lowest lamina 108, which are provided for that purpose.

Figure 64:
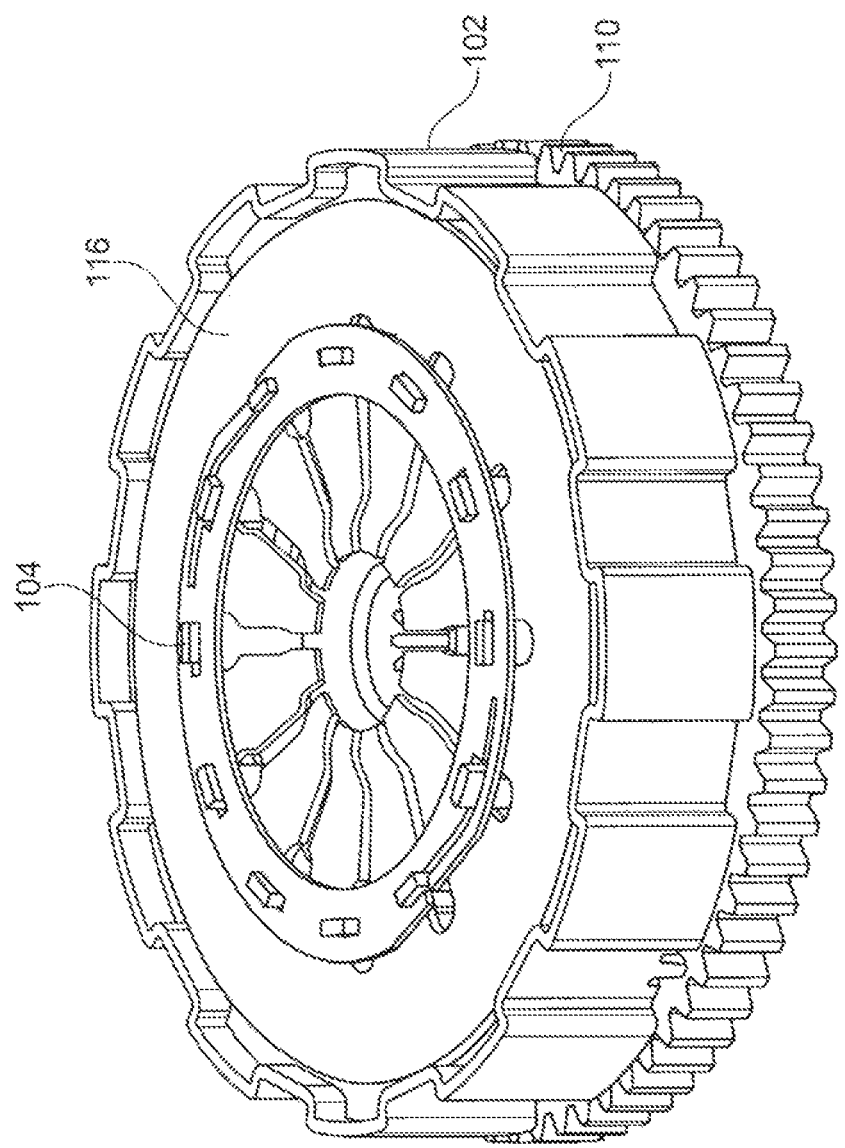

FIG. 64 shows the sub-assembly from FIG. 63 together with inner basket 104, lamellar spring 116 and support plate 172. The sub-assembly differs from the embodiment V10 shown in FIG. 57 essentially by outer basket 102.

Embodiment V12

Embodiment V12 is based on embodiment V11.

Outer basket 102 is deep-drawn, as in embodiment V11, but is connected to ring gear 110 in a different manner. Furthermore, outer basket 102 is designed to receive an outside-encircling wire ring, which closes off the stack of friction disks 106 and laminae 108 toward the top. An additional holding element for support plate 172 is provided on inner basket 104. Support plate 172 has a modified holding and securing mechanism. Uppermost lamina 108 is set up to realize the lining resiliency. Spring 116 includes: section 116A radially outward of inner basket 104; and tongues 116B radially inward of inner basket 104.

Figure 65:
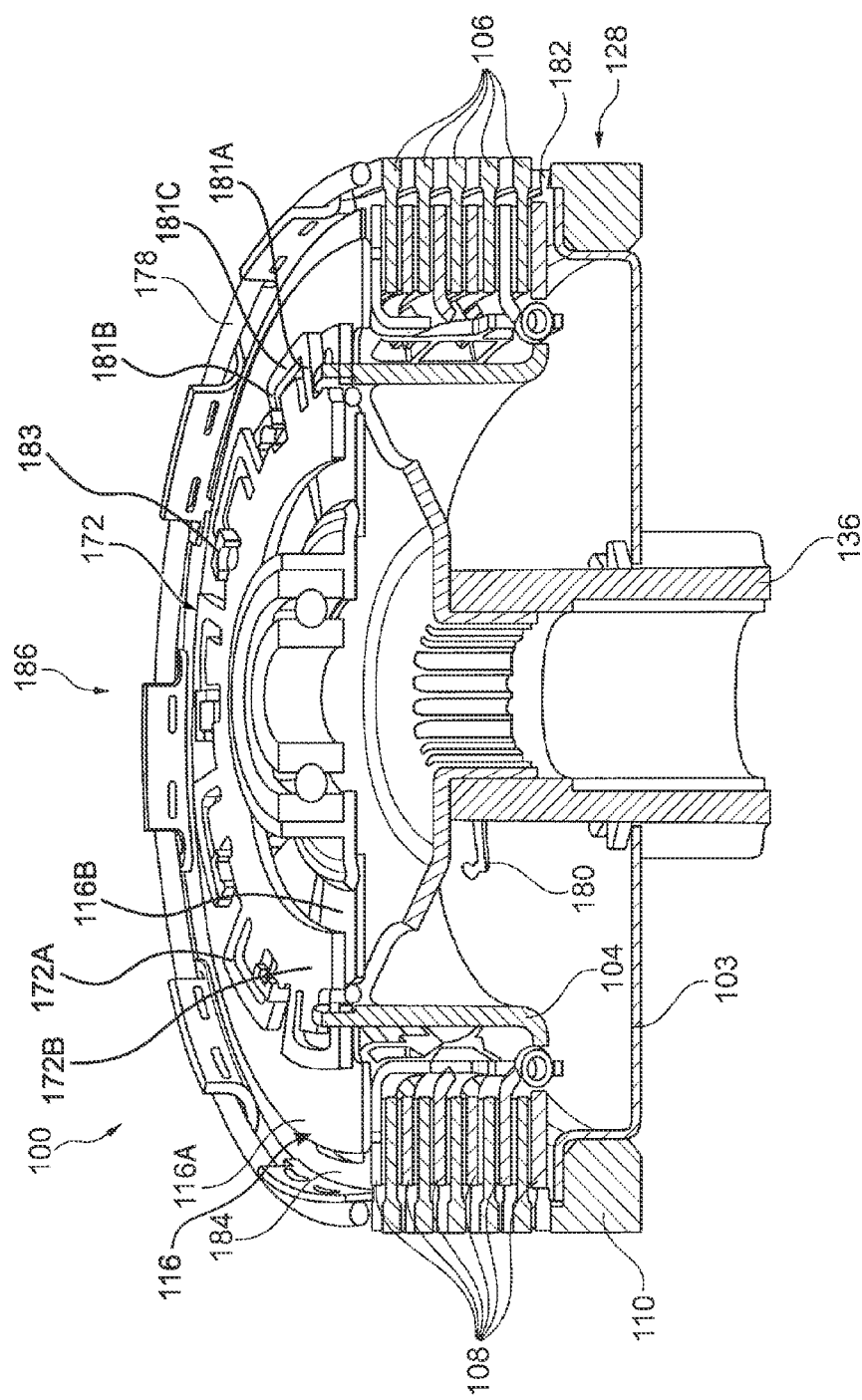

FIG. 65 shows wet clutch 100 from a perspective corresponding to that of FIG. 58. Outer basket 102 is deep-drawn, and has at its upper axial end a holding structure to receive encircling wire ring 178. Wire ring 178 closes off stacked friction disks 106 and laminae 108 toward the top and serves to brace outer basket 102 under centrifugal force loading, in order to increase a bursting strength of outer basket 102.

To center ring gear 110 on the shoulder of outer basket 102, three straps 180 are formed on outer basket 102, distributed around the circumference. After ring gear 110 is attached to outer carrier 102, straps 180 are bent down radially outward by 90° in order to fix ring gear 110 in the axial direction. A different number of straps 180 may also be provided on outer carrier 102.

To transfer torque between outer carrier 102 and ring gear 110, a number of teeth 182 are provided in the area of the shoulder on outer carrier 102, which engage with external toothing 128 of ring gear 110.

As will be described below in still greater detail in reference to FIG. 66, outer basket 102 is not closed in the radial direction as in embodiment V11, but open. Support plate 172 will be described in greater detail below in reference to FIG. 71.

Starter gear 136 is torsionally connected to outer carrier 102 by means of toothing. Starter gear 136 has a hollow bore, in which a bearing bush is located. A non-toothed section of Starter gear 136 extends upward in the axial direction as far as inner basket 104. Output hub 122 is formed in a single piece on inner basket 104, and protrudes from above into the hollow bore of starter gear 136.

Uppermost lamina 108 includes a number of spring elements 184 distributed around a circumference, on which lamellar spring 116 lies. The lining resiliency of friction disks 104 is realized by means of spring elements 184.

Also depicted in FIG. 65 is clutch release bearing 186, above lamellar spring 116.

Figure 66:
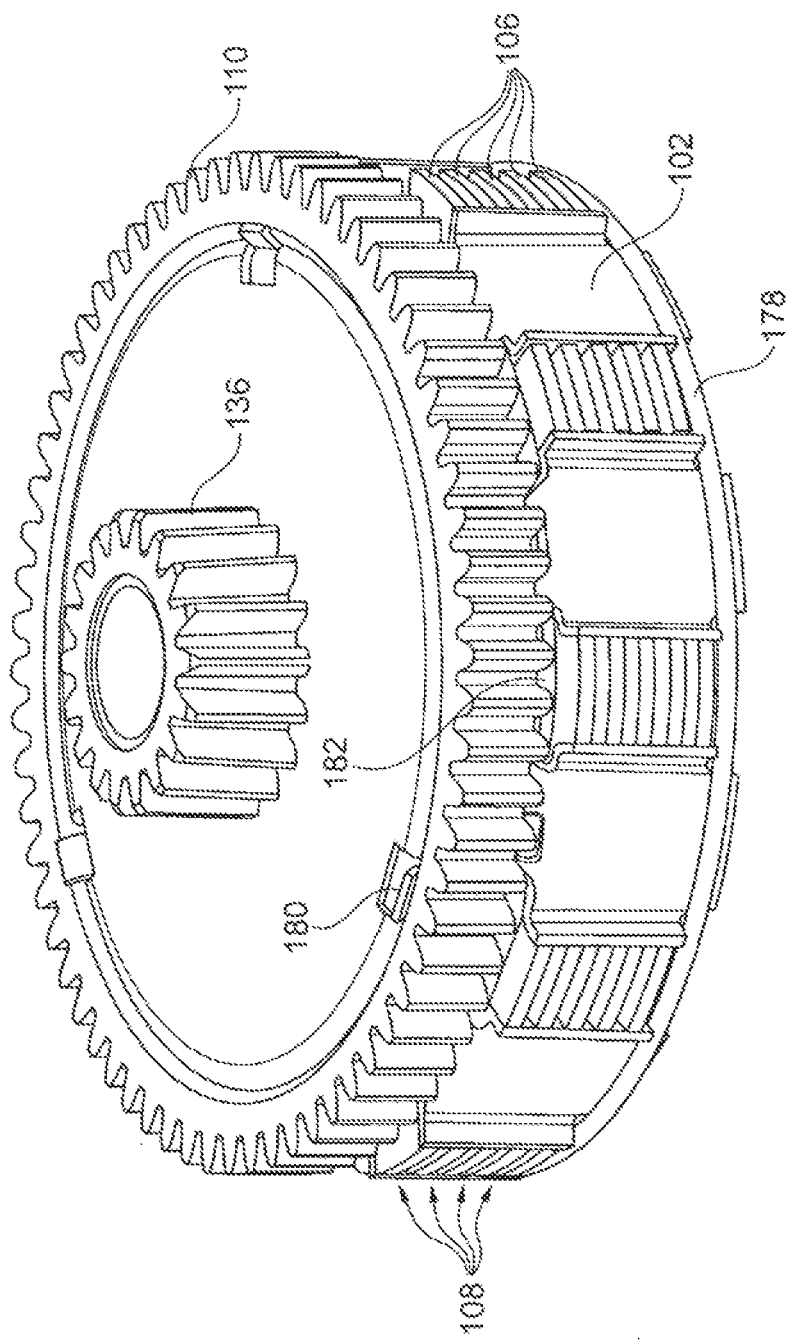

FIG. 66 shows outer carrier 102 with ring gear 110 and starter gear 136, as well as friction disks 106, laminae 108 and wire ring 178. The perspective here corresponds to that of FIG. 59.

Teeth 182 and straps 180 formed on outer basket 102 are recognizable. Friction disks 106 have axial straps to introduce a torque. In the area of these straps, a radial wall of outer basket 102 is interrupted. A section of the radial wall of outer basket 102 is bent radially outward on each side of the overlapping straps of friction disks 106, in order to improve introduction of force. Because of the interruptions in the radial wall of outer basket 102, the latter is not closed, like outer basket 102 of embodiment V11, but open.

Figure 67:
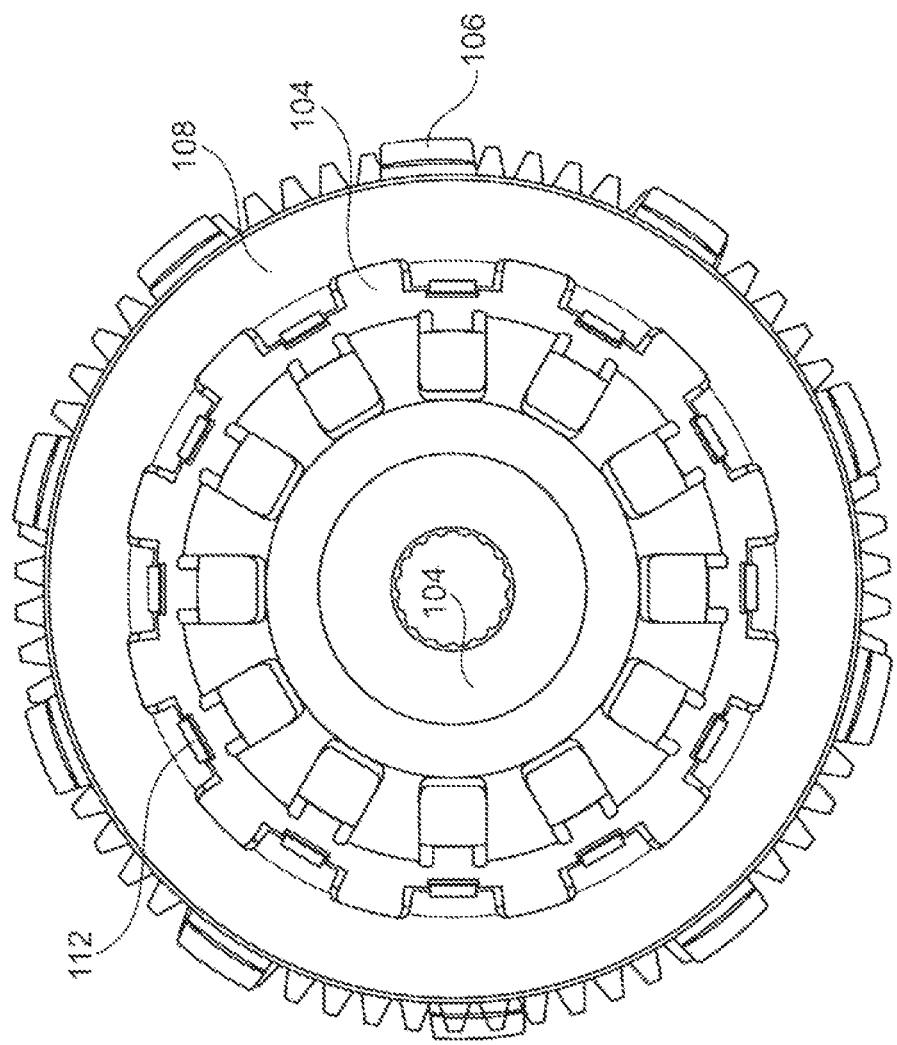

FIG. 67 shows inner basket 104 together with friction disks 106, laminae 108 and shock absorbers 112.

Friction disks 106 include straps running radially outward to introduce a torque (see FIG. 66). Corresponding straps of laminae 108 are attached to the radial inner surface of laminae 108. Here the straps are bent down in the axial direction, and the straps of adjoining laminae 108 are interconnected with each other in such a way that a torque can be transmitted between the laminae.

Figure 68:
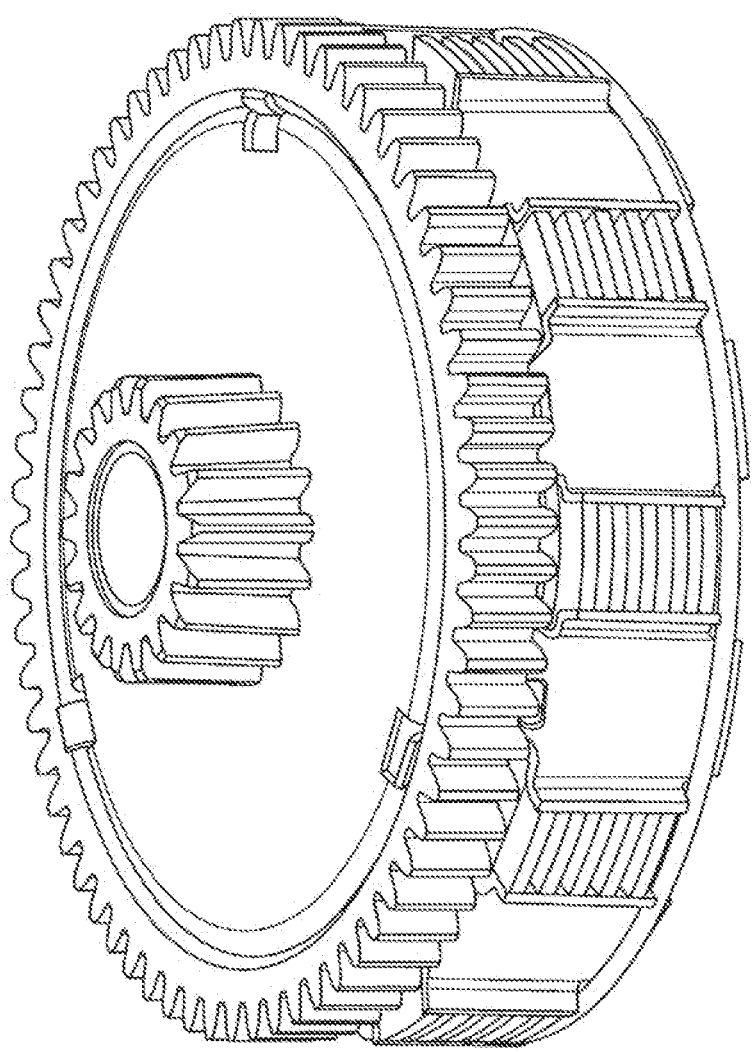
Figure 69:
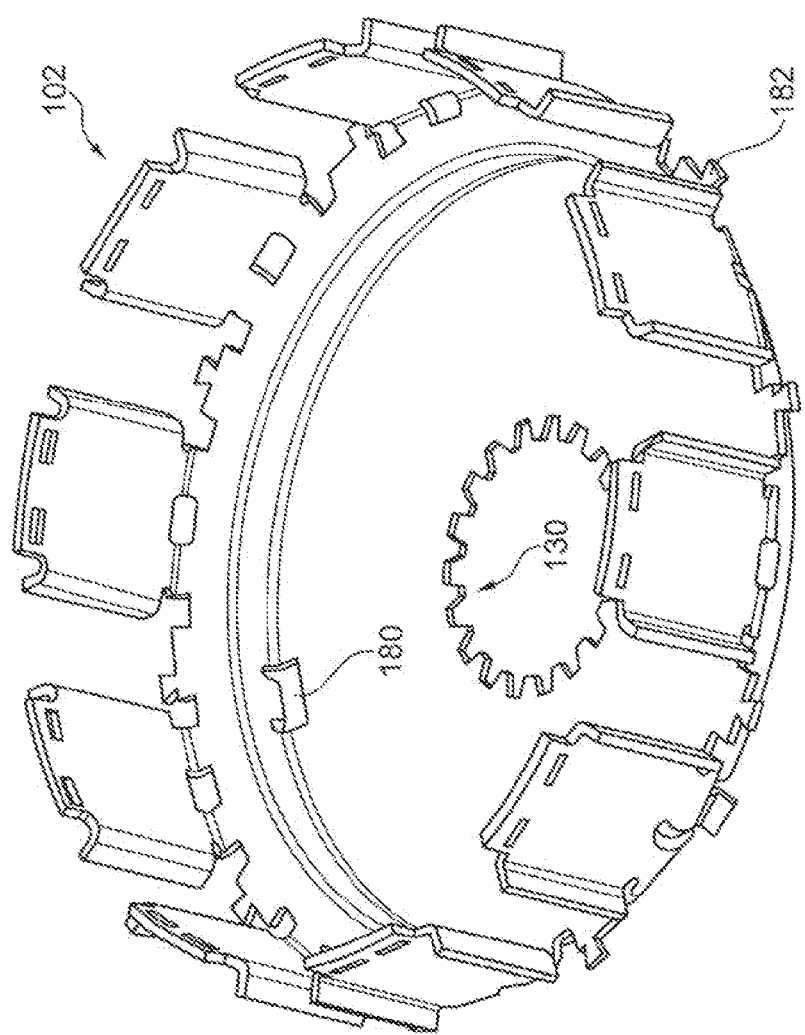

FIG. 68 shows a depiction similar to that of FIG. 66. FIG. 69 shows outer carrier 102 from a perspective similar to that of FIG. 65. It can be seen how a footing for wire ring 178 is formed by the outward-bent sections of outer basket 102. This footing supports wire ring 178 axially downward. On a radial inner surface, wire ring 178 fits against axial end sections of the radial wall of outer basket 102.

FIG. 69 shows outer carrier 102 without additional structural components of wet clutch 100, from a perspective corresponding to that of FIG. 62. Internal toothing 130 is provided to transfer torque to starter gear 136. Also readily recognizable are three straps 180 for axial engagement with corresponding cutouts of gear wheel 110, and ten radial teeth 182 for engagement with the teeth of external toothing 128 of ring gear 110.

Figure 70:
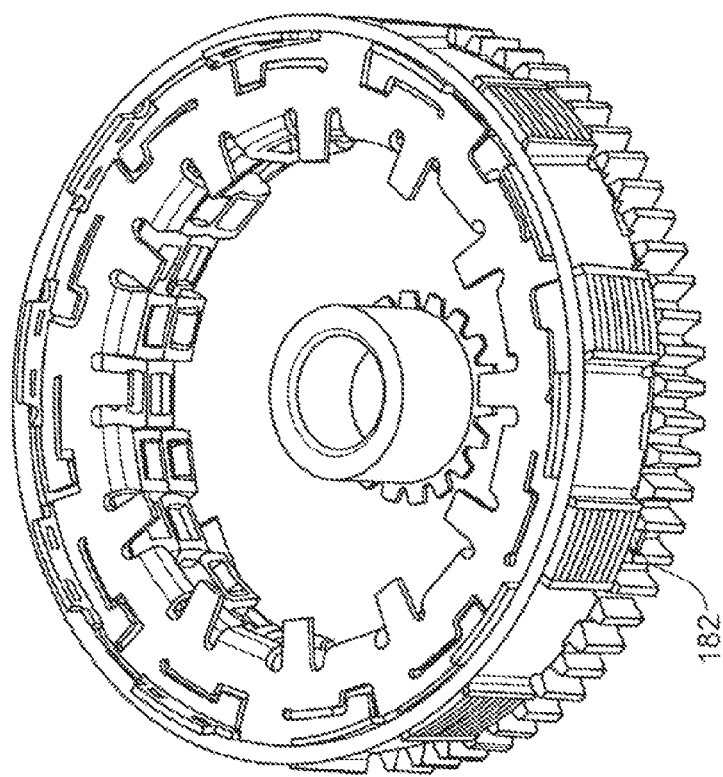

FIG. 70 shows the sub-assembly from FIG. 68 from an upside-down perspective.

FIG. 71 shows the sub-assembly from FIG. 70 with additionally attached inner basket 104, lamellar spring 116 and support plate 172.

Support plate 172 includes: a number of U-shaped spring arms 172A extending outward in a radial direction, only one end of each spring arm being connected to a radial inner region of support plate 172; and region 172B radially inward of inner basket 104. Each spring arm 172A includes: leg 181A extending from region 172B; leg 181B directly engaged with a respective protrusion 183 of inner basket 104; and leg 181C connecting legs 181A and 181B. Each spring arm is bent in the axial direction in such a way that it is oriented axially upward in the load-free state. The triple leg of each spring element engages with the grooves of inner carrier 104 provided for that purpose, so that support plate 172 is secured in the axial direction. At the same time, an axial pre-tensioning is exerted between inner basket 104 and lamellar spring 116 by the spring force of the spring elements. Predictable wear within the bearing point between lamellar spring 116 and inner basket 104 is compensated for by the pre-tensioning. Bearing without free play can thus be realized over the life of wet clutch 100.

FIG. 72 shows a depiction similar to that of FIG. 70. Lamina 108 depicted on top has a number of straps extending radially inward.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS 100 wet clutch
102 outer basket
104 inner basket
106 friction disks
108 laminae
110 primary gear wheel
112 shock absorber
114 floor plate
116 lamellar spring
118 supporting wire
120 closing wire
122 output hub
124 bearing bush
126 locking ring
128 outer toothing
130 inner toothing
132 receptacle
133 receptacle
134 outer toothing
136 starter gear
138 straps
140 web
142 inner carrier
144 upper section
148 profiles
150 web
152 screw
154 web
156 strap
158 rivet
160 shoulder
162 centering web
164 spoke
166 bolt
168 base plate
170 stud
172 support plate
174 cog
178 wire ring
180 strap
182 tooth
184 spring element
186 clutch release bearing

What is claimed is:

1. A wet clutch for a motorcycle, comprising:
an outer basket, having a first toothing, as an input side of the wet clutch;
an inner basket coaxial to the outer basket, having a second toothing, as an output side of the wet clutch;
a first plurality of frictional elements torsionally connected to the outer basket;
a second plurality of frictional elements torsionally connected to the inner basket;
a support plate directly engaged with the inner basket, the support plate including:
a region radially inward of the inner basket; and,
a plurality of spring arms extending radially outward from the region past the inner basket; and,
a spring including:
a section axially disposed between the plurality of spring arms and the first and second pluralities of frictional elements; and,
a plurality of tongues:
radially inward of the inner basket;
arranged, in a first position, to compresses the first and second frictional elements to produce a torsional connection between the input side and the output side; and,
arranged, in a second position, to enable relative rotation between the inner and outer baskets, wherein the plurality of spring arms is arranged to axially pre-tension the spring when the spring is in the position to compensate for a decrease in a height of the first and second pluralities of frictional elements while enabling relative rotation between the inner and outer baskets.

2. The wet clutch of claim 1, further comprising:
at least one spring element in contact with the spring and a first frictional element in the first plurality of frictional elements.

3. The wet clutch of claim 1, wherein:
the outer basket includes a radial wall with a plurality of interruptions; and, the first plurality of frictional elements extend radially outward into the interruptions.

4. The wet clutch of claim 3, wherein the first plurality of frictional elements extend radially outward past the radial wall.

5. A wet clutch for a motorcycle, comprising:
an outer basket, having a first toothing, as an input side of the wet clutch;

an inner basket coaxial to the outer basket, having a second toothing, as an output side of the wet clutch;
a first plurality of frictional elements torsionally connected to the outer basket;
a second plurality of frictional elements torsionally connected to the inner basket;
a support plate directly connected to the inner basket, the support plate including:
a region radially inward of the inner basket; and,
a plurality of U-shaped spring arms extending radially outward from the region past the inner basket; and,
a spring including:
a section axially disposed between the plurality of U-shaped spring arms and the first and second pluralities of frictional elements; and,
a plurality of tongues:
radially inward of the inner basket;
arranged, in a first position, to compresses the first and second frictional elements to produce a torsional connection between the input side and the output side; and,
arranged, in a second position, to enable relative rotation between the inner and outer baskets, wherein the plurality of U-shaped spring arms is arranged to axially pre-tension the spring when the spring is in the second position to compensate for a decrease in a height of the first and second pluralities of frictional elements while enabling relative rotation between the inner and outer baskets.

6. The wet clutch of claim 5, further comprising:
at least one spring element in contact with the spring and a first frictional element in the first plurality of frictional elements.

7. The wet clutch of claim 5, wherein:
the inner basket includes a plurality of protrusions extending in an axial direction away from the first and second pluralities of frictional elements; and,
said each spring arm includes:
a first leg of the U-shape extending radially outward from the region;
a second leg of the U-shape directly engaged with a respective protrusion from the plurality of protrusions; and,
a third leg of the U-shape connecting the first and second legs.

8. The wet clutch of claim 7, wherein the second leg of the U-shape is directly engaged with a groove in the respective protrusion.

* * * * *